United States Patent
Yamamoto et al.

(10) Patent No.: US 10,290,855 B2
(45) Date of Patent: May 14, 2019

(54) NEGATIVE ELECTRODE FOR ELECTRICAL DEVICE, AND ELECTRICAL DEVICE USING THE SAME

(71) Applicant: NISSAN MOTOR CO., LTD., Yokohama-shi, Kanagawa-ken (JP)

(72) Inventors: Kensuke Yamamoto, Yokohama (JP); Manabu Watanabe, Yokosuka (JP); Fumihiro Miki, Sagamihara (JP); Takashi Sanada, Yokohama (JP); Nobutaka Chiba, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 349 days.

(21) Appl. No.: 14/442,289

(22) PCT Filed: Nov. 19, 2013

(86) PCT No.: PCT/JP2013/081146
§ 371 (c)(1),
(2) Date: May 12, 2015

(87) PCT Pub. No.: WO2014/080895
PCT Pub. Date: May 30, 2014

(65) Prior Publication Data
US 2016/0285076 A1 Sep. 29, 2016

(30) Foreign Application Priority Data
Nov. 22, 2012 (JP) ................. 2012-256896

(51) Int. Cl.
*H01M 4/134* (2010.01)
*C22C 13/00* (2006.01)
(Continued)

(52) U.S. Cl.
CPC ............... *H01M 4/134* (2013.01); *C22C 1/02* (2013.01); *C22C 1/045* (2013.01); *C22C 1/0416* (2013.01);
(Continued)

(58) Field of Classification Search
None
See application file for complete search history.

(56) References Cited

U.S. PATENT DOCUMENTS 4,560,524 A  12/1985  Smuckler
6,300,013 B1  10/2001  Yamada et al.
(Continued)

FOREIGN PATENT DOCUMENTS

CN  1272698 A  11/2000
CN  1444301 A  9/2003
(Continued)

OTHER PUBLICATIONS

U.S. Appl. No. 14/443,236, filed May 15, 2015, Nissan Motor Co., Ltd.
(Continued)

*Primary Examiner* — Alix E Eggerding
(74) *Attorney, Agent, or Firm* — Foley & Lardner LLP

(57) ABSTRACT

A negative electrode for an electrical device includes: a current collector; and an electrode layer containing a negative electrode active material, an electrically-conductive auxiliary agent and a binder and formed on a surface of the current collector, wherein the negative electrode active material contains an alloy represented by a following formula (1): $Si_xZn_yM_zA_a$ (in the formula (1) M is at least one metal selected from the group consisting of V, Sn, Al, C and combinations thereof, A is inevitable impurity, and x, y, z and a represent mass percent values and satisfy $0<x<100$, $0<y<100$, $0<z<100$, $0\le a<0.5$ and $x+y+z+a=100$), and elongation ($\delta$) of the electrode layer is $1.29<\delta<1.70\%$.

22 Claims, 20 Drawing Sheets

(51) Int. Cl.

| | |
|---|---|
| C22C 18/00 | (2006.01) |
| C22C 27/02 | (2006.01) |
| C22C 28/00 | (2006.01) |
| C22C 30/04 | (2006.01) |
| C22C 30/06 | (2006.01) |
| H01M 4/38 | (2006.01) |
| H01M 4/42 | (2006.01) |
| H01M 4/62 | (2006.01) |
| C22C 24/00 | (2006.01) |
| C22C 29/18 | (2006.01) |
| C22C 1/04 | (2006.01) |
| C22C 1/02 | (2006.01) |
| C22C 9/00 | (2006.01) |
| C22C 30/00 | (2006.01) |
| H01M 4/04 | (2006.01) |
| H01M 4/131 | (2010.01) |
| H01M 4/485 | (2010.01) |
| H01M 4/66 | (2006.01) |
| H01M 4/70 | (2006.01) |
| H01M 10/04 | (2006.01) |
| H01M 10/0525 | (2010.01) |
| H01M 10/0585 | (2010.01) |
| H01M 10/052 | (2010.01) |
| C22C 1/10 | (2006.01) |
| H01M 4/02 | (2006.01) |

(52) U.S. Cl.
CPC .............. *C22C 1/0483* (2013.01); *C22C 9/00* (2013.01); *C22C 13/00* (2013.01); *C22C 18/00* (2013.01); *C22C 24/00* (2013.01); *C22C 27/025* (2013.01); *C22C 28/00* (2013.01); *C22C 29/18* (2013.01); *C22C 30/00* (2013.01); *C22C 30/04* (2013.01); *C22C 30/06* (2013.01); *H01M 4/0402* (2013.01); *H01M 4/0471* (2013.01); *H01M 4/131* (2013.01); *H01M 4/386* (2013.01); *H01M 4/387* (2013.01); *H01M 4/42* (2013.01); *H01M 4/485* (2013.01); *H01M 4/622* (2013.01); *H01M 4/623* (2013.01); *H01M 4/624* (2013.01); *H01M 4/625* (2013.01); *H01M 4/661* (2013.01); *H01M 4/70* (2013.01); *H01M 10/0427* (2013.01); *H01M 10/0525* (2013.01); *H01M 10/0585* (2013.01); *C22C 1/1084* (2013.01); *H01M 4/66* (2013.01); *H01M 10/052* (2013.01); *H01M 2004/027* (2013.01); *H01M 2004/028* (2013.01); *H01M 2220/30* (2013.01)

(56) References Cited

U.S. PATENT DOCUMENTS

| | | | |
|---|---|---|---|
| 6,680,143 B2 | 1/2004 | Thackeray et al. | |
| 6,685,804 B1 | 2/2004 | Ikeda et al. | |
| 7,141,187 B2 | 11/2006 | Kosuzu et al. | |
| 7,192,673 B1 | 3/2007 | Ikeda et al. | |
| 7,195,842 B1 | 3/2007 | Fujimoto et al. | |
| 7,235,330 B1 | 6/2007 | Fujimoto et al. | |
| 7,241,533 B1 | 7/2007 | Ikeda et al. | |
| 7,316,792 B2 | 1/2008 | Kosuzu et al. | |
| 7,378,041 B2 | 5/2008 | Asao et al. | |
| 7,410,728 B1 | 8/2008 | Fujimoto et al. | |
| 7,425,285 B2 | 9/2008 | Asao et al. | |
| 7,479,351 B2 | 1/2009 | Matsubara et al. | |
| 7,732,095 B2 | 6/2010 | Christensen et al. | |
| 7,794,881 B1 | 9/2010 | Fujimoto et al. | |
| 7,803,290 B2 | 9/2010 | Kosuzu et al. | |
| 7,811,709 B2 | 10/2010 | Musha et al. | |
| 7,851,086 B2 | 12/2010 | Matsubara et al. | |
| 7,972,727 B2 | 7/2011 | Christensen et al. | |
| 8,216,720 B2 | 7/2012 | Fukui et al. | |
| 8,221,918 B2 | 7/2012 | Katsura et al. | |
| 8,394,534 B2 | 3/2013 | Lopez et al. | |
| 8,475,959 B2 | 7/2013 | Venkatachalam et al. | |
| 8,741,485 B2 | 6/2014 | Lopez et al. | |
| 8,916,295 B2 | 12/2014 | Ito et al. | |
| 9,070,935 B2 | 6/2015 | Murata et al. | |
| 9,263,733 B2 | 2/2016 | Wakizaka et al. | |
| 9,325,003 B2 | 4/2016 | Watanabe et al. | |
| 9,603,245 B2 | 3/2017 | Suzuki et al. | |
| 2002/0044800 A1 | 4/2002 | Kimura | |
| 2002/0071991 A1 | 6/2002 | Kweon et al. | |
| 2003/0148185 A1 | 8/2003 | Kusumoto et al. | |
| 2003/0157407 A1 | 8/2003 | Kosuzu et al. | |
| 2004/0029012 A1 | 2/2004 | Tanizaki et al. | |
| 2004/0137327 A1 | 7/2004 | Gross et al. | |
| 2004/0191630 A1 | 9/2004 | Kawamura et al. | |
| 2005/0208379 A1 | 9/2005 | Musha et al. | |
| 2005/0244711 A1* | 11/2005 | Fukui ............... H01M 4/134 429/217 |
| 2006/0115735 A1 | 1/2006 | Yasuda et al. | |
| 2006/0035149 A1 | 2/2006 | Nanba et al. | |
| 2006/0040182 A1* | 2/2006 | Kawakami ......... H01M 10/052 429/218.1 |
| 2006/0051675 A1 | 3/2006 | Musha et al. | |
| 2007/0048612 A1 | 3/2007 | Nakajima et al. | |
| 2007/0128517 A1 | 6/2007 | Christensen et al. | |
| 2007/0148544 A1 | 6/2007 | Le | |
| 2007/0200101 A1 | 8/2007 | Asao et al. | |
| 2008/0003503 A1 | 1/2008 | Kawakami et al. | |
| 2009/0061322 A1 | 3/2009 | Kawakami et al. | |
| 2009/0239151 A1* | 9/2009 | Nakanishi ........... H01M 4/0428 429/231.95 |
| 2009/0297951 A1 | 12/2009 | Katsura et al. | |
| 2010/0009258 A1 | 1/2010 | Hasegawa et al. | |
| 2010/0075226 A1 | 3/2010 | Pham et al. | |
| 2010/0119942 A1* | 5/2010 | Kumar ................. H01M 4/38 429/220 |
| 2010/0167126 A1 | 7/2010 | Christensen et al. | |
| 2010/0178571 A1 | 7/2010 | Nanba et al. | |
| 2010/0203396 A1 | 8/2010 | Murata | |
| 2010/0270497 A1 | 10/2010 | Hezeque et al. | |
| 2010/0288077 A1 | 11/2010 | Le | |
| 2010/0323098 A1 | 12/2010 | Kosuzu et al. | |
| 2011/0052985 A1 | 3/2011 | Kashiwazaki et al. | |
| 2011/0084229 A1 | 4/2011 | Kawakami et al. | |
| 2011/0183173 A1* | 7/2011 | Muraoka .............. H01M 4/13 429/94 |
| 2011/0281180 A1 | 11/2011 | Kim et al. | |
| 2012/0153220 A1 | 6/2012 | Watanabe et al. | |
| 2012/0175551 A1 | 7/2012 | Watanabe et al. | |
| 2012/0200200 A1 | 8/2012 | Jung et al. | |
| 2012/0276446 A1 | 11/2012 | Kawai | |
| 2013/0089783 A1 | 4/2013 | Yoo et al. | |
| 2013/0108922 A1 | 5/2013 | Shinozaki et al. | |
| 2013/0202967 A1 | 8/2013 | Kim et al. | |
| 2013/0288122 A1* | 10/2013 | Matsushima ......... H01M 4/13 429/211 |
| 2013/0295438 A1* | 11/2013 | Itoh .................... H01M 4/12 429/162 |
| 2013/0341560 A1 | 12/2013 | Watanabe et al. | |
| 2014/0017564 A1 | 1/2014 | Suzuki et al. | |
| 2014/0086788 A1 | 3/2014 | Watanabe et al. | |
| 2014/0086792 A1 | 3/2014 | Watanabe et al. | |
| 2014/0099229 A1 | 4/2014 | Watanabe et al. | |
| 2014/0319414 A1 | 10/2014 | Watanabe et al. | |
| 2014/0353546 A1 | 12/2014 | Watanabe et al. | |
| 2014/0356718 A1 | 12/2014 | Ito et al. | |
| 2014/0374666 A1 | 12/2014 | Watanabe et al. | |
| 2015/0044513 A1 | 2/2015 | Endoh et al. | |
| 2015/0295228 A1 | 10/2015 | Yamamoto et al. | |
| 2015/0303450 A1 | 10/2015 | Miki et al. | |
| 2015/0303451 A1 | 10/2015 | Miki et al. | |
| 2015/0303455 A1 | 10/2015 | Watanabe et al. | |
| 2015/0303464 A1 | 10/2015 | Watanabe et al. | |
| 2015/0303465 A1 | 10/2015 | Watanabe et al. | |
| 2015/0311500 A1 | 10/2015 | Miki et al. | |
| 2016/0285076 A1* | 9/2016 | Yamamoto ........... C22C 13/00 |

(56) References Cited

U.S. PATENT DOCUMENTS

| | | |
|---|---|---|
| 2016/0285077 A1 | 9/2016 | Miki et al. |
| 2016/0285088 A1 | 9/2016 | Watanabe et al. |
| 2016/0336593 A1 | 11/2016 | Honda et al. |
| 2017/0005362 A1 | 1/2017 | Nakagawa et al. |
| 2017/0012287 A1 | 1/2017 | Yamamoto |
| 2017/0012320 A1 | 1/2017 | Ogihara et al. |

FOREIGN PATENT DOCUMENTS

| | | | |
|---|---|---|---|
| CN | 1663065 A | | 8/2005 |
| CN | 1765024 A | | 4/2006 |
| CN | 1770513 A | | 5/2006 |
| CN | 101179126 A | | 5/2008 |
| CN | 101233632 A | | 7/2008 |
| CN | 101593828 A | | 12/2009 |
| CN | 102326284 A | | 1/2012 |
| CN | 102760872 A | | 10/2012 |
| CN | 104170127 A | | 11/2014 |
| EP | 1 313 158 A2 | | 5/2003 |
| EP | 2 717 356 A1 | | 4/2014 |
| EP | 2 717 357 A1 | | 4/2014 |
| EP | 2 793 301 A1 | | 10/2014 |
| EP | 2 800 176 A1 | | 11/2014 |
| JP | 08-250117 A | | 9/1996 |
| JP | 2000-113885 A | | 4/2000 |
| JP | 2000-299108 A | | 10/2000 |
| JP | 2001-196052 A | | 7/2001 |
| JP | 2002-083594 A | | 3/2002 |
| JP | 2003-331826 A | | 11/2003 |
| JP | 2004-178922 A | | 6/2004 |
| JP | 2004-185810 A | | 7/2004 |
| JP | 2004-185984 A | | 7/2004 |
| JP | 2004-228059 A | | 8/2004 |
| JP | 2004-311428 A | | 11/2004 |
| JP | 2004-311429 A | | 11/2004 |
| JP | 2005-044672 A | | 2/2005 |
| JP | 2005-078999 A | | 3/2005 |
| JP | 2005-116390 A | | 4/2005 |
| JP | 2006-120324 A | | 5/2006 |
| JP | 2006-216277 A | | 8/2006 |
| JP | 2007-026805 A | | 2/2007 |
| JP | 2007-026926 A | | 2/2007 |
| JP | 2007-149604 A | | 6/2007 |
| JP | 2007-305424 A | | 11/2007 |
| JP | 2008-016446 A | | 1/2008 |
| JP | 2009-032644 A | | 2/2009 |
| JP | 2009-517850 A | | 4/2009 |
| JP | 2009-224239 | | 10/2009 |
| JP | 2009-238663 A | | 10/2009 |
| JP | 2010-135336 A | | 6/2010 |
| JP | 2010-205609 A | | 9/2010 |
| JP | 2011-048969 A | | 3/2011 |
| JP | 2012-033475 A | | 2/2012 |
| JP | 4954717 B2 | | 6/2012 |
| JP | 2012-151106 A | | 8/2012 |
| JP | 2012-185913 A | | 9/2012 |
| JP | 5046302 B2 | | 10/2012 |
| JP | 2012-248286 A | | 12/2012 |
| JP | 2013-161785 A | | 8/2013 |
| JP | 2013-225502 A | | 10/2013 |
| KR | 10-2003-0041816 A | | 5/2003 |
| KR | 10-2005-0075449 A | | 7/2005 |
| KR | 10-2008-0019801 A | | 3/2008 |
| KR | 10-2008-0032037 A | | 4/2008 |
| KR | 10-2012-0081987 A | | 7/2012 |
| KR | 10-2012-0089845 A | | 8/2012 |
| KR | 10-2013-0128008 A | | 11/2013 |
| WO | WO 2004/004031 A1 | | 1/2004 |
| WO | WO-2004/086539 A1 | | 10/2004 |
| WO | WO-2007/015508 A1 | | 2/2007 |
| WO | WO-2008/086041 A1 | | 7/2008 |
| WO | WO-2008/097723 A1 | | 8/2008 |
| WO | WO-2010/150513 A1 | | 12/2010 |
| WO | WO-2011/065503 A1 | | 6/2011 |
| WO | WO 2011/065504 A1 | | 6/2011 |
| WO | WO 2012/121240 A1 | | 9/2012 |
| WO | WO-2012/160858 A1 | | 11/2012 |
| WO | WO-2012/160866 A1 | | 11/2012 |
| WO | WO-2012/161190 A1 | | 11/2012 |
| WO | WO-2013/055646 A1 | | 4/2013 |
| WO | WO-2013/088846 A1 | | 6/2013 |
| WO | WO-2013/099440 A1 | | 7/2013 |
| WO | WO-2013/099441 A1 | | 7/2013 |
| WO | WO-2013/115390 A1 | | 8/2013 |
| WO | WO-2013/145913 A1 | | 10/2013 |

OTHER PUBLICATIONS

U.S. Appl. No. 14/646,433, filed May 21, 2015, Nissan Motor Co., Ltd.
Korean Office Action, Application No. 10-2016-7019739, dated Dec. 1, 2017, 5 pages.
Korean Office Action, Application No. 10-2016-7019742, dated Dec. 15, 2017, 7 pages.
USPTO Office Action, U.S. Appl. No. 14/646,218, dated Jan. 9, 2018, 23 pages.
USPTO Office Action, U.S. Appl. No. 14/646,433, dated Dec. 22, 2017, 17 pages.
Extended European Search Report dated Dec. 3, 2014, from related European Patent Application No. 12856913.4, 3 pages.
USPTO Office Action, U.S. Appl. No. 14/442,678, dated Aug. 21, 2017, 23 pages.
USPTO Office Action, U.S. Appl. No. 14/442,957, dated Sep. 21, 2017, 11 pages.
USPTO Office Action, U.S. Appl. No. 14/443,151, dated Jun. 13, 2016, 12 pages.
USPTO Office Action, U.S. Appl. No. 14/443,151, dated Jun. 22, 2017, 14 pages.
USPTO Office Action, U.S. Appl. No. 14/443,151, dated Nov. 28, 2016, 16 pages.
USPTO Office Action, U.S. Appl. No. 14/443,151, dated Oct. 19, 2017, 14 pages.
USPTO Office Action, U.S. Appl. No. 14/443,572, dated Apr. 21, 2017, 16 pages.
USPTO Office Action, U.S. Appl. No. 14/443,572, dated Sep. 11, 2017, 13 pages.
USPTO Office Action, U.S. Appl. No. 14/443,572, dated Oct. 14, 2016, 25 pages.
USPTO Office Action, U.S. Appl. No. 14/443,852, dated Jun. 2, 2017, 19 pages.
USPTO Office Action, U.S. Appl. No. 14/443,852, dated Oct. 17, 2016, 17 pages.
USPTO Office Action, U.S. Appl. No. 14/443,852, dated Dec. 29, 2016, 14 pages.
USPTO Office Action, U.S. Appl. No. 14/443,852, dated Sep. 28, 2017, 17 pages.
USPTO Office Action, U.S. Appl. No. 14/646,218, dated May 10, 2017, 22 pages.
USPTO Office Action, U.S. Appl. No. 14/646,218, dated Sep. 8, 2017, 13 pages.
USPTO Office Action, U.S. Appl. No. 14/646,218, dated Oct. 14, 2016, 22 pages.
USPTO Restriction Office Action, U.S. Appl. No. 14/442,678, dated May 18, 2017, 7 pages.
K. Shibukawa, Y. Irii, F. Matsumoto, A. Ito, Y. Ohsawa, M. Hatano, Y. Sato. "Sankabutsu Coating o Hodokoshita Li Kajo Koyotaikei Seikyoku Li[Li0.2Ni0.183Co0.03Mn0.583] 02 no Denkyoku Tokusei", The Electrochemical Society of Japan Dai 79 Kai Taikai Koen Yoshishu, Mar. 29, 2012, p. 115.
S. Yoon, C.-M. Park, H. Kim, H.-J. Sohn. Electrochemical Properties of Si—Zn—C Composite as an Anode Material for Lithium-Ion Batteries, Journal of Power Sources 167 (2007) 520-523.
USPTO Office Action, U.S. Appl. No. 15/112,725, dated Nov. 24, 2017, 10 pages.
Hatchard et al., "Electrochemical Performance of SiAlSn Films Prepared by Combinatorial Sputtering," Electrochemical and Solid-State Letters, vol. 6, No. 7, 2003, pp. A129-A132.

(56) References Cited

OTHER PUBLICATIONS

M. A. Al-Maghrabi et al., A Combinatorial Study of the Sn—Si—C System for Li-Ion Battery Applications, Journal of the Electrochemical Society, vol. 159, No. 6, Apr. 2, 2012, pp. A711-A719.
Taiwanese Office Action, dated Mar. 19, 2014, 4 pages.
USPTO Office Action, U.S. Appl. No. 14/119,379, dated Jan. 7, 2016, 6 pages.
USPTO Office Action, U.S. Appl. No. 14/119,379, dated Apr. 15, 2016, 6 pages.
USPTO Office Action, U.S. Appl. No. 14/119,379, dated Oct. 9, 2015, 7 pages.
USPTO Office Action, U.S. Appl. No. 14/119,379, dated Feb. 10, 2015, 8 pages.
USPTO Office Action, U.S. Appl. No. 14/119,379, dated May 18, 2015, 7 pages.
USPTO Office Action, U.S. Appl. No. 14/442,661, dated Dec. 2, 2016, 10 pages.
USPTO Office Action, U.S. Appl. No. 14/442,661, dated Sep. 19, 2017, 9 pages.
USPTO Office Action, U.S. Appl. No. 14/442,678, dated Feb. 28, 2018, 32 pages.
USPTO Office Action, U.S. Appl. No. 14/443,151, dated Jun. 15, 2018, 13 pages.
USPTO Office Action, U.S. Appl. No. 14/443,572, dated Feb. 14, 2018, 26 pages.
USPTO Office Action, U.S. Appl. No. 14/646,242, dated Jan. 11, 2018, 8 pages.
USPTO Office Action, U.S. Appl. No. 14/646,242, dated Apr. 19, 2018, 10 pages.
USPTO Office Action, U.S. Appl. No. 14/646,590, dated Dec. 4, 2017, 20 pages.
USPTO Office Action, U.S. Appl. No. 14/646,590, dated Jul. 21, 2017, 22 pages.
USPTO Office Action, U.S. Appl. No. 15/112,725, dated Jun. 15, 2018, 14 pages.
USPTO Office Action, U.S. Appl. No. 14/442,957, dated Apr. 3, 2018, 13 pages.
USPTO Office Action, U.S. Appl. No. 14/443,236, dated May 15, 2018, 38 pages.
USPTO Office Action, U.S. Appl. No. 14/443,852, dated May 9, 2018, 27 pages.
USPTO Office Action, U.S. Appl. No. 14/646,218, dated May 9, 2018, 33 pages.
USPTO Office Action, U.S. Appl. No. 14/646,433, dated May 31, 2018, 15 pages.
USPTO Office Action, U.S. Appl. No. 14/646,590, dated May 8, 2018, 22 pages.
USPTO Office Action, U.S. Appl. No. 14/443,572, dated Jun. 29, 2018, 41 pages.
USPTO Office Action, U.S. Appl. No. 14/442,678, dated Aug. 16, 2018, 32 pages.
USPTO Office Action, U.S. Appl. No. 14/646,590, dated Aug. 28, 2018, 23 pages.
S. H. Park et al., Physical and Electrochemical Properties of Spherical $Li_{1+x}(Ni_{1/3}Co_{1/3}Mn_{1/3})_{1-x}O_2$ Cathode Materials, Journal of Power Sources 177, 2008, pp. 177-183.
USPTO Office Action, U.S. Appl. No. 14/443,151, dated Oct. 12, 2018, 15 pages.
USPTO Office Action, U.S. Appl. No. 14/442,957, dated Oct. 12, 2018, 15 pages.
USPTO Office Action, U.S. Appl. No. 14/646,433, dated Oct. 19, 2018, 15 pages.
USPTO Office Action, U.S. Appl. No. 14/443,236, dated Nov. 16, 2018, 15 pages.
USPTO Office Action, U.S. Appl. No. 14/646,218, dated Nov. 19, 2018, 14 pages.
USPTO Office Action, U.S. Appl. No. 15/112,725, dated Oct. 23, 2018, 18 pages.
USPTO Office Action, U.S. Appl. No. 15/113,096, dated Jan. 14, 2019, 30 pages.
USPTO Office Action, U.S. Appl. No. 14/442,678, dated Mar. 7, 2019, 32 pages.
USPTO Office Action, U.S. Appl. No. 14/443,151, dated Mar. 20, 2019, 22 pages.
USPTO Office Action, U.S. Appl. No. 14/443,572, dated Feb. 21, 2019, 22 pages.

* cited by examiner

NEGATIVE ELECTRODE FOR ELECTRICAL DEVICE, AND ELECTRICAL DEVICE USING THE SAME

TECHNICAL FIELD

The present invention relates to a negative electrode for an electrical device, and to an electrical device using the same. The negative electrode for an electrical device and the electrical device using the same are used, for example, as a secondary battery, a capacitor and the like for a driving power supply and an auxiliary power supply for a motor of a vehicle such as an electric vehicle, a fuel cell electric vehicle and a hybrid electric vehicle.

BACKGROUND ART

In recent years, in order to cope with the air pollution and the global warming, it is sincerely desired that the amount of carbon dioxide be reduced. In the automobile industry, expectations are centered on reduction of an emission amount of carbon dioxide by introduction of an electric vehicle (EV) and a hybrid electric vehicle (HEV). Thus, development of an electrical device such as a secondary battery for driving a motor, the electrical device serving as a key for practical use of these vehicles, is assiduously pursued.

It is required that the secondary battery for driving a motor have extremely high output characteristics and high energy in comparison with lithium ion secondary battery for general use in a cellular phone, a notebook computer and the like. Hence, a lithium ion secondary battery having the highest theoretical energy among all of the batteries has attracted attention, and development thereof is rapidly advanced at present.

In general, the lithium ion secondary battery has a configuration, in which a positive electrode and a negative electrode are connected to each other while interposing an electrolyte layer therebetween, and are housed in a battery case, the positive electrode having a positive electrode active material and the like coated on both surfaces of a positive electrode current collector by using a binder, and the negative electrode having a negative electrode active material and the like coated on both surfaces of a negative electrode current collector by using a binder.

Heretofore, for the negative electrode of the lithium ion secondary battery, a carbon/graphite-based material advantageous in terms of a lifetime of a charge/discharge cycle and cost has been used. However, in the carbon/graphite-based negative electrode material, charge/discharge is performed by occlusion/discharge of lithium ions into/from graphite crystals, and accordingly, there is a disadvantage that a charge/discharge capacity equal to or more than a theoretical capacity of 372 mAh/g, which is obtained from $LiC_6$ that is a maximum lithium-introduced compound, cannot be obtained. Therefore, it is difficult to obtain a capacity and an energy density, which satisfy a practical level of usage for a vehicle, by the carbon/graphite-based negative electrode material.

As opposed to this, in a battery using a material, which is alloyed with Li, for the negative electrode, an energy density thereof is enhanced in comparison with the conventional carbon/graphite-based negative electrode material, and accordingly, such a material is expected as a negative electrode material in the usage for the vehicle. For example, a Si material occludes/discharges 4.4 mol of lithium ions per 1 mol as in the following Reaction formula (1) in the charge/discharge, and in $Li_{22}Si_5$ (=$Li_{4.4}Si$), a theoretical capacity thereof is 2100 mAh/g. Moreover, in a case of calculating such a theoretical capacity per weight of Si, the Si material has an initial capacity of no less than 3200 mAh/g (refer to Comparative reference example 42 of Reference example C).

[Chem. 1]

$$Si + 4.4Li^+ + e^- \leftrightarrow Li_{4.4}Si \quad (A)$$

However, in the lithium ion secondary battery using the material, which is alloyed with Li, for the negative electrode, expansion/contraction in the negative electrode at a time of the charge/discharge is large. For example, volume expansion in the case of occluding the Li ions is approximately 1.2 times in the graphite material, and meanwhile, in an event where Si and Li are alloyed with each other, the Si material makes transition from an amorphous state to a crystal state and causes a large volume change (approximately four times), and accordingly, there has been a problem of lowering a cycle lifetime of the electrode. Moreover, in a case of a Si negative electrode active material, a capacity and cycle durability thereof are in a tradeoff relationship, and there has been a problem that it is difficult to enhance the high cycle durability while exhibiting a high capacity.

In order to solve such problems as described above, a negative electrode active material for a lithium ion secondary battery, which contains an amorphous alloy having a formula: $Si_xM_yAl_z$, is proposed (for example, refer to Patent Literature 1). Here, x, y and z in the formula represent atom percent values, x+y+z=100, x≥55, y<22, z>0, and M is metal composed of at least one of Mn, Mo, Nb, W, Ta, Fe, Cu, Ti, V, Cr, Ni, Co, Zr and Y. In the invention described in Patent Literature 1, in the paragraph [0018], it is described that a content of the metal M is minimized, whereby a good cycle lifetime is exhibited as well as a high capacity.

CITATION LIST

Patent Literature

Patent Literature 1: Japanese Patent Unexamined Publication No. 2009-517850

SUMMARY OF INVENTION

Technical Problem

However, in a case of a lithium ion secondary battery using a negative electrode containing the amorphous alloy having the formula: $Si_xM_yAl_z$, which is described in Patent Literature described above, it cannot be said that an initial capacity thereof is sufficient though it is claimed that this lithium ion secondary battery can exhibit good cycle characteristics. Moreover, it cannot be said that cycle characteristics of this lithium ion secondary battery are sufficient, either.

In this connection, it is an object of the present invention to provide a negative electrode for an electrical device such as a Li ion secondary battery that has a high initial capacity and exhibits good balance characteristics while maintaining high cycle characteristics.

Solution to Problem

The inventors of the present invention have found that the above-described problems can be solved by applying a ternary Si—Zn-M-based alloy as a negative electrode active material and by setting elongation of an electrode layer (negative electrode active material layer) in a predetermined range, and then have accomplished the present invention based on such knowledge.

DESCRIPTION OF EMBODIMENTS

Figure 1:
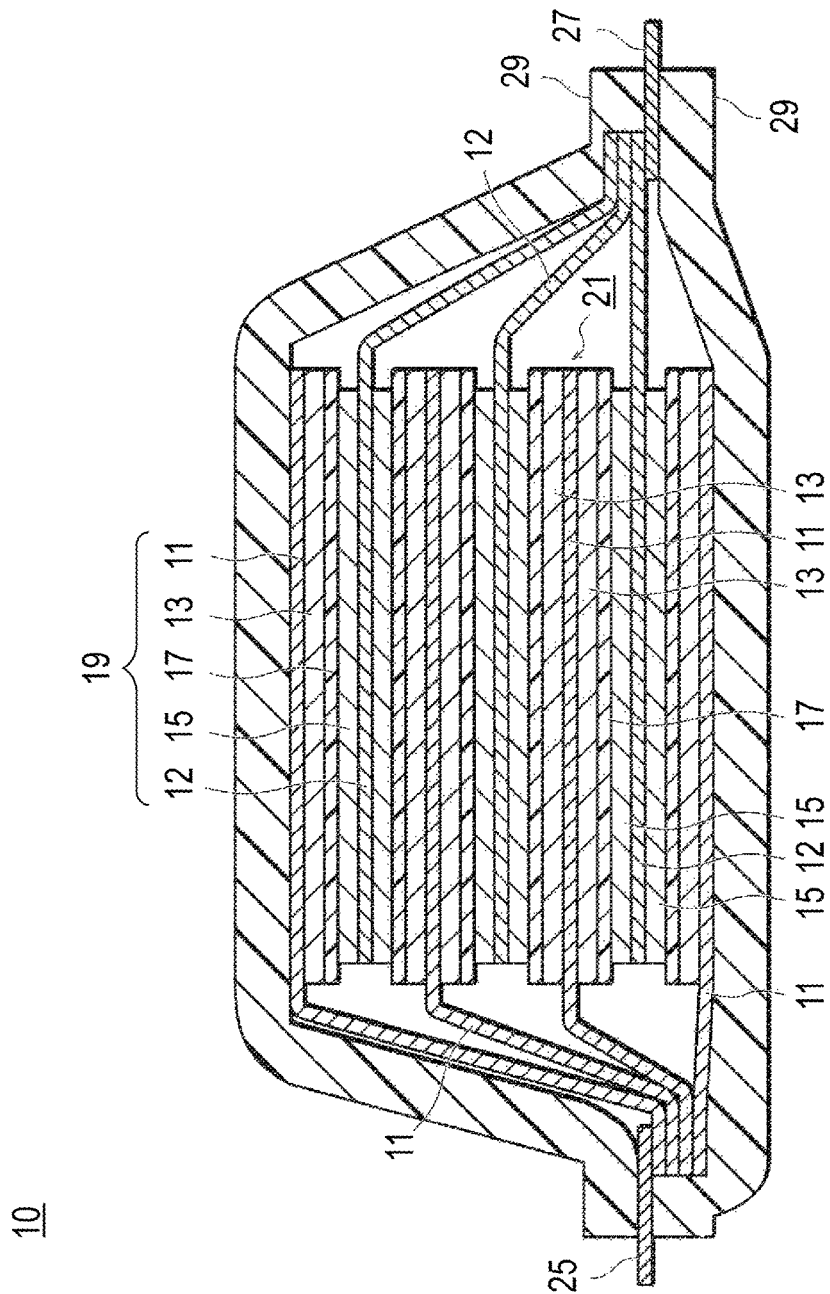
FIG. 1 is a schematic cross-sectional view schematically showing an outline of a laminated flat non-bipolar lithium ion secondary battery as a typical embodiment of an electrical device according to the present invention.

While referring to the drawings, a description is made below of embodiments of a negative electrode for an electrical device according to the present invention and of an electrical device using the same. However, the technical scope of the present invention should be determined based on the description of the scope of claims, and is not limited only to the following embodiments. Note that the same reference numerals are assigned to the same elements in the description of the drawings, and duplicate descriptions are omitted. Moreover, dimensional ratios of the drawings are exaggerated for convenience of explanation, and are sometimes different from actual ratios.

A negative electrode for an electrical device according to the present invention includes: a current collector; and an electrode layer containing a negative electrode active material, an electrically-conductive auxiliary agent and a binder and formed on a surface of the current collector. Moreover, the negative electrode is characterized in that the negative electrode active material contains an alloy (hereinafter, simply referred to as an "alloy" or a "Si alloy" represented by a following formula (1), and elongation (δ) of the electrode layer is within a range of 1.29<δ<1.70%.

[Chem. 2]

$$Si_xZn_yM_zA_a \qquad (1)$$

In the above-described formula (1), M is at least one metal selected from the group consisting of V, Sn, Al, C and combinations thereof. A described above is inevitable impurity. x, y, z and a, which are described above, represent values of mass percent, where 0<x<100, 0<y<100, 0<z<100, 0≤a<0.5 and x+y+z+a=100.

In accordance with the present invention, in an event where Si and Li are alloyed, the ternary Si—Zn-M-based alloy is applied, whereby a function that amorphous-crystalline phase transition is suppressed to enhance the cycle lifetime is obtained. Moreover, the elongation of the electrode layer is set within the predetermined range. Here, the elongation of the electrode layer is increased more than a lower limit of the predetermined range, whereby electrode constituents other than the negative electrode active material can follow the volume change by the expansion/contraction of the negative electrode active material, which are caused by the charge/discharge, and a volume change of a whole of the electrode can be suppressed. Moreover, the elongation of the electrode layer is reduced more than an upper limit of the predetermined range, whereby the elongation of the electrode layer can be suppressed from hindering the reaction (insertion/elimination) of the lithium ions to the negative electrode active material, the reaction following the charge/discharge. As a result of such multiple functions as described above, the negative electrode according to the present invention can obtain a useful effect of having a high initial capacity and having high capacity/high cycle durability, and in particular, a high improvement rate of the discharge capacity.

A description is made below of a basic configuration of an electrical device, to which the negative electrode for an electrical device according to the present invention is applicable, with reference to the drawings. In this embodiment, as the electrical device, a lithium ion secondary battery is exemplified and described. Note that the "electrode layer" in the present invention stands for a combination layer including the negative electrode active material, the electrically-conductive auxiliary agent, and the binder; however, in the description of this specification, the electrode layer is sometimes referred to as a "negative electrode active material layer". In a similar way, an electrode layer on the positive electrode side is sometimes referred to as a "positive electrode active material layer".

First, in a negative electrode for a lithium ion secondary battery, which is a typical embodiment of the negative electrode for an electrical device according to the present invention, and in a lithium ion secondary battery using the same, a voltage of a cell (single cell layer) is large, and a high energy density and a high output density can be achieved. Therefore, the lithium ion secondary battery, which uses the negative electrode for a lithium ion secondary battery according to this embodiment, is excellent as those for a vehicle-driving power supply and a vehicle auxiliary power supply. As a result, the lithium ion secondary battery can be suitably used as a lithium ion secondary battery for the vehicle-driving power supply or the like. Besides, the lithium ion secondary battery according to this embodiment is sufficiently applicable also as a lithium ion secondary battery oriented for a portable instrument such as a cellular phone.

That is to say, the lithium ion secondary battery, which serves as a target of this embodiment, just needs to use the negative electrode for a lithium ion secondary battery according to this embodiment, which will be described below, and particular limitations should not be imposed on other constituents.

For example, in a case of distinguishing the above-described lithium ion secondary battery based on form/structure thereof, the lithium ion secondary battery is applicable to any form/structure heretofore known in public, which include those of a laminated-type (flat-type) battery, a wound-type (cylinder-type) battery and the like. The laminated-type (flat-type) battery structure is employed, whereby long-term reliability can be ensured by a sealing technology such as simple thermocompression, and this is advantageous in terms of cost and workability.

Moreover, in a case of viewing the lithium ion secondary battery in terms of an electric connection mode (electrode structure) therein, the negative electrode according to this embodiment is applicable to both of a non-bipolar (internal parallel connection-type) battery and a bipolar (internal serial connection-type) battery.

In a case of distinguishing the lithium ion secondary battery based on a type of an electrolyte layer therein, the negative electrode according to this embodiment is applicable to all types of electrolyte layers heretofore known in public, which are provided in a solution electrolyte battery in which a solution electrolyte such as a non-aqueous electrolytic solution is used for an electrolyte layer, a polymer battery in which a polymer electrolyte is used for an electrolyte layer, and the like. The polymer battery is further classified into a gel electrolyte battery using a polymer gel electrolyte (also simply referred to as a gel electrolyte) and a solid polymer (all solid) battery using a solid polymer electrolyte (also simply referred to as a polymer electrolyte).

Hence, in the following description, by using the drawings, there is briefly described a non-bipolar (internal parallel connection-type) lithium ion secondary battery using the negative electrode for a lithium ion secondary battery according to this embodiment. However, the technical scope of the lithium ion secondary battery according to this embodiment should not be limited to these.

<Overall Structure of Battery>

FIG. 1 is a schematic cross-sectional view schematically showing an overall structure of a flat (laminated) lithium ion secondary battery (hereinafter, also simply referred to as a "laminated battery") as a typical embodiment of an electrical device of the present invention.

As shown in FIG. 1, a laminated battery 10 of this embodiment has a structure, in which a substantially rectangular power generation element 21 in which a charge/discharge reaction actually progresses is sealed in an inside of laminated sheets 29 as package bodies. Here, the power generation element 21 has a configuration, in which positive electrodes each having positive electrode active material layers 13 arranged on both surfaces of a positive electrode current collector 11, electrolyte layers 17, and negative electrodes each having negative electrode active material layers 15 arranged on both surfaces of a negative electrode current collector 12 are laminated on one another. Specifically, the negative electrodes, the electrolyte layers and the positive electrodes are laminated on one another in this order so that one of the positive electrode active material layers 13 and the negative electrode active material layer 15 adjacent thereto can be opposed to each other while interposing the electrolyte layer 17 therebetween.

In such a way, the positive electrode, the electrolyte layer and the negative electrode, which are adjacent to one another, compose one single cell layer 19. Hence, it can also be said that the laminated battery 10 shown in FIG. 1 has a configuration composed in such a manner that a plurality of the single cell layers 19 are electrically connected in parallel to one another by being laminated on one another. Note that, with regard to each of the outermost positive electrode current collectors located on both outermost layers of the power generation element 21, the positive electrode active material layer 13 is arranged only on one surface thereof; however, such active material layers may be provided on both surfaces thereof. That is to say, each of the outermost current collectors is not formed as a current collector, which has the active material layer provided only on one surface thereof and is dedicated for the outermost layer, but such a current collector having the active material layers on both surfaces thereof may be directly used as each of the outermost current collectors. Moreover, such arrangement of the positive electrode and the negative electrode is inverted from that of FIG. 1, whereby the outermost negative electrode current collectors may be located on both outermost layers of the power generation element 21, and the negative electrode active material layer may be arranged on one surface or both surfaces of each of the outermost negative electrode current collector.

The positive electrode current collectors 11 and the negative electrode current collectors 12 have structures, in which a positive electrode current collector plate 25 and a negative electrode current collector plate 27, which are to be conducted to the respective electrodes (the positive electrodes and the negative electrodes), are attached thereto, respectively, and are drawn out to an outside of the laminated sheets 29 like being sandwiched by end portions of the laminated sheets 29. The positive electrode current collector plate 25 and the negative electrode current collector plate 27 may be attached to the positive electrode current collectors 11 and negative electrode current collectors 12 of the respective electrodes by ultrasonic welding, resistance welding or the like while interposing a positive electrode lead and a negative electrode lead (not shown) therebetween, respectively, according to needs.

The lithium ion secondary battery described above has a feature in the negative electrode, which contains a ternary Si—Zn-M-based alloy as a negative electrode active material, and further, in which elongation ($\delta$) of the negative electrode active material layer is in a range of $1.29 < \delta < 1.70\%$. A description is made below of main constituent members of the battery, which includes the negative electrode concerned.

<Active Material Layer>

The active material layers 13 or 15 contain an active material, and further contain other additives according to needs.

[Positive Electrode Active Material Layer]

The positive electrode active material layers 13 contain a positive electrode active material.

(Positive Electrode Active Material)

As the positive electrode active material, for example, there are mentioned a lithium-transition metal composite oxide, a lithium-transition metal phosphate compound, a lithium-transition metal sulfate compound, a solid solution system, a ternary system, a NiMn system, a NiCo system, a spinel Mn system and the like.

As the lithium-transition metal composite oxide, for example, there are mentioned $LiMn_2O_4$, $LiCoO_2$, $LiNiO_2$, $Li(Ni, Mn, Co)O_2$, $Li(Li, Ni, Mn, Co)O_2$, $LiFePO_4$, those in which other elements are partially substituted for these transition metals, and the like.

As the solid solution system, for example, there are mentioned: $xLiMO_2$-$(1-x)Li_2NO_3$ ($0 < x < 1$, M is one or more of transition metals in which an average oxidation state is 3+; N is one or more of transition metals in which an average oxidation state is 4+), $LiRO_2$—$LiMn_2O_4$(R=transition metal element such as Ni, Mn, Co and Fe); and the like.

As the ternary system, a nickel/cobalt/manganese-based (composite) positive electrode material and the like are mentioned.

As the NiMn system, $LiNi_{0.5}Mn_{1.5}O_4$ and the like are mentioned.

As the NiCo system, $Li(NiCo)O_2$ and the like are mentioned.

As the spinel Mn system, $LiMn_2O_4$ and the like are mentioned.

Depending on cases, two or more of the positive electrode active materials may be used in combination. From viewpoints of a capacity and output characteristics, the lithium-transition metal composite oxide is preferably used as the positive electrode active material. Note that, as a matter of course, positive electrode active materials other than those described above may be used. In a case where particle diameters optimum for developing the respective effects intrinsic to the active materials are different from one another, such active materials with the particle diameters optimum for developing the effects intrinsic thereto just need to be blended and used, and it is not necessarily necessary to uniform the particle diameters of all of the active materials.

A mean particle diameter of the positive electrode active material contained in the positive electrode active material layer 13 is not particularly limited; however, are preferably 1 to 30 μm, more preferably 5 to 20 μm from a viewpoint of enhancement of the output. Note that, in this specification, the "particle diameter" stands for a maximum distance among distances, each of which is between arbitrary two points on outlines of the active material particles (observed surfaces) observed by using observing means such as a scanning electron microscope (SEM) and a transmission electron microscope (TEM). Moreover, in this specification, as a value of the "mean particle diameter", a value is employed, which is calculated as a mean value of particle diameters of particles observed in several to several ten visual fields by using the observing means such as the scanning electron microscope (SEM) and the transmission electron microscope (TEM). Particle diameters and mean particle diameters of the other constituent components can also be defined in a similar way.

(Binder for Positive Electrode)

The positive electrode active material layer contains a binder. The binder for use in the positive electrode active material layer is not particularly limited; however, for example, as the binder, the following materials are mentioned, which are: a thermoplastic polymer such as polyethylene, polypropylene, polyethylene terephthalate (PET), polyether nitrile (PEN), polyacrylonitrile, polyimide, polyamide, polyamide imide, cellulose, carboxymethylcellulose (CMC), an ethylene-vinyl acetate copolymer, polyvinyl chloride, styrene-butadiene rubber (SBR), isoprene rubber, butadiene rubber, ethylene propylene rubber, an ethylene-propylene-diene copolymer, a styrene-butadiene-styrene block copolymer and a hydrogenated product thereof, and a styrene-isoprene-styrene block copolymer and a hydrogenated product thereof; fluorine resin such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); polyvinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber); and epoxy resin. Among them, polyvinylidene fluoride, polyimide, styrene-butadiene rubber, carboxymethyl cellulose, polypropylene, polytetrafluoroethylene, polyacrylonitrile, polyamide, and polyamide imide are more preferable. These suitable binders are excellent in heat resistance, further have extremely wide potential windows, are stable at both of the positive electrode potential and the negative electrode potential, and are usable for the positive electrode active material layer. These binders may be each used singly, or two or more thereof may be used in combination.

A content of the binder contained in the positive electrode active material layer is not particularly limited as long as the binder can bind the positive electrode active materials; however, is preferably 0.5 to 15 mass %, more preferably 1 to 10 mass % with respect to the positive electrode active material layers.

As other additives which can be contained in the positive electrode active material layers, for example, there are mentioned an electrically-conductive auxiliary agent, electrolyte salt (lithium salt), an ion conductive polymer, and the like.

(Electrically-Conductive Auxiliary Agent for Positive Electrode)

The positive electrode active material layer contains an electrically-conductive auxiliary agent. The electrically-conductive auxiliary agent for the positive electrode, which is mentioned herein, refers to an additive to be compounded in order to enhance conductivity of the positive electrode active material layer. As this electrically-conductive auxiliary agent, there are mentioned: carbon powder such as carbon black including short chain-like carbon black (short chain-like acetylene black and the like), long chain-like carbon black (long chain-like acetylene black), Ketjen Black (furnace black), channel black and thermal black, and such as graphite including natural graphite and artificial graphite; carbon fiber such as vapor deposited carbon fiber or liquid deposited carbon fiber (carbon nanotube (CNT), graphite fiber and the like) and carbon nanofiber; and carbon materials such as Vulcan, Black Pearl, carbon nano-horn, carbon nano-balloon, hard carbon, fullerene, and expanded graphite; however, it is needless to say that the electrically-conductive auxiliary agent is not limited to these. Note that the above-described carbon fiber is CNT or carbon fiber (which is graphite-like and hard carbon-like (changed depending on a burning temperature at the time of synthesis thereof)), and is capable of being synthesized by either a liquid phase method or a vapor phase method. The positive electrode active material layer contains the electrically-conductive auxiliary agent, whereby a three-dimensional electronic (conductive) network in an inside of the positive electrode active material layer is formed effectively, and this can contribute to the enhancement of the output characteristics of the battery.

A content of the electrically-conductive auxiliary agent mixed into the positive electrode active material layer ranges to be 1 mass % or more, preferably 3 mass % or more, more preferably 5 mass % or more with respect to a total amount of the positive electrode active material layer. Moreover, the content of the electrically-conductive auxiliary agent mixed into the positive electrode active material layer ranges to be 15 mass % or less preferably 10 mass % or less, more preferably 7 mass % or less with respect to the total amount of the positive electrode active material layer. Electronic conductivity of the active material itself is low, and a compounding ratio (content) of the electrically-conductive auxiliary agent in the positive electrode active material layer in which electrode resistance can be reduced by the amount of the electrically-conductive auxiliary agent is regulated within the above-described range, whereby the following effects can be developed. That is to say, without inhibiting an electrode reaction, the electronic conductivity can be sufficiently ensured, the lowering of the energy density by the lowering of the electrode density can be suppressed, and eventually, the enhancement of the energy density by the enhancement of the electrode density can be achieved.

Moreover, a conductive binding agent, which has functions of the above-described electrically-conductive auxiliary agent and binder in combination, may be used in place of these electrically-conductive auxiliary agent and binder, or alternatively, may be used in combination of one or both of these electrically-conductive auxiliary agent and binder. As the conductive binding agent, for example, already commercially available TAB-2 (made by Hohsen Corporation) can be used.

(Manufacturing Method of Positive Electrode Active Material Layer)

The positive electrode (positive electrode active material layer) can be formed by any method of a kneading method, a sputtering method, an evaporation method, a CVD method, a PVD method, an ion plating method, and a thermal spraying method as well as a usual method of coating slurry.

[Negative Electrode Active Material Layer]

The negative electrode active material layer 15 is characterized in that a ternary Si—Zn-M-based alloy is contained as the negative electrode active material, and further, elongation (δ) of the negative electrode active material layer is in a range of 1.29<δ<1.70%. The negative electrode active material layer of this embodiment is applied, whereby a good negative electrode for a lithium ion secondary battery, which has a high capacity and high cycle durability, is obtained. Moreover, a negative electrode having the negative electrode active material layer of this embodiment is used, whereby a high-capacity lithium ion secondary battery having good battery characteristics, which is excellent in cycle durability, and particularly, improvement rate of discharge capacity, is obtained.

(Negative Electrode Active Material)

In this embodiment, the ternary Si—Zn-M-based alloy for use as the negative electrode active material is represented by the following Chemical formula (1).

[Chem. 3]

$$Si_xZn_yM_zA_a \quad (1)$$

In the above-described formula (1), M is at least one metal selected from the group consisting of V, Sn, Al, C and combinations of these. Moreover, A is inevitable impurity. Furthermore, x, y, z and a represent mass % values, and in this event, the following are conditioned, which are 0<x<100, 0<y<100, 0<z<100, 0≤a<0.5 and x+y+z+a=100. Moreover, in this specification, the above-described "inevitable impurities" stand for those which are present in raw materials in the Si alloy or inevitably mixed in a manufacturing process of the Si alloy. The inevitable impurities concerned are originally unnecessary; however, an amount thereof is trace, and characteristics of the Si alloy are not affected thereby, and accordingly, the inevitable impurities are permitted.

In this embodiment, as the negative electrode active material, Zn as a first additional element and M (at least one metal selected from the group consisting of V, Sn, Al, C and combinations of these) as a second additional element are selected, whereby, in an event of Lithium alloying, amorphous-crystalline phase transition is suppressed, and the cycle lifetime can be enhanced. Moreover, the negative electrode active material in this embodiment obtains a higher capacity than the conventional negative electrode active material, for example, a carbon-based negative electrode active material.

A reason why the amorphous-crystalline phase transition is suppressed in the event of the Li alloying is that, in an event where Si and Li are alloyed in the Si material, the Si material makes transition from an amorphous state to a crystal state and causes a large volume change (approximately four times), and accordingly, particles themselves thereof are broken, and a function of the active material is lost. Therefore, the amorphous-crystalline phase transition is suppressed, whereby the breakage of the particles themselves is suppressed, the function (high capacity) of the active material can be held, and the cycle lifetime can be enhanced. Such first and second additional elements are selected, whereby a Si-alloy negative electrode active material having a high capacity and high cycle durability can be provided.

As mentioned above, M is at least one metal selected from the group consisting of V, Sn, Al, C and the combinations of these. Hence, a description is individually made of Si alloys, which are $Si_xZn_yV_zA_a$, $Si_xZn_ySn_zA_a$, $Si_xZn_yAl_zA_a$ and $Si_xZn_yC_zA_a$.

(Si Alloy Represented by $Si_xZn_yV_zA_a$)

As mentioned above, Zn as the first additional element and V as the second additional element are selected, whereby the above-described $Si_xZn_yV_zA_a$ can suppress the amorphous-crystal phase transition and enhance the cycle lifetime in the event of the Li alloying. Moreover, in such a way, the negative electrode active material in this embodiment obtains the higher capacity than the conventional negative electrode active material, for example, the carbon-based negative electrode active material.

In the above-described composition of the alloy, preferably, x is 33 to 50 or more, y is more than 0 to 46 or less, and z is 21 to 67. Note that these numeric value ranges correspond to a range indicated by reference symbol A of FIG. 3. Then, this Si alloy negative electrode active material is used for the negative electrode of the electrical device, for example, the negative electrode of the lithium ion secondary battery. In this case, the alloy contained in the above-described negative electrode active material absorbs the lithium ions in an event where the battery is charged, and emits the lithium ions in an event where the battery is discharged.

More specifically, the above-described negative electrode active material is the Si alloy negative electrode active material, to which zinc (Zn) as the first additional element and vanadium (V) as the second additional element are added. Then, Zn as the first additional element and V as the second additional element are appropriately selected, whereby, in an event where the Si alloy negative electrode active material is alloyed with lithium, the amorphous-crystal phase transition is suppressed, and the cycle lifetime can be enhanced. Moreover, in such a way, a higher capacity than in the carbon-based negative electrode active material can be achieved. Then, composition ranges of Zn and V as the first and second additional elements are individually optimized, whereby a negative electrode active material of a Si (Si—Zn—V-based) alloy provided with a good cycle lifetime even after 50 cycles can be obtained.

At this time, in the above-described negative electrode active material composed of the Si—Zn—V-based alloy, in a case where the above-described x is 33 or more, the above-described y is more than 0, and the above-described z is 67 or less, then the initial capacity can be ensured sufficiently. Moreover, in a case where the above-described x is 50 or less, the above-described y is 46 or less, and the above-described z is 21 or more, then the good cycle lifetime can be exerted.

Note that, from a viewpoint of further improving the above-described characteristics of the negative electrode active material concerned, more desirably, the above-described x is within a range of 33 to 47, the above-described y is within a range of 11 to 27, and the above-described z is within a range of 33 to 56. Note that these numeric value ranges corresponding to a range indicated by reference symbol B of FIG. 4.

Note that, as mentioned above, A is the impurities (inevitable impurities), which are derived from the raw materials and the manufacturing method and are other than the above-described three components, and the above-described a ranges as 0≤a<0.5, and preferably, ranges as 0≤a<0.1.

(Si Alloy Represented by $Si_xZn_ySn_zA_a$)

As mentioned above, Zn as the first additional element and Sn as the second additional element are selected, whereby the above-described $Si_xZn_ySn_zA_a$ can suppress the amorphous-crystal phase transition and enhance the cycle lifetime in the event of the Li alloying. Moreover, in such a way, the negative electrode active material in this embodiment obtains the higher capacity than the conventional negative electrode active material, for example, the carbon-based negative electrode active material.

In a composition of the above-described alloy, preferably, x is more than 23 to less than 64, y is more than 0 to less than 65, and z is 4 or more to 58 or less. Note that these numeric value ranges correspond to a range indicated by reference symbol X of FIG. 5. Then, this Si alloy negative electrode active material is used for the negative electrode of the electrical device, for example, the negative electrode of the lithium ion secondary battery. In this case, the alloy contained in the above-described negative electrode active material absorbs the lithium ions in the event where the battery is charged, and emits the lithium ions in the event where the battery is discharged.

More specifically, the above-described negative electrode active material is the Si alloy negative electrode active material, to which zinc (Zn) as the first additional element and tin (Sn) as the second additional element are added. Then, Zn as the first additional element and Sn as the second additional element are appropriately selected, whereby, the event where the Si alloy negative electrode active material is alloyed with lithium, the amorphous-crystal phase transition is suppressed, and the cycle lifetime can be enhanced. Moreover, in such a way, a higher capacity than in the carbon-based negative electrode active material can be achieved.

Then, composition ranges of Zn and Sn as the first and second additional elements are individually optimized, whereby a negative electrode active material of a Si (Si—Zn—Sn-based) alloy provided with a good cycle lifetime even after 50 cycles and 100 cycles can be obtained.

At this time, in the above-described negative electrode active material composed of the Si—Zn—Sn-based alloy, in a case where the above-described x exceeds 23, then such a first-cycle discharge capacity can be ensured sufficiently. Moreover, in a case where z is 4 or more, a good discharge capacity retention rate in the 50th cycle can be ensured sufficiently. If the above-described x, y and z stay with the above-described composition ranges, then the cycle durability is enhanced, and a discharge capacity retention rate (for example, 50% or more) in the 100th cycle can be ensured sufficiently.

Figure 6:
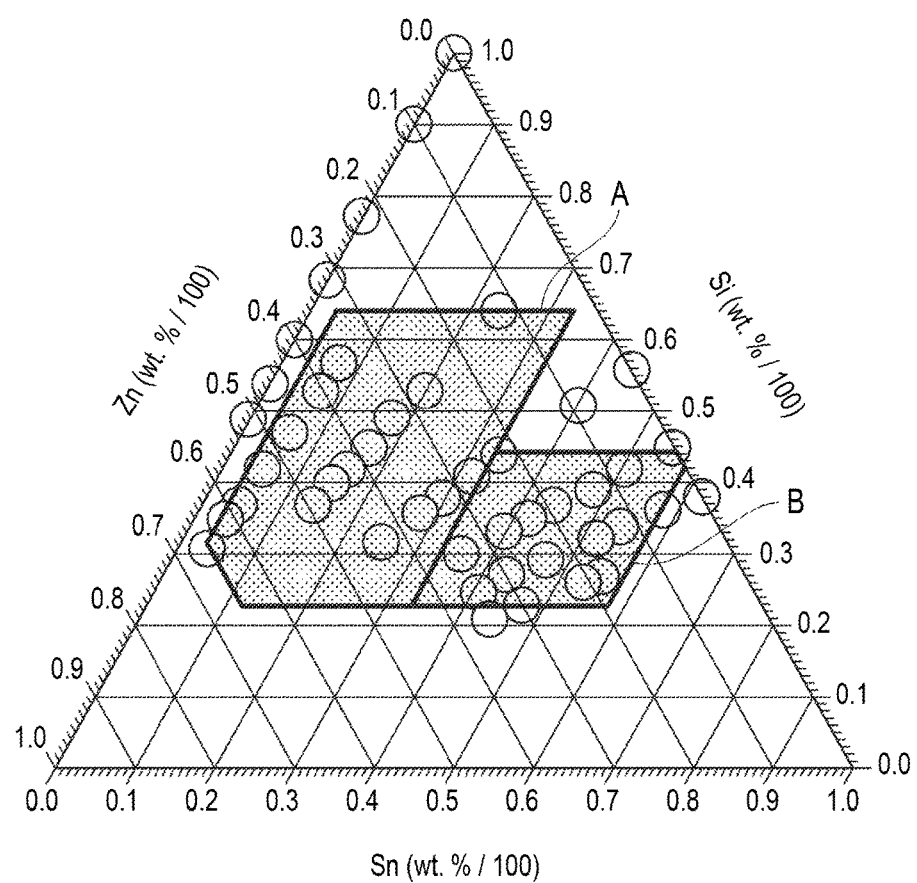
FIG. 6 is a ternary composition diagram showing a suitable composition range of the Si—Zn—Sn-based alloy that composes the negative electrode active material contained in the negative electrode for an electrical device according to the present invention.
Figure 7:
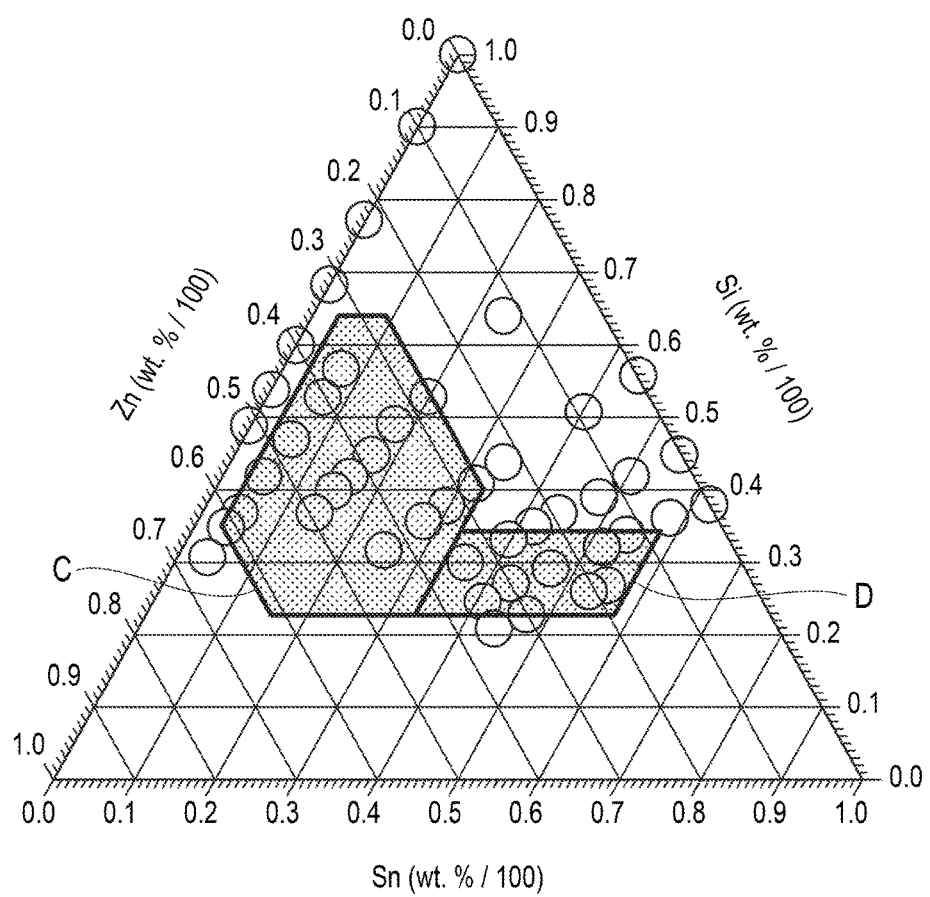
FIG. 7 is a ternary composition diagram showing a more suitable composition range of the Si—Zn—Sn-based alloy that composes the negative electrode active material contained in the negative electrode for an electrical device according to the present invention.

Note that, from a viewpoint of further enhancing the above-described characteristics of the Si alloy negative electrode active material, preferably, the above-described composition of the alloy is set within a range shown in reference symbol A of FIG. 6, which is indicated by $23<x<64$, $2<y<65$, and $4\leq z<34$. Moreover, desirably, the composition of the alloy is set within a range shown by reference symbol B of FIG. 6, which satisfies $23<x<44$, $0<y<43$, and $34<z<58$. In such a way, as shown in Table 2, discharge capacity retention rates, which are 92% or more after 50 cycles, and exceed 55% after 100 cycles, can be obtained. The, from a viewpoint of ensuring better cycle characteristics, desirably, the composition of the alloy is set within a range shown by reference symbol C of FIG. 7, which satisfies $23<x<64$, $27<y<61$, and $4<z<34$. Moreover, desirably, the composition of the alloy is set within a range shown by reference symbol D of FIG. 7, which satisfies $3<x<34$, $8<y<43$, and $34<z<58$. In such a way, the cycle durability is enhanced, and as shown in Table 2, a discharge capacity retention rate exceeding 65% after 100 cycles can be obtained.

Figure 8:
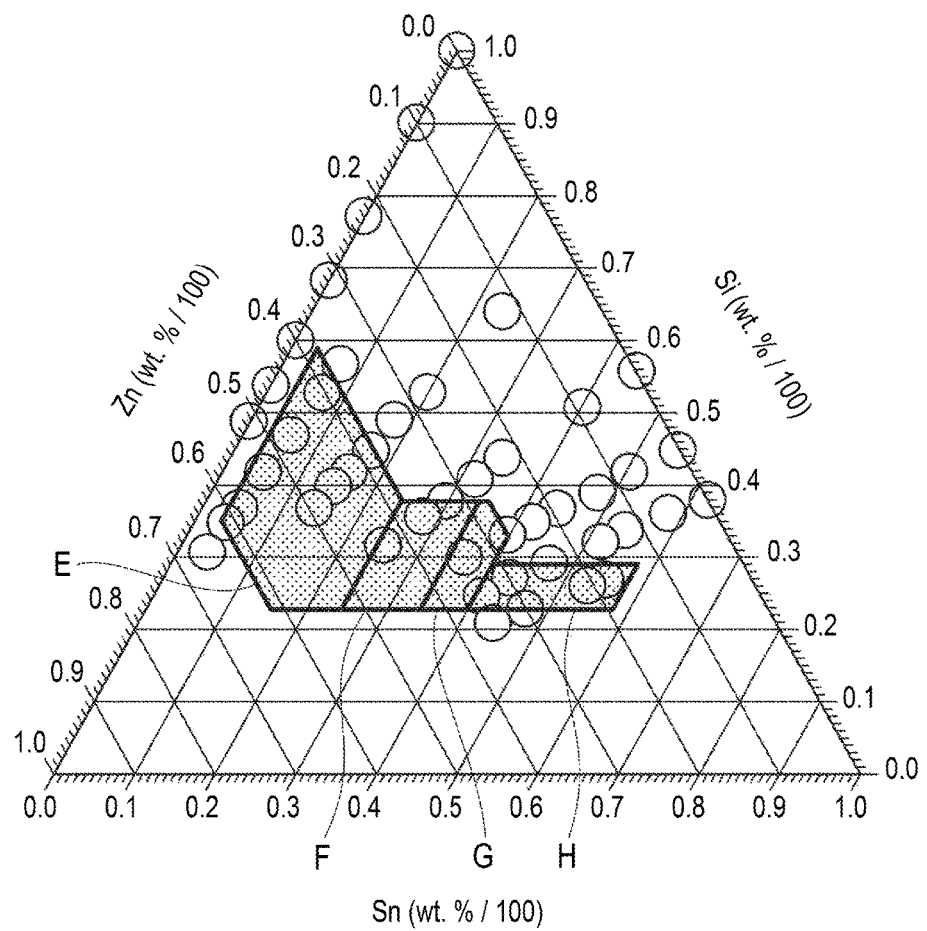
FIG. 8 is a ternary composition diagram showing a still more suitable composition range of the Si—Zn—Sn-based alloy that composes the negative electrode active material contained in the negative electrode for an electrical device according to the present invention.

Moreover, desirably, the composition of the alloy is set within a range shown by reference symbol E of FIG. 8, which satisfies $23<x<58$, $38<y<61$, and $4<z<24$, a range shown by reference symbol F of FIG. 8, which satisfies $23<x<38$, $27<y<53$, and $24\leq z<35$, a range shown by reference symbol G of FIG. 8, which satisfies $23<x<38$, $27<y<44$, and $35<z<40$, or a range shown by reference symbol H of FIG. 8, which satisfies $23<x<29$, $13<y<37$, and $40\leq z<58$. In such a way, the cycle durability is enhanced, and as shown in Table 2, a discharge capacity retention rate exceeding 75% after 100 cycles can be obtained.

Note that the above-described a ranges preferably as $0\leq a<0.5$, and preferably, ranges as $0\leq a<0.1$.

(Si Alloy Represented by $Si_xZn_yAl_zA_a$)

As mentioned above, Zn as the first additional element and Al as the second additional element are selected, whereby the above-described $Si_xZn_yAl_zA_a$ can suppress the amorphous-crystal phase transition and enhance the cycle lifetime in the event of the Li alloying. Moreover, in such a way, the negative electrode active material in this embodiment obtains the higher capacity than the conventional negative electrode active material, for example, the carbon-based negative electrode active material.

Figure 14:
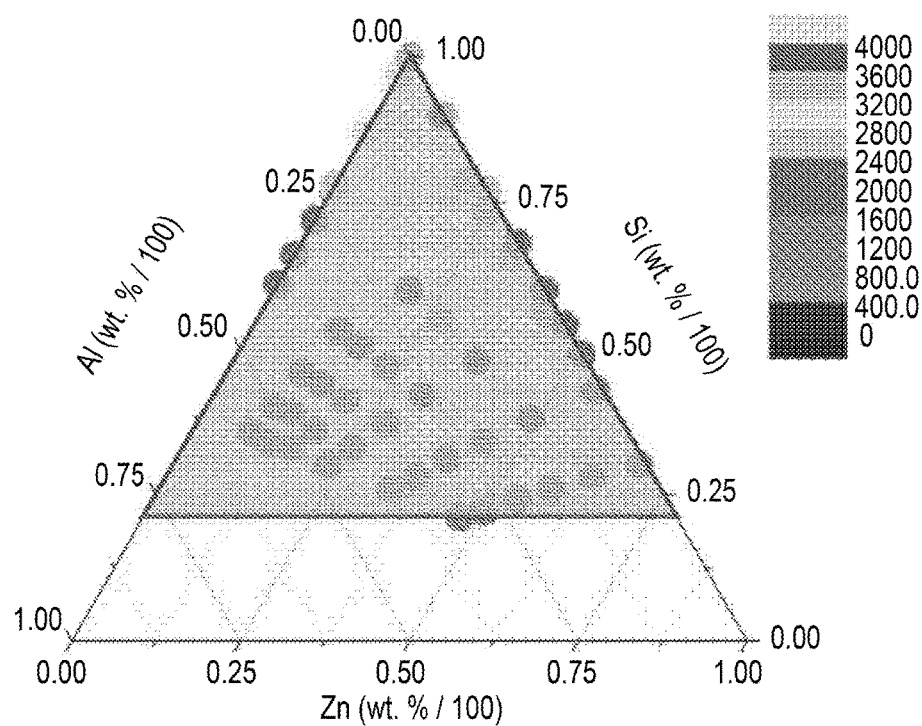
FIG. 14 is a diagram in which, in the composition diagram of the ternary Si—Zn—Al-based alloy in FIG. 12, a composition range of Si—Zn—Al alloy samples in Reference example C is color-coded (shaded) and surrounded, where $0.21 \leq Si$ (wt %/100)<1.00, $0 < Zn$ (wt %/100)<0.79, and $0 < Al$ (wt %/100)<0.79.

In the above-described composition of the alloy, preferably, the above-described x, y and z are set as $21\leq x<100$, $0<y<79$, and $0<z<79$. In this embodiment having the composition range of the alloy, in the event of the Li alloying, the first additional element Zn, which suppresses the amorphous-crystal phase transition and enhances the cycle lifetime, and the second additional element type Al, in which the capacity as the electrode is not decreased even if the concentration of the first additional element is increased, are selected, and these additional element types and the high capacity element Si are mixed with each other in an appropriate composition ratio. A reason why the amorphous-crystal phase transition is suppressed here in the event of the Li alloying is as follows. In the event where Si and Li are alloyed with each other, the Si material makes transition from an amorphous state to a crystal state and causes a large volume change (approximately four times), and accordingly, particles thereof are broken and such a function as the active material is lost. Therefore, amorphous-crystal phase transition is suppressed, whereby the breakage of the particles is suppressed, the function (high capacity) as the active material can be held, and the cycle lifetime can also be enhanced. Such first and second additional elements are selected, and these additional element types and the high capacity element Si are mixed with each other in the appropriate composition ratio, whereby the Si-alloy negative electrode active material having a high capacity and high cycle durability can be provided. Specifically, if the composition ratio of the Si—Zn—Al alloy is within the above-described range, that is, within a range (inside of a triangle) surrounded by a bold solid line of FIG. 14, then a remarkably high capacity increase, which is unrealizable by the existing carbon-based negative electrode active material, can be realized. In a similar way, a higher capacity (initial capacity of 824 mAh/g or more) in comparison with the existing Sn-based alloy negative electrode active material can be realized. Moreover, also with regard to the cycle durability in a tradeoff relationship with the capacity increase, remarkably superior cycle durability can be realized in a case of being compared with the Sn-based negative electrode active material inferior in cycle durability though the capacity thereof is high and with the multinary alloy negative electrode active material described in Patent Literature 1. In particular, a high improvement of the discharge capacity in the 50th cycle can be realized. In such a way, an excellent Si alloy negative electrode active material can be provided.

Preferably, an embodiment is characterized in that the above-described x, y and z are set as 26≤x≤78, 16≤y≤69, and 0<z≤51. As described above, in a case where the composition ratio of Zn as the first additional element and Al as the second additional element, and further the high capacity element Si are in the appropriate range regulated above, such a Si alloy negative electrode active material having good characteristics can be provided. Specifically, also in such a case where the composition ratio of the Si—Zn—Al alloy is within a range (inside of a hexagon of FIG. 15) surrounded by the bold solid line of FIG. 15, then the remarkably high capacity increase, which is unrealizable by the existing carbon-based negative electrode active material, can be realized. In a similar way, a higher capacity (initial capacity of 824 mAh/g or more) in comparison with the existing Sn-based alloy negative electrode active material can be realized. Moreover, also with regard to the cycle durability in a tradeoff relationship with the capacity increase, remarkably superior cycle durability can be realized in a case of being compared with the Sn-based negative electrode active material inferior in cycle durability though the capacity thereof is high and with the multinary alloy negative electrode active material described in Patent Literature 1. That is to say, in this case, from among such composition ranges in which the capacity increase was able to be specifically realized in Samples 1 to 35 of Reference example C, a composition range is selected, in which the remarkably superior cycle durability was able to be realized in the case of being compared with the Sn-based negative electrode active material and the multinary alloy negative electrode active material described in Patent Literature 1. Specifically, a composition range, in which a high discharge capacity retention rate of 85% or more in the 50th cycle was able to be realized, is selected (formed into a hexagon surrounded by the bold solid line of FIG. 15), and an excellent Si alloy negative electrode active material having a good balance between the capacity increase and the cycle durability can be provided (refer to Table 3 and FIG. 15).

More preferably, an embodiment is characterized in that the above-described x, y and z are set as 26≤x≤66, 16≤y≤69, and 2≤z≤51. In this embodiment, in a case where the composition ratio of Zn as the first additional element and Al as the second additional element, and further the high capacity element Si are in the appropriate range regulated above, such a Si alloy negative electrode active material having extremely good characteristics can be provided. Specifically, also in such a case where the composition ratio of the Si—Zn—Al alloy is within a range (inside of a small hexagon) surrounded by a bold solid line of FIG. 16, then the remarkably high capacity increase, which is unrealizable by the existing carbon-based negative electrode active material, can be realized. In a similar way, a higher capacity (initial capacity of 1072 mAh/g or more) in comparison with the existing Sn-based alloy negative electrode active material can be realized. Moreover, also with regard to the cycle durability in the tradeoff relationship with the capacity increase, the remarkably superior cycle durability can be realized in the case of being compared with the Sn-based negative electrode active material inferior in cycle durability though the capacity thereof is high and with the multinary alloy negative electrode active material described in Patent Literature 1. Specifically, a high discharge capacity retention rate of 90% or more in the 50th cycle can be realized. That is to say, in this case, only a composition range, in which the capacity increase and the high cycle durability were able to be specifically realized with an extremely good balance, is selected from Samples 1 to 35 of Reference example C (formed into a hexagon surrounded by the bold solid line of FIG. 16). In such a way, a high-performance Si alloy negative electrode active material can be provided (refer to Table 3 and FIG. 16).

Particularly preferably, an embodiment is characterized in that the above-described x, y and z are set as 26≤x≤47, 18≤y≤44, and 22≤z≤46. In this embodiment, in a case where the composition ratio of Zn as the first additional element and Al as the second additional element, and further the high capacity element Si are in the appropriate range regulated above, such a Si alloy negative electrode active material having best characteristics can be provided. Specifically, also in such a case where the composition ratio of the Si—Zn—Al alloy is within a range (formed into an inside of a smallest hexagon) surrounded by a bold solid line of FIG. 17, then the remarkably high capacity increase, which is unrealizable by the existing carbon-based negative electrode active material, can be realized. In a similar way, a higher capacity (initial capacity of 1072 mAh/g or more) in comparison with the existing Sn-based alloy negative electrode active material can be realized. Moreover, also with regard to the cycle durability in the tradeoff relationship with the capacity increase, the remarkably superior cycle durability can be realized in the case of being compared with the Sn-based negative electrode active material inferior in cycle durability though the capacity thereof is high and with the multinary alloy negative electrode active material described in Patent Literature 1. Specifically, a higher discharge capacity retention rate of 95% or more in the 50th cycle can be realized. That is to say, in this case, only a composition range (best mode), in which the capacity increase and the high cycle durability were able to be realized with a best balance, is selected from among Samples 1 to 35 of Reference example C (formed into a smallest hexagon surrounded by the hold solid line of FIG. 17). In such a way, an extremely high-performance Si alloy negative electrode active material can be provided (refer to Table 3 and FIG. 17). Meanwhile, in a binary alloy (Si—Al alloy with y=0 or Si—Zn-based alloy with z=0), which does not contain either of the additional metal elements to Si in the ternary alloy represented by $Si_xZn_yAl_zA_a$, and in Si as a single component, it is difficult to maintain the high cycle characteristics, and in particular, the high discharge capacity retention rate in the 50th cycle. Therefore, the cycle characteristics are lowered (deteriorated), and accordingly, the best-balance realization of the capacity increase and the cycle durability, which are described above, has not been achieved.

Figure 4:
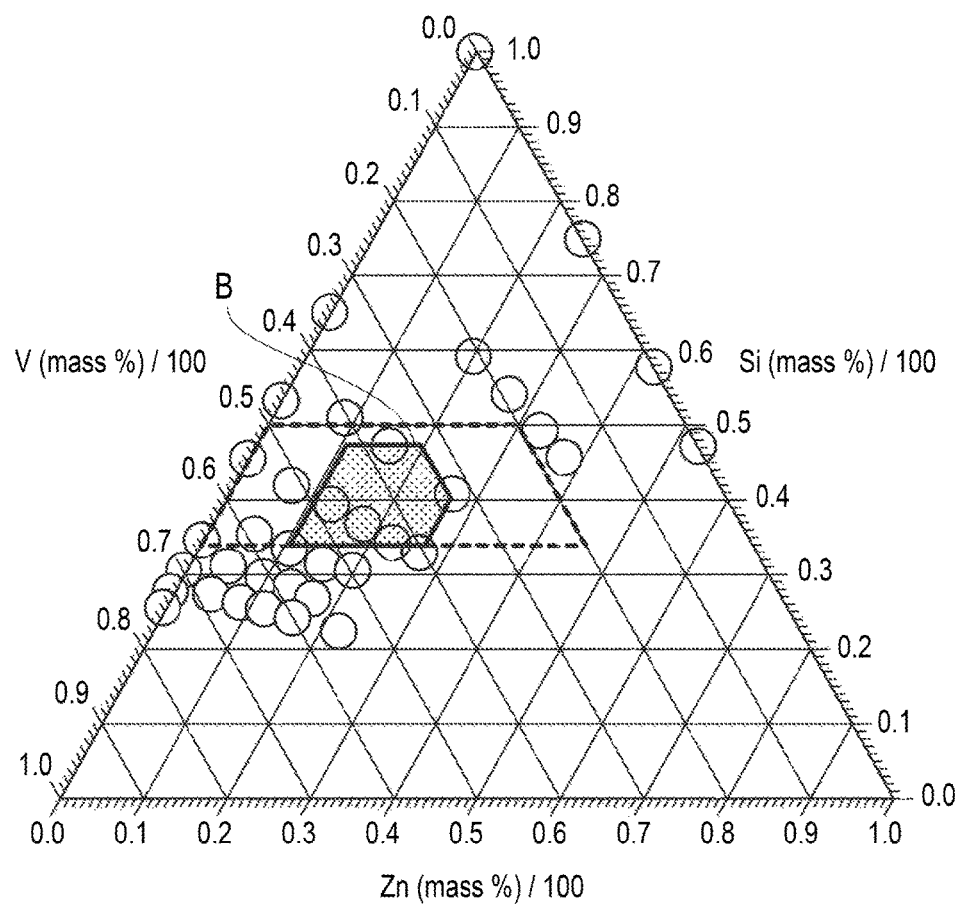
FIG. 4 is a ternary composition diagram showing a suitable composition range of the Si—Zn—V-based alloy that composes the negative electrode active material contained in the negative electrode for an electrical device according to the present invention.

Specifically, in a prepared state (uncharged state), the Si—Zn—Al-based Si alloy negative electrode active material according to this embodiment is a ternary amorphous alloy represented by composition formula $Si_xZn_yAl_zA_a$ having the above-described appropriate composition ratio. Then, the lithium ion secondary battery using the above-described Si—Zn—Al-based Si alloy negative electrode active material has prominent characteristics of being capable of suppressing, also in the event where Si and Li are alloyed with each other, such a Si—Li alloy from making transition from the amorphous state to the crystal state and causing a large volume change by the charge/discharge. Moreover, in a case of using the other ternary alloys represented by $Si_xM_yAl_z$ in Patent Literature 1 and using the quaternary alloys therein, it is also difficult to maintain the high cycle characteristics, and in particular, the high discharge capacity retention rate in the 50th cycle, and accordingly, such a large problem that the cycle characteristics are rapidly lowered (deteriorated) occurs. That is to say, in each of the ternary and quaternary alloys in Patent Literature 1, an initial capacity (first-cycle discharge capacity) is remarkably high in comparison with the existing carbon-based negative electrode active material (theoretical capacity of 372 mAh/g), and is also high in comparison with the Sn-based negative electrode active material (theoretical capacity of approximately 600 to 700 mAh/g). However, in a case of being compared with the 50th-cycle discharge capacity retention rate (approximately 60%) of the Sn-based negative electrode active material capable of increasing the capacity to approximately 600 to 700 mAh/g, cycle characteristics of the ternary and quaternary alloys are extremely poor, and cannot be said to be sufficient. That is to say, the balance between the capacity increase and the cycle durability, which are in the tradeoff relationship, are poor, and it is impossible to put the ternary and quaternary alloys into practical use. Specifically, in the illustration of FIG. 2 of Patent Literature 1, the quaternary alloy of $Si_{62}Al_{18}Fe_{16}Zr_4$ in Example 1 of Patent Literature 1 has an initial capacity as high as approximately 1150 mAh/g; however, only has approximately 1090 mAh/g as a circulation capacity after only 5 to 6 cycles. That is to say, in Example 1 of Patent Literature 1, it is illustrated that the discharge capacity retention rate in the 5th or 6th cycle is largely lowered to approximately 95%, and that the discharge capacity retention rate is lowered by substantially 1% per cycle. In view of this fact, it is assumed that the discharge capacity retention rate is lowered by approximately 50% in the 50th cycle (that is, the discharge capacity retention rate is lowered to approximately 50%). In a similar way, though the ternary alloy $Si_{55}Al_{29.3}Fe_{15.7}$ of Example 2 of Patent Literature 1 has the high capacity of approximately 1430 mAh/g as the initial capacity as indicated by FIG. 4, it is illustrated by FIG. 4 of Patent Literature 1 that the circulation capacity after only 5 to 6 cycles is largely lowered to approximately 1300 mAh/g. That is to say, in Example 2 of Patent Literature 1, it is illustrated that the discharge capacity retention rate in the 5th or 6th cycle is rapidly lowered to approximately 90%, and that the discharge capacity retention rate is lowered by substantially 2% per cycle. In view of this fact, it is assumed that the discharge capacity retention rate is lowered by approximately 100% in the 50th cycle (that is, the discharge capacity retention rate is lowered to substantially 0%). Though there is no description of the initial capacity in each of the quaternary alloy $Si_{60}Al_{20}Fe_{12}Ti_8$ of Example 3 of Patent Literature 1 and the quaternary alloy $Si_{62}Al_{16}Fe_{14}Ti_8$ of Example 4 of Patent Literature 1, it is indicated by Table 2 of Patent Literature 1 that the circulation capacity after only 5 to 6 cycles is lowered to as low as 700 to 1200 mAh/g. The discharge capacity retention rate in the 5th or 6th cycle of Example 3 of Patent Literature 1 is equal to or less than those of Examples 1 and 2, and the discharge capacity retention rate in the 50th cycle is substantially lowered by 50% to 100% (that is, it is assumed that the discharge capacity retention rate is lowered to about 50% to 0%). Note that the alloy compositions of Patent Literature 1 are described by using atomic ratio, and it can be said that the alloy composition in which Fe is the first additive element is disclosed since approximately 20 mass % of Fe is contained in Examples of Patent Literature 1 when the atomic ratio is converted into the mass ratio as in this embodiment.

Figure 12:
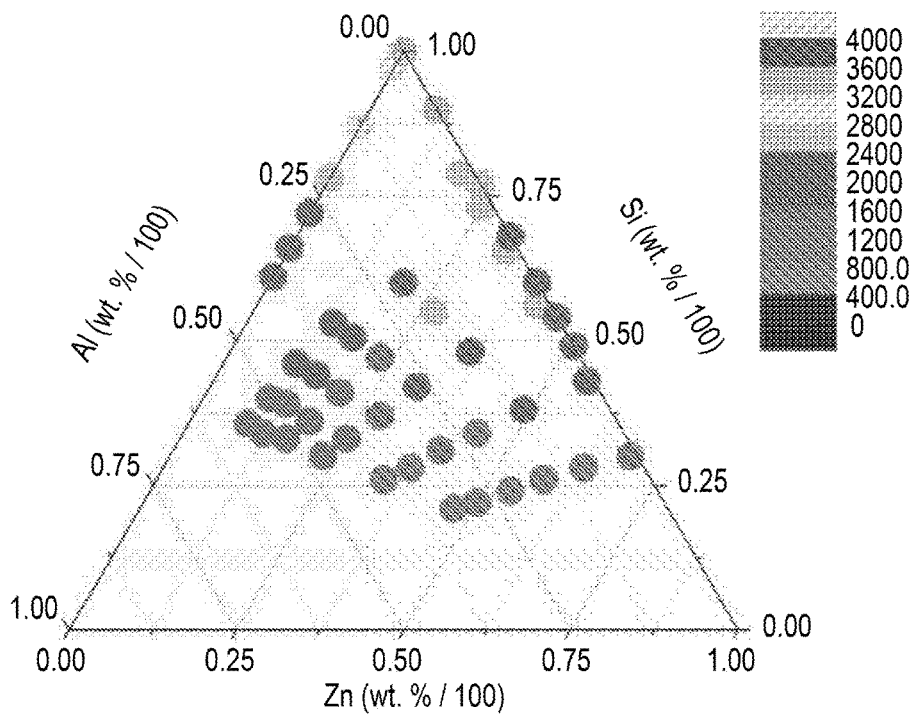
FIG. 12 is a composition diagram of ternary Si—Zn—Al-based alloys, in which first-cycle discharge capacities (mAhg) of batteries using respective samples (sample numbers 1 to 48) prepared in Reference example C are color-coded (shaded) and plotted by sizes of capacities.
Figure 13:
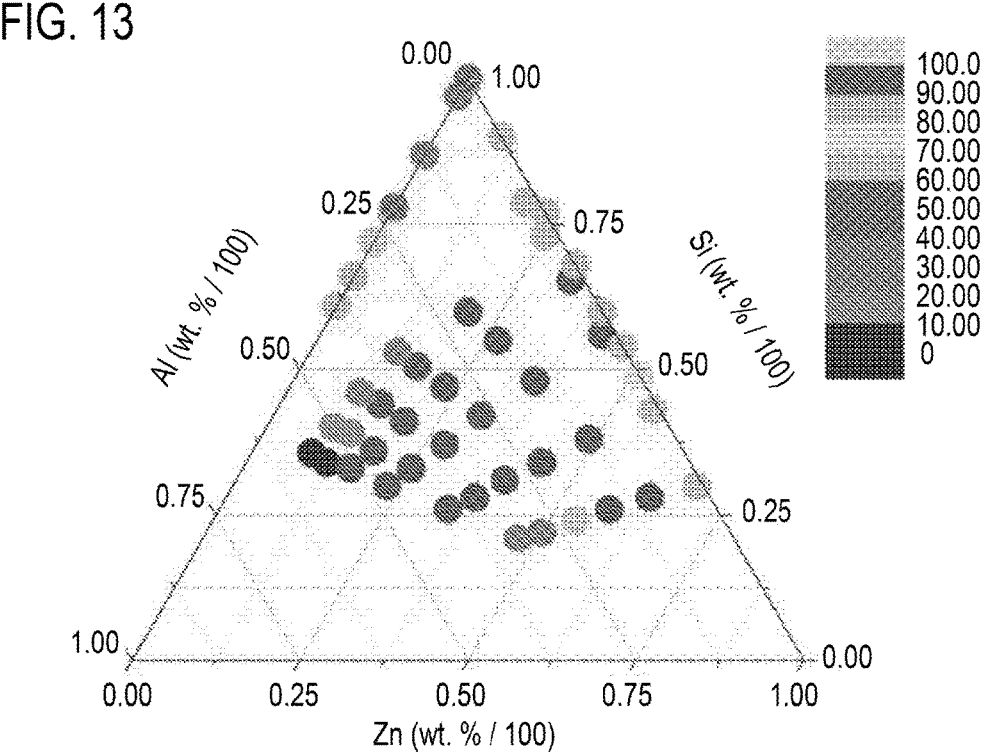
FIG. 13 is a composition diagram of the ternary Si—Zn—Al-based alloys, in which 50th-cycle discharge capacity retention rates (%) of the batteries using the respective samples (sample numbers 1 to 48) prepared in Reference example C are color-coded (shaded) and plotted by magnitudes of the discharge capacity retention rates.

Therefore, the batteries using the existing ternary and quaternary alloys described in Patent Literature 1, which are described above, have such problems in reliability and safety that cycle characteristics which satisfy a practical use level cannot be sufficiently obtained in a field where the cycle durability is strongly required as in the use in vehicles, and it is difficult to put these batteries in practical use. Meanwhile, the negative electrode active material using the ternary alloy represented by the composition formula $Si_xZn_yAl_zA_a$ having the above-described appropriate composition ratio has the high discharge capacity retention rate in the 50th cycle as the high cycle characteristics (refer to FIG. 13). Moreover, the initial capacity (discharge capacity in the 1st cycle) is also remarkably higher than those of the existing carbon-based negative electrode active materials and is also higher as compared to the existing Sn-based negative electrode active materials (refer to FIG. 12), and it is possible to provide the negative electrode active material exhibiting such well-balanced characteristics. That is to say, the negative electrode active martial using the alloy capable of achieving the high-level and well-balanced high capacity and cycle durability, which have not been realizable by the existing carbon-based and Sn-based negative electrode active materials and the ternary and quaternary alloys of Patent Literature 1 due to the trade-off relationship, is found. Specifically, it is found that it is possible to achieve the desired object by selecting two types which are Zn and Al from the group consisting of one or more additional elements having extremely various combinations, and by further selecting a specific composition ratio (composition range) of these additional element types and the high capacity element Si. As a result, the negative electrode active material in this embodiment is excellent in the point of being capable of providing a lithium ion secondary battery having high capacity and good cycle durability.

A description is made below in detail of the above-described Si—Zn—Al-based alloy negative electrode active material.

(1) Regarding Total Mass % Value of the Above-Described Alloy

The above-described Si—Zn—Al-based ally is an alloy represented by the composition formula $Si_xZn_yAl_zA_a$. Here, in the formula, A is the inevitable impurities. Moreover, in the formula, x, y, z and a represent values of mass %, where $0<x<100$, $0<y<100$, $0<z<100$ and $0 \leq a < 0.5$ are conditioned. Then, the total mass % value of the alloy having the above-described composition formula $Si_xZn_yAl_zA_a$, which is represented as x+y+z+a in the formula, is equal to 100 (x+y+z+a=100). That is to say, the negative electrode active material needs to be composed of the ternary Si—Zn—Al alloy. In other words, it can be said that the binary alloy, such a ternary alloy having the other composition, or such a quaternary or more alloy added with other metal are not contained. However, as described above, A in the formula, which is the inevitable impurities, may be contained in the range of $0 \leq a < 0.5$. Note that, in the negative electrode active material layer 15 of this embodiment, at least one type of alloy having the composition formula $Si_xZn_yAl_zA_a$ just needs to be contained, or two types or more of the alloys having different compositions may be used. Moreover, other negative electrode active materials such as a carbon-based material may be used in combination as long as the functions and effect of the present invention are not damaged.

(2) Regarding Mass % Value of Si in the Above-Described Alloy

The range of x in the above-described composition formula $Si_xZn_yAl_zA_a$, which is the mass % value of Si in the alloy having the formula, is preferably 21≤x<100, more preferably 26≤x≤78, still more preferably 26≤x≤66, particularly preferably 26≤x≤47 (refer to Table 3 and FIGS. 14 to 17). This is because the capacity can be increased as the numeric value of the mass % value (value of x) of the high capacity element Si in the alloy is higher, and if x stays within a preferable range of 21≤x<100, it is possible to realize the remarkably high capacity (824 mAh/g or more) unrealizable by the existing carbon-based negative electrode active materials. Reasons for the above continue below. In a similar way, an alloy with a high capacity as compared to the Sn-based negative electrode active material can be obtained (refer FIG. 14). Moreover, if the range is 21≤x<100, then the alloy is excellent also in the 50th-cycle discharge capacity retention rate (cycle durability).

As the mass % value (value of x) of the high capacity element Si in the alloy, from a viewpoint of providing the negative electrode active material that exhibits the well-balanced characteristics having the high initial capacity while maintaining the high cycle characteristics (particularly, high discharge capacity retention rate in the 50th cycle), more preferably, a range of 26≤x≤78 is more desirable. In addition, in a case where the composition ratio of Zn as the first additional element to be described later and Al as the second additional element to be described later is appropriate, then the Si alloy negative electrode active material having good characteristics (characteristics excellent in the capacity increase and the cycle durability, which have been in the tradeoff relationship in the existing alloy-based negative electrode active material) can be realized. That is to say, while the cycle durability tends to be lowered though the capacity can be increased as the numeric value of the mass % value (value of x) of the high capacity element Si in the alloy is higher, if the value of x is within the range of 26≤x≤78, then this is more preferable since the capacity can be increased (1072 mAh/g or more), and in addition, the high discharge capacity retention rate (85% or more) can be maintained (refer to Table 3 and to FIG. 15).

As the mass % value (value of x) of the high capacity element Si in the alloy, from a viewpoint of providing the negative electrode active material that exhibits the well-balanced characteristics having the high initial capacity while maintaining the higher cycle characteristics (higher discharge capacity retention rate), still more preferably, it can be said that a range of 26≤x≤66 is still more desirable. In addition, in a case where the composition ratio of Zn as the first additional element to be described later and Al as the second additional element to be described later is more appropriate, then the Si alloy negative electrode active material having better characteristics can be provided (refer to Table 3 and an inside surrounded by the bold solid line of FIG. 16). That is to say, if the value of x is within the still more preferable range of 26≤x≤66, then the alloy is more excellent in the point of being capable of increasing the capacity (1072 mAh/g or more), and in addition, maintaining the higher discharge capacity retention rate (90% or more) in the 50th cycle (refer to Table 3 and the inside surrounded by the bold solid line of FIG. 16).

As the mass % value (value of x) of the high capacity element Si in the alloy, from a viewpoint of providing the negative electrode active material that exhibits the well-balanced characteristics having the high initial capacity while maintaining the particularly high cycle characteristics (particularly high discharge capacity retention rate), particularly preferably, it can be said that a range of 26≤x≤47 is particularly desirable. In addition, in a case where the composition ratio of Zn as the first additional element to be described later and Al as the second additional element to be described later is more appropriate, then the high-performance Si alloy negative electrode active material having best characteristics can be provided (refer to Table 3 and an inside surrounded by the bold solid line of FIG. 17). That is to say, if the value of x is within the particularly preferable range of 26≤x≤47, then the alloy is particularly excellent in the point of being capable of increasing the capacity (1072 mAh/g or more), and in addition, maintaining the particularly high discharge capacity retention rate (95% or more) in the 50th cycle (refer to Table 3 and the inside surrounded by the bold solid line of FIG. 17). Meanwhile, in comparison with the ternary alloy represented by $Si_xZn_yAl_zA_a$, the binary alloy (Si—Al alloy with y=0 or Si—Zn-based alloy with z=0), which does not contain either of the additional metal elements to Si, cannot maintain the high cycle characteristics. In particular, the binary alloy cannot sufficiently ensure the high discharge capacity retention rate in the 50th cycle, resulting in that the cycle characteristics are lowered (deteriorated). Therefore, best-balance realization of the particularly high discharge capacity retention rate in the 50th cycle together with the above-described high capacity has not been achieved. Moreover, in the case of x=100 (in the case of pure Si that never contains the additional metal elements Zn and Al to Si), the capacity and the cycle durability are in the tradeoff relationship, and it is extremely difficult to enhance the high cycle durability while exhibiting the high capacity. That is to say, Si as the high capacity element is only used, and accordingly, though the highest capacity is achieved, the deterioration as the negative electrode active material is significant due to the expansion/contraction phenomenon of Si, which follows the charge/discharge, and only the worst and remarkably low discharge capacity retention rate is obtained. Therefore, the best-balance realization of the particularly high discharge capacity retention rate in the 50th cycle together with the above-described capacity increase has not been achieved.

Figure 15:
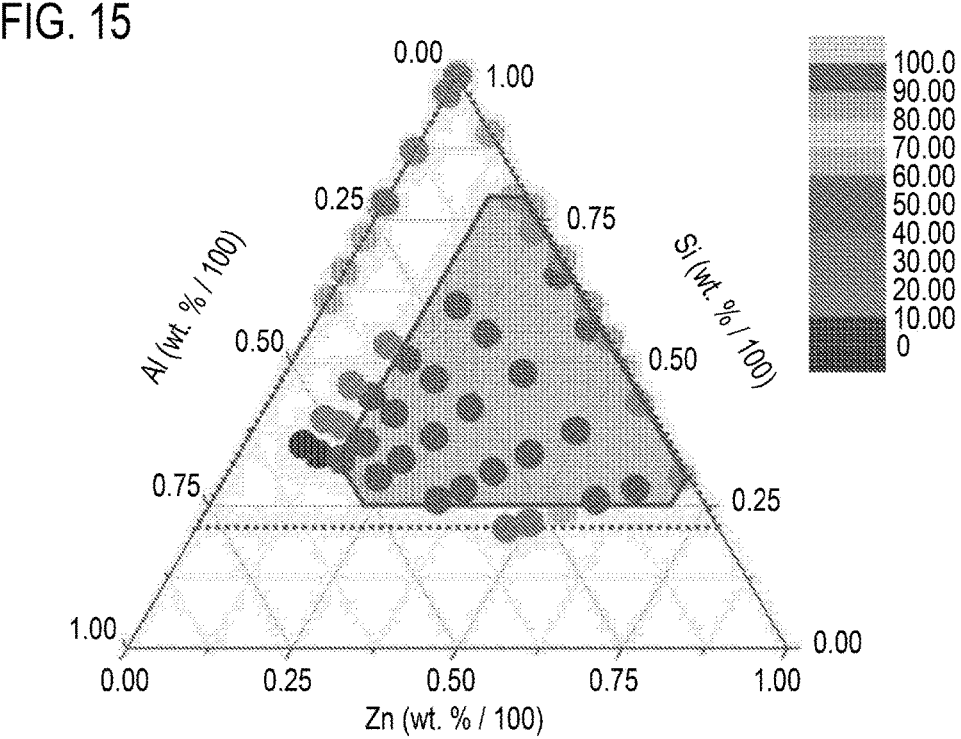
FIG. 15 is a diagram in which a preferable composition range of the ternary Si—Zn—Al-based alloy samples of Reference example C in the composition diagram of the Si—Zn—Al-based alloys in FIG. 13 is color-coded (shaded) and surrounded, where $0.26 \leq Si$ (wt %/100)$\leq 0.78$, $0.16 \leq Zn$ (wt %/100)$\leq 0.69$, and $0 < Al$ (wt %/100)$\leq 0.51$.
Figure 16:
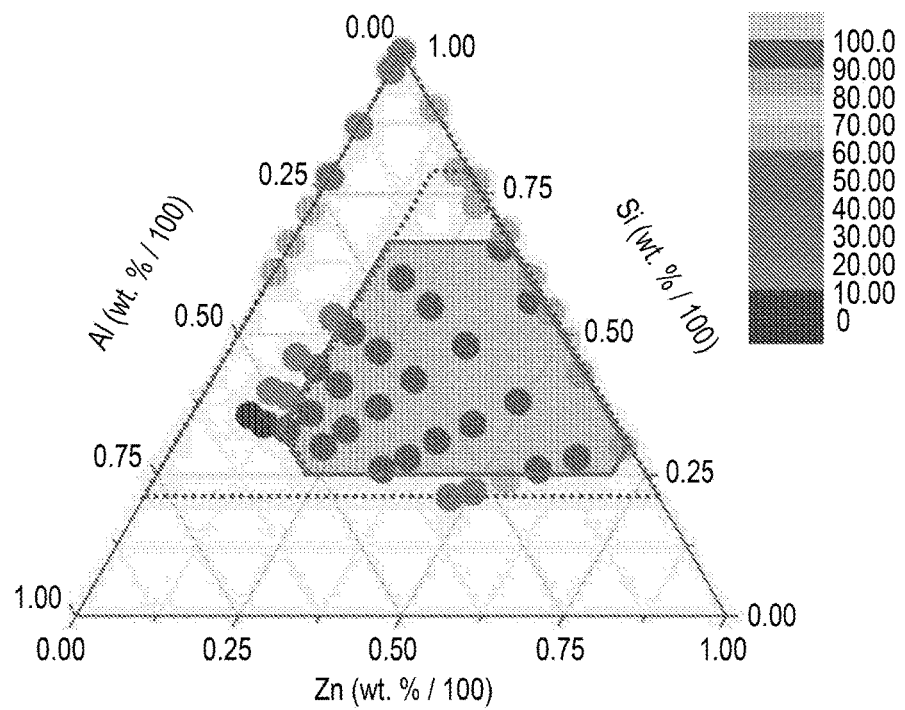
FIG. 16 is a diagram in which a more preferable composition range of the ternary Si—Zn—Al-based alloy samples of Reference example C in the composition diagram of the Si—Zn—Al-based alloys in FIG. 13 is color-coded (shaded) and surrounded, where $0.26 \leq Si$ (wt %/100)$\leq 0.66$, $0.16 \leq Zn$ (wt %/100)$\leq 0.69$, and $0.02 \leq Al$ (wt %/100)$\leq 0.51$.
Figure 17:
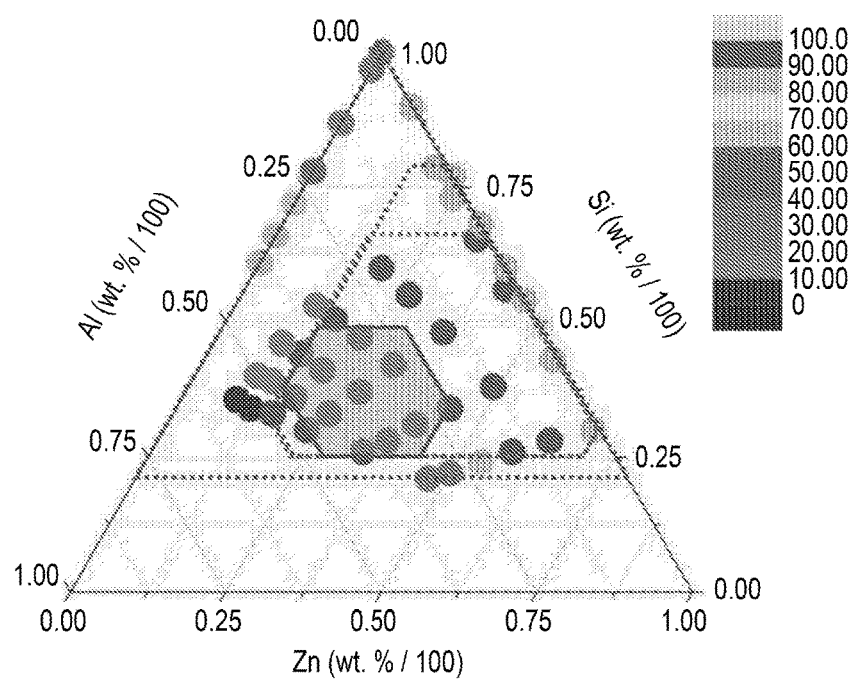
FIG. 17 is a diagram in which a particularly preferable composition range of the ternary Si—Zn—Al-based alloy samples of Reference example C in the composition diagram of the Si—Zn—Al-based alloys in FIG. 13 is color-coded (shaded) and surrounded, where $0.26 \leq Si$ (wt %/100)$\leq 0.47$, $0.18 \leq Zn$ (wt %/100)$\leq 0.44$, and $0.22 \leq Al$ (wt %/100)$\leq 0.46$.

Here, in the case of x≥26, it is possible to achieve a range within which a content ratio (balance) among the Si material having an initial capacity of no less than 3200 mAh/g, Zn as the first additional element, and Al as the second additional element is optimum (refer to the range surrounded by the bold solid line in each of FIGS. 15 to 17). Therefore, the negative electrode active material in this embodiment is excellent in the points of being capable of developing best characteristics, and of maintaining such a capacity increase with a level of usage for the vehicle stably and safely for a long period. Meanwhile, in the case of x≤78, particularly x≤66, and especially x≤47, the content ratio (balance) among the high capacity Si material having an initial capacity of no less than 3200 mAh/g, Zn as the first additional element and Al as the second additional element can take the optimum range (refer to the range surrounded by the bold solid line in each of FIGS. 15 to 17). Therefore, in an event of alloying Si ad Li, the amorphous-crystal phase transition can be remarkably suppressed, and the cycle lifetime can be enhanced largely. That is to say, as the discharge capacity retention rate in the 50th cycle, 85% or more, particularly 90% or more, and especially 95% or more can be realized. However, even if x goes out of the above-described optimum range (26≤x≤78, particularly 26≤x≤66, and especially 26≤x≤47), if x stays within a range within which the above-described functions and effects of this embodiment can be developed effectively, then, needless to say, this range of x is incorporated in the technical scope (scope of the right) of the present invention.

Moreover, in Examples of Patent Literature 1 described above, it is disclosed that a deterioration phenomenon of the cycle characteristics, which is caused by considerable lowering of the capacity, is already observed in only approximately 5 to 6 cycles. That is to say, in Examples of Patent Literature 1, the discharge capacity retention rate in the 5th or 6th cycle is already lowered to 90 to 95%, and the discharge capacity retention rate in the 50th cycle will be lowered to approximately 50 to 0%. Meanwhile, in the above-described Si-based alloy, (only one way of) such combinations of the first additional element Zn and the second additional element Al, which are to be added to the high capacity Si material and have a mutually complementary relationship, is able to be selected through so-called many trials and errors, and in addition, through excessive experiments using combinations of a variety of additional (metal and nonmetal) elements. Then, in the combinations, the content of the high capacity Si material is further set within the optimum range described above, whereby the negative electrode active material in this embodiment is also excellent in the point of being capable of largely reducing the decrease of the discharge capacity retention rate in the 50th cycle as well as achieving the capacity increase. That is to say, in the event of alloying Si and Li, the transition from the amorphous state to the crystal state can be suppressed due to a remarkably significant synergism (effect) by the optimum ranges of the first additional element Zn and the second additional element Al in the mutually complementary relationship with Zn, and the large volume change can be prevented. Furthermore, the negative electrode active material in this embodiment is also excellent in the point of being capable of enhancing the high cycle durability of the electrode while exhibiting a high capacity (refer to Table 3 and FIGS. 15 to 17).

(3) Regarding Mass % Value of Zn in the Above-Described Alloy

The range of y in the above-described composition formula $Si_xZn_yAl_zA_a$, which is the mass % value of Zn in the alloy having the formula, is preferably $0<y<79$, more preferably $16 \leq y \leq 69$, particularly preferably $18 \leq y \leq 44$. If the numeric value of the mass % value (value of y) of the first additional element Zn in the alloy is within a preferable range of $0<y<79$, then the amorphous-crystal phase transition of the high capacity Si material can be suppressed effectively by the characteristics (further, by the synergistic characteristics with Al) inherent in Zn. As a result, an excellent effect can be developed on the cycle lifetime (cycle durability), particularly, on the high discharge capacity retention rate (85% or more, particularly 90% or more, especially 95% or more) in the 50th cycle (refer to FIG. 15 to FIG. 17). Moreover, the numeric value of the content x of the high capacity Si material can be maintained at a certain level or more ($21 \leq x < 100$), and the remarkably high capacity increase, which is unrealizable by the existing carbon-based negative electrode active material, can be realized. In a similar way, an alloy with the higher capacity (initial capacity of 824 mAh/g or more, particularly 1072 mAh/g or more) in comparison with the existing Sn-based alloy negative electrode active material can be obtained (refer to Table 3 and FIG. 15 to FIG. 17).

As the mass % value (value of y) of the first additional element Zn in the alloy, from the viewpoint of providing the negative electrode active material that exhibits the well-balanced characteristics having the high initial capacity while maintaining the high cycle characteristics (particularly, high discharge capacity retention rate in the 50th cycle), more preferably, a range of $16 \leq y \leq 69$ is desirable. In the event of the Li alloying, in the case where the content ratio of the first additional element Zn having the function and effect of suppressing the amorphous-crystal phase transition and enhancing the cycle lifetime is appropriate, then the Si alloy negative electrode active material having the good characteristics can be provided (refer to Table 3 and a composition range surrounded by the bold solid line of each of FIG. 15 and FIG. 16). That is to say, if the numeric value of the mass % value (value of y) of the first additional element Zn in the alloy is within the more preferable range of $16 \leq y \leq 69$, then in the event of the alloying, the function and effect of suppressing the amorphous-crystal phase transition and enhancing the cycle lifetime can be developed, the high discharge capacity retention rate (85% or more, particularly 90% or more) in the 50th cycle can be maintained, and this is more preferable (refer to Table 3 and FIG. 15 and FIG. 16). In this case, a composition range (particularly, Zn content of $16 \leq y \leq 69$), which was actually able to realize the capacity increase in Samples 1 to 35 of Reference example C, is selected (formed into the hexagon surrounded by the bold solid line in each of FIG. 15 and FIG. 16). The above-described composition range, particularly, the Zn content of $16 \leq y \leq 69$ is selected, whereby a Si alloy negative electrode active material can be provided, which realizes remarkably excellent cycle durability (discharge capacity retention rate of 85% or more, particularly 90% or more) in comparison with the existing Sn-based negative electrode active material and the multinary alloy negative electrode active material described in Patent Literature 1 (refer to Table 3 and FIG. 15 and FIG. 16).

As the mass % value (value of y) of the first additional element Zn in the alloy, from the viewpoint of providing the negative electrode active material that exhibits the best-balanced characteristics having the high initial capacity while maintaining the higher cycle characteristics (high discharge capacity retention rate in the 50th cycle), particularly preferably, a range of $18 \leq y \leq 44$ is desirable. In the event of the Li alloying, in the case where the content ratio of the first additional element Zn having the function and effect of suppressing the amorphous-crystal phase transition and enhancing the cycle lifetime is most appropriate, then the Si alloy negative electrode active material having the best characteristics can be provided (refer to Table 3 and FIG. 17). That is to say, if the numeric value of the mass % value (value of y) of the first additional element Zn in the alloy is within the particularly preferable range of $18 \leq y \leq 44$, then in the event of the alloying, the effect of suppressing the amorphous-crystal phase transition and enhancing the cycle lifetime can be developed more effectively, and the high discharge capacity retention rate of 95% or more in the 50th cycle can be maintained (refer to Table 3 and FIG. 17). Particularly in this case, a composition range (particularly, Zn content of $18 \leq y \leq 44$), which was able to realize the much higher capacity increase and the high discharge capacity retention rate of 95% or more in the 50th cycle in Samples 1 to 35 of Reference example C, is selected (formed into the smallest hexagon surrounded by the bold solid line in FIG. 17). The above-described composition range, particularly, the Zn content of $18 \leq y \leq 44$ is selected, whereby the Si alloy negative electrode active material can be provided, which realizes the remarkably excellent cycle durability (higher discharge capacity retention rate) in comparison with the Sn-based negative electrode active material and the multinary alloy negative electrode active material described in Patent Literature 1 as well as the capacity increase. Meanwhile, in comparison with the ternary alloy represented by the composition formula $Si_xZn_yAl_zA_a$, the binary alloy (particularly, Si—Al alloy with y=0), which does not contain either of the additional metal elements (Zn, Al) to Si, cannot maintain the high cycle characteristics. In particular, the binary alloy cannot sufficiently maintain the high discharge capacity retention rate in the 50th cycle, resulting in that the cycle characteristics are lowered (deteriorated). Therefore, the Si alloy negative electrode active material which realizes the excellent cycle durability (high discharge capacity retention rate in the 50th cycle) and the above-described capacity increase with a best balance, cannot be provided.

Here, in the case of y≥16, and particularly, y≥18, it is possible to achieve a range within which a content ratio (balance) between the high capacity Si material having an initial capacity of no less than 3200 mAh/g and the first additional element Zn (further, the residual second additional element Al) is optimum (refer to the range surrounded by the bold solid line in each of FIG. 15 to FIG. 17). Therefore, it is possible to achieve the characteristics (further, the synergistic characteristics with Al) inherent in Zn, which effectively suppress the amorphous-crystal phase transition of the Si material, and remarkably enhance the cycle lifetime (particularly, the discharge capacity retention rate). That is to say, as the discharge capacity retention rate in the 50th cycle, 85% or more, particularly 90% or more, and especially 95% or more can be realized. As a result, the negative electrode active material (negative electrode) is excellent in the points of being capable of developing the best characteristics, and of maintaining the capacity increase with the level of usage for the vehicle stably and safely for a long period. Meanwhile, in the case of y≤69, and particularly y≤44, the content ratio (balance) between the high capacity Si material having an initial capacity of no less than approximately 3200 mAh/g and Zn as the first additional element (and further, Al as the second additional element) can take the optimum range (refer to the range surrounded by the bold solid line in each of FIG. 15 to FIG. 17). Therefore, in the event of alloying Si and Li, the amorphous-crystal phase transition can be remarkably suppressed, and the cycle lifetime can be enhanced largely. That is to say, as the discharge capacity retention rate in the 50th cycle, 85% or more, particularly 90% or more, and especially 95% or more can be realized. However, even if y goes out of the above-described optimum range (16≤y≤69, particularly 18≤y≤44), if y stays within a range within which the above-described functions and effects of this embodiment can be developed effectively, then, needless to say, this range of y is incorporated in the technical scope (scope of the right) of the present invention.

Moreover, in Examples of Patent Literature 1 described above, it is disclosed that a deterioration phenomenon of the cycle characteristics, which is caused by considerable lowering of the capacity, is already observed in only approximately 5 to 6 cycles. That is to say, in Examples of Patent Literature 1, the discharge capacity retention rate in the 5th or 6th cycle is already lowered to 90 to 95%, and the discharge capacity retention rate in the 50th cycle will be lowered to approximately 50 to 0%. Meanwhile, in the above-described Si-based alloy, with regard to Zn as the first additional element to the high capacity Si material (further, such a combination thereof with Al as the second additional element in a mutually complementary relationship), only one type of Zn concerned or only one type of the combination is able to be selected through so-called many trials and errors, and in addition, through excessive experiments using combinations of a variety of additional (metal and nonmetal) elements. Then, in the combination, the content of Zn is further set within the optimum range described above, whereby the negative electrode active material in this embodiment is also excellent in the point of being capable of largely reducing the decrease of the discharge capacity retention rate in the 50th cycle. That is to say, in the event of alloying Si and Li, the transition from the amorphous state to the crystal state can be suppressed due to a remarkably significant synergism (effect) by the optimum range of the first additional element Zn (further, the second additional element Al in the mutually complementary relationship with Zn), and the large volume change can be prevented. Furthermore, the negative electrode active material in this embodiment is also excellent in the point of being capable of enhancing the high cycle durability of the electrode while exhibiting a high capacity (refer to Table 3 and FIG. 15 to FIG. 17).

(4) Regarding Mass % Value of Al in the Above-Described Alloy

The range of z in the above-described composition formula $Si_xZn_yAl_zA_a$, which is the mass % value of Al in the alloy having the formula, is preferably 0<z<79, more preferably 0<z≤51, still more preferably 2≤z≤51, particularly preferably 22≤z≤46. If the numeric value of the mass % value (value of z) of the second additional element type Al, in which a capacity of the electrode is not decreased even if a concentration of the first additional element is increased, in the alloy is within a preferable range of 0<z<79, then the amorphous-crystal phase transition of the high capacity Si material can be suppressed effectively by the characteristics inherent in Zn and the synergistic characteristics with Al. As a result, an excellent effect can be developed on the cycle lifetime (cycle durability), particularly, on the high discharge capacity retention rate (85% or more, particularly 90% or more, especially 95% or more) in the 50th cycle (refer to Table 3 and FIG. 15 to FIG. 17). Moreover, the numeric value of the content x of the high capacity Si material can be maintained at a certain level or more (21≤x<100), and the remarkably high capacity increase, which is unrealizable by the existing carbon-based negative electrode active material, can be realized. In a similar way, an alloy with the high capacity (initial capacity of 824 mAh/g or more, particularly 1072 mAh/g or more) similar to or more than in the existing Sn-based alloy negative electrode active material can be obtained (refer to Table 3 and FIG. 14 to FIG. 17).

As the mass % value (value of z) of the second additional element Al in the alloy, from the viewpoint of providing the negative electrode active material that exhibits the well-balanced characteristics having the high initial capacity while maintaining the high cycle characteristics (particularly, high discharge capacity retention rate in the 50th cycle), more preferably, a range of 0<z≤51 is desirable. In this embodiment, it is extremely important and useful to select, in the event of the Li alloying, the first additional element Zn that suppresses the amorphous-crystal phase transition and enhances the cycle lifetime and the second additional element Al in which the capacity of the negative electrode active material (negative electrode) is not decreased even if the concentration of the first additional element is increased. It was revealed that, by the first and second additional elements, a significant difference in the function and effect is observed from those of the ternary alloy and the quaternary or more alloys, which have been heretofore known in public, for example, as described in Patent Literature 1 and the like, and further, from those of the binary alloy such as the Si—Zn-based alloy and the Si—Al-based alloy. In the case where the content ratio of such a second additional element Al (further, the first additional element Zn in the mutually complementary relationship with Al) is appropriate, then the Si alloy negative electrode active material having the good characteristics can be provided (refer to Table 3 and a composition range surrounded by the bold solid line of FIG. 15). That is to say, if the numeric value of the mass % value (value of z) of the second additional element Al in the alloy is within the more preferable range of $0<z\leq51$, then in the event of the alloying, the function and effect of suppressing the amorphous-crystal phase transition and enhancing the cycle lifetime can be developed by a synergistic effect (mutually complementary characteristics) with the first additional element Zn. As a result, the high discharge capacity retention rate (85% or more) in the 50th cycle can be maintained (refer to Table 3 and FIG. 15). In this case, a composition range (particularly, Zn content of $0<z\leq51$), which was actually able to realize the capacity increase in Samples 1 to 35 of Reference example C, is selected (formed into the hexagon surrounded by the bold solid line in FIG. 15). The above-described composition range, particularly, the Zn content of $0<z\leq51$ is selected, whereby the remarkably excellent cycle durability can be achieved in comparison with the existing Sn-based negative electrode active material and the multinary alloy negative electrode active material described in Patent Literature 1 by the synergistic effect (mutually complementary characteristics) with the first additional element Zn. As a result, such a Si alloy negative electrode active material, which realizes the discharge capacity retention rate of 8% or more in the 50th cycle, can be provided (refer to Table 3 and the composition range surrounded by the bold solid line of FIG. 15).

As the mass % value (value of z) of the second additional element Al in the alloy, from the viewpoint of providing the negative electrode active material that exhibits the extremely well-balanced characteristics having the high initial capacity while maintaining the higher cycle characteristics (high discharge capacity retention rate in the 50th cycle), still more preferably, a range of $2\leq z\leq51$ is desirable. This is because, in the event of the Li alloying, in the case where the content ratio of the second additional element Al, which can exert the effect of suppressing the amorphous-crystal phase transition and enhancing the cycle lifetime by the synergistic effect (mutually complementary characteristics) with Zn, is more appropriate, then the Si alloy negative electrode active material having the better characteristics can be provided. That is to say, if the numeric value of the mass % value (value of z) of the second additional element Al in the alloy is within the still more preferable range of $2\leq z\leq51$, then in the event of the alloying, the effect of suppressing the amorphous-crystal phase transition and enhancing the cycle lifetime can be developed more effectively by the synergistic effect (mutually complementary characteristics) with the first additional element. As a result, the higher discharge capacity retention rate of 90% or more in the 50th cycle can be maintained (refer to Table 3 and FIG. 16). Particularly in this case, a composition range (particularly, Al content of $2\leq z\leq51$), which was able to realize the capacity increase and the high discharge capacity retention rate of 90% or more in the 50th cycle in Samples 1 to 35 of Reference example C, is selected (formed into the small hexagon surrounded by the bold solid line in FIG. 16). The above-described composition range, particularly, the Al content of $2\leq z\leq51$ is selected, whereby a good-balance Si alloy negative electrode active material can be provided, which realizes remarkably excellent cycle durability by the synergistic characteristics with Zn in comparison with the existing high capacity Sn-based negative electrode active material and the multinary alloy negative electrode active material described in Patent Literature 1 as well as the capacity increase.

As the mass % value (value of z) of the second additional element Al in the alloy, from the viewpoint of providing the negative electrode active material that exhibits the best-balanced characteristics having the high initial capacity while maintaining the higher cycle characteristics (high discharge capacity retention rate in the 50th cycle), particularly preferably, a range of $22\leq z\leq46$ is desirable. This is because, in the event of the Li alloying, in the case where the content ratio of the second additional element Al capable of exerting the effect of suppressing the amorphous-crystal phase transition and enhancing the cycle lifetime by the synergistic effect (mutually supplementary characteristics) with Zn is most appropriate, then the Si alloy negative electrode active material having the best characteristics can be provided. That is to say, if the numeric value of the mass % value (value of z) of the second additional element Al in the alloy is within the particularly preferable range of $22\leq z\leq46$, then in the event of the alloying, the effect of suppressing the amorphous-crystal phase transition and enhancing the cycle lifetime can be developed more effectively by the synergistic effect (mutually complementary characteristics) with Zn. As a result, the much higher discharge capacity retention rate of 95% or more in the 50th cycle can be maintained (refer to Table 3 and FIG. 17). Particularly in this case, a composition range (particularly, Al content of $22\leq z\leq46$), which was able to realize the much higher capacity increase and the high discharge capacity retention rate of 95% or more in the 50th cycle in Samples 1 to 35 of Reference example C, is selected (formed into the smallest hexagon surrounded by the bold solid line in FIG. 17). The above-described composition range, particularly, the Al content of $22\leq z\leq46$ is selected, whereby the Si alloy negative electrode active material can be provided, which realizes the remarkably excellent cycle durability in comparison with the existing high capacity Sn-based negative electrode active material and the multinary alloy negative electrode active material described in Patent Literature 1 as well as the capacity increase. Meanwhile, in comparison with the ternary alloy represented by the composition formula $Si_xZn_yAl_zA_a$, the binary alloy (particularly, Si—Zn alloy with z=0), which does not contain either of the additional metal elements (Zn, Al) to Si, cannot maintain the high cycle characteristics. In particular, the binary alloy cannot maintain the high discharge capacity retention rate in the 50th cycle, resulting in that the cycle characteristics are lowered (deteriorated). Therefore, the Si alloy negative electrode active material which realizes the excellent cycle durability (high discharge capacity retention rate in the 50th cycle) and the above-described capacity increase with a best balance, cannot be provided.

Here, in the case of $z\geq2$, and particularly, $z\geq22$, it is possible to achieve a range within which a content ratio (balance) among the high capacity Si material having an initial capacity of no less than 3200 mAh/g and the first additional element Zn, and further, the second additional element Al) is optimum (refer to the range surrounded by the bold solid line in each of FIG. 16 and FIG. 17). Therefore, it is possible to achieve the characteristics inherent in Al, which effectively suppress the decrease of the capacity of the negative electrode active material (negative electrode) even if the concentration of Zn capable of suppressing the amorphous-crystal phase transition, and remarkably enhance the cycle lifetime (particularly, the discharge capacity retention rate). That is to say, as the discharge capacity retention rate in the 50th cycle, 90% or more, particularly 95% or more can be realized. As a result, the negative electrode active material (negative electrode) is excellent in the points of being capable of developing the best characteristics, and of maintaining the capacity increase with the level of usage for the vehicle stably and safely for a long period. Meanwhile, in the case of z≤51, and particularly z≤46, the content ratio (balance) between the high capacity Si material having an initial capacity of no less than approximately 3200 mAh/g, Zn as the first additional element and Al as the second additional element can take the optimum range (refer to the range surrounded by the bold solid line in each of FIG. 15 to FIG. 17). Therefore, in the event of alloying Si and Li, the amorphous-crystal phase transition can be remarkably suppressed, and further, the cycle lifetime (discharge capacity retention rate in the 50th cycle) can be enhanced largely. That is to say, as the discharge capacity retention rate in the 50th cycle, 85% or more, particularly 90% or more, and especially 95% or more can be realized. However, even if z goes out of the above-described optimum range (2≤z≤51, particularly 22≤z≤46), if z stays within a range within which the above-described functions and effects of this embodiment can be developed effectively, then, needless to say, this range of z is incorporated in the technical scope (scope of the right) of the present invention.

Moreover, in Examples of Patent Literature 1 described above, it is disclosed that a deterioration phenomenon of the cycle characteristics, which is caused by considerable lowering of the capacity, is already observed in only approximately 5 to 6 cycles. That is to say, in Examples of Patent Literature 1, the discharge capacity retention rate in the 5th or 6th cycle is already lowered to 90 to 95%, and the discharge capacity retention rate in the 50th cycle will be lowered to approximately 50 to 0%. Meanwhile, in the above-described Si-based alloy, with regard to combinations of the first additional element Zn and the second additional element Al to the high capacity Si material, which are in the mutually complementary relationship, only one type of combination is able to be selected through so-called many trials and errors, and in addition, through excessive experiments using combinations of a variety of additional (metal and nonmetal) elements. Then, in the combination, the content of Al is further set within the optimum range described above, whereby the negative electrode active material in this embodiment is also excellent in the point of being capable of largely reducing the decrease of the discharge capacity retention rate in the 50th cycle. That is to say, in the event of alloying Si and Li, the transition from the amorphous state to the crystal state can be suppressed due to a remarkably significant synergism (effect) by the optimum range of the second additional element Al (further, the first additional element Zn in the mutually complementary relationship with Al), and the large volume change can be prevented. Furthermore, the negative electrode active material in this embodiment is also excellent in the point of being capable of enhancing the high cycle durability of the electrode while exhibiting a high capacity.

(5) Regarding Mass % Value of A in Alloy

The range of a in the above-described composition formula $Si_xZn_yAl_zA_a$, which is the mass % value of A in the alloy having the formula, is 0≤a<0.5, preferably 0≤a<0.1. As mentioned above, A is one that is present in the raw materials in the Si alloy or is inevitably mixed in the manufacturing process of the Si alloy, and is originally unnecessary; however, the amount thereof is trace, and the characteristics of the Si alloy are not affected thereby, and accordingly, the inevitable impurities are permitted to be contained in the alloy.

(Si Alloy Represented by $Si_xZn_yC_zA_a$)

As mentioned above, Zn as the first additional element and C as the second additional element are selected, whereby the above-described $Si_xZn_yC_zA_a$ can suppress the amorphous-crystal phase transition and enhance the cycle lifetime in the event of the Li alloying. Moreover, in such a way, the negative electrode active material in this embodiment obtains the higher capacity than the conventional negative electrode active material, for example, the carbon-based negative electrode active material.

In the above-described composition of the alloy, preferably, the above-described x is more than 25 to less than 54, the above-described y is more than 13 to less than 69, and the above-described z is more than 1 to less than 47. Note that these numeric value ranges correspond to a range indicated by reference symbol A of FIG. 20. Then, this Si alloy negative electrode active material is used for the negative electrode of the electrical device, for example, the negative electrode of the lithium ion secondary battery. In this case, the alloy contained in the above-described negative electrode active material absorbs the lithium ions in an event where the battery is charged, and emits the lithium ions in an event where the battery is discharged.

More specifically, the above-described negative electrode active material is the Si alloy negative electrode active material, to which zinc (Zn) as the first additional element and carbon (C) as the second additional element are added. Then, Zn as the first additional element and C as the second additional element are appropriately selected, whereby, in an event where the Si alloy negative electrode active material is alloyed with lithium, the amorphous-crystal phase transition is suppressed, and the cycle lifetime can be enhanced. Moreover, in such a way, a higher capacity than in the carbon-based negative electrode active material can be achieved. Then, composition ranges of Zn and C as the first and second additional elements are individually optimized, whereby a negative electrode active material of a Si (Si—Zn—C-based) alloy provided with a good cycle lifetime even after 50 cycles can be obtained. Moreover, the negative electrode active material of the Si (Si—Zn—C-based) alloy has a high capacity, can exert high cycle durability, and can exert high charge/discharge efficiency in the initial period.

At this time, in the above-described negative electrode active material composed of the Si—Zn—C-based alloy, in a case where the above-described x exceeds 25, the discharge capacity in the first cycle can be ensured sufficiently. On the contrary, in a case where the above-described x is less than 54, excellent cycle characteristics can be developed in comparison with the case of the conventional pure Si. Moreover, in a case where the above-described y exceeds 13, excellent cycle characteristics can be developed in comparison with the case of the conventional pure Si. On the contrary, in a case where the above-described y is less than 69, the lowering of the content of Si can be suppressed, the initial capacity can be effectively prevented from being lowered in comparison with the existing pure Si negative electrode active material, the high capacity can be obtained in the initial period, and the high charge/discharge efficiency can be exerted. Moreover, in a case where the above-described z exceeds 1, the excellent cycle characteristics can be developed in comparison with the case of the conventional pure Si. On the contrary, in a case where the above-described z is less than 47, the lowering of the content of Si can be suppressed, the initial capacity can be effectively prevented from being lowered in comparison with the existing pure Si negative electrode active material, the high capacity can be obtained in the initial period, and the high charge/discharge efficiency can be exerted.

Figure 21:
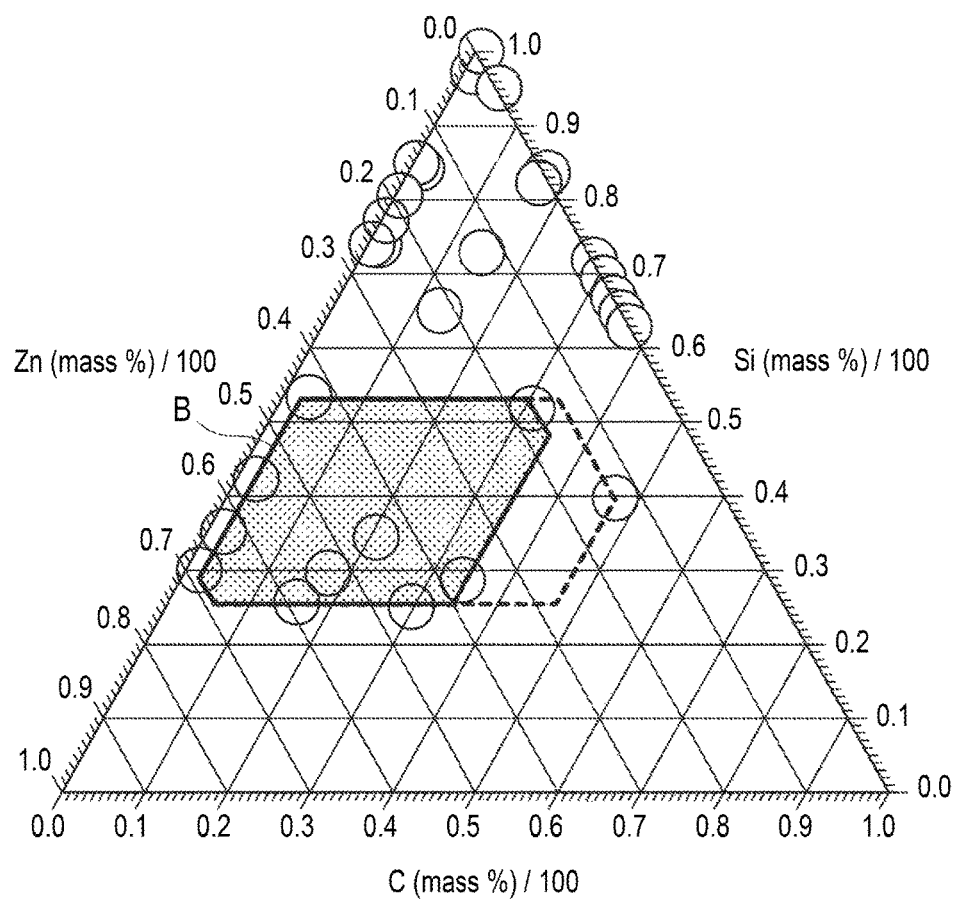
FIG. 21 is a ternary composition diagram showing a suitable composition range of the Si—Zn—C-based alloy that composes the negative electrode active material contained in the negative electrode for an electrical device according to the present invention.

Note that, as shown by reference symbol B of FIG. 21, from a viewpoint of further improving the above-described characteristics of the Si alloy negative electrode active material concerned, desirably, the above-described z is set within a range of more than 1 to less than 34. Moreover, desirably, the above-described y is set within a range of more than 17 to less than 69.

Note that the above-described a ranges as $0 \leq a \leq 0.5$, and preferably, ranges as $0 \leq a \leq 0.1$.

(Mean Particle Diameter of Si Alloy)

A mean particle diameter of the above-described Si alloy just needs to be substantially the same as a mean particle diameter of the negative electrode active material contained in the existing negative electrode active material layer 15, and is not particularly limited. The mean particle diameter just needs to preferably range from 1 to 20 μm from the viewpoint of the output enhancement. However, the mean particle diameter is never limited to the range as described above, and may go out of this range as long as the functions and effects of this embodiment can be developed effectively. Note that a shape of the Si alloy is not particularly limited, and can be spherical, ellipsoidal, columnar, polygonal columnar, scale-like, and so on.

(Manufacturing Method of Alloy)

A manufacturing method of the alloy according to this embodiment, which has the compositional formula $Si_xZn_yM_zA_a$, is not particularly limited, and can be produced by using a variety of manufacturing method heretofore known in public. That is to say, there is hardly a difference in alloy state/characteristics, which may be caused depending on the manufacturing method, and accordingly, every manufacturing method can be applied.

Specifically, for example, as a manufacturing method of a particle form of the alloy having the compositional formula $Si_xZn_yM_zA_a$, for example, a mechanical alloy method, an arc plasma fusion method and the like can be used.

In the method of manufacturing the Si alloy into the above-described form of the particles, a binder, an electrically-conductive auxiliary agent and a viscosity control solvent are added to the particles, and slurry is adjusted, whereby a slurry electrode can be formed by using the slurry concerned. Therefore, it is easy to realize mass production of the Si alloy, and the Si alloy is excellent in that it is easy to put into practical use as an actual electrode for the battery.

The description has been made above of the predetermined Si alloy essentially contained in the negative electrode active material layer; however, the negative electrode active material layer may contain other negative electrode active materials. As the other negative electrode active materials of the above-described predetermined alloy, there are mentioned: a carbon-based material including carbon such as natural graphite, artificial graphite, carbon black, activated carbon, carbon fiber, coke, soft carbon and hard carbon; pure metal such as Si and Sn; an alloy-based active material that goes out of the above-described predetermined composition ratio; or a metal oxide such as TiO, $Ti_2O_3$ and $TiO_2$ and $SiO_2$, SiO and $SnO_2$; a lithium-transition metal composite oxide such as $Li_{4/3}Ti_{5/3}O_4$ and $Li_7MnN$; a Li—Pb-based alloy; a Li—Al-based alloy; Li; and the like. However, from a viewpoint of sufficiently exerting the functions and the effects, which are expressed by using the above-described predetermined Si alloy as the negative electrode active material, a content of the above-described predetermined Si alloy, which occupies a total 100 mass % of the negative electrode active material, is preferably 50 to 100 mass %, more preferably 80 to 100 mass %, still more preferably 90 to 100 mass %, particularly preferably 95 to 100 mass %, most preferably 100 mass %.

A carbon-based material, which is suitable in a combination with the above-described Si alloy, is described as an aspect of this embodiment.

(Carbon-Based Material)

In an aspect of this embodiment, as the negative electrode active material, a carbon-based material is further contained in addition to the above-described ternary Si—Zn-M-based Si alloy.

The carbon-based material for use in this embodiment is not particularly limited; however, there are mentioned carbon materials such as: graphite that is high crystalline carbon such as natural graphite and artificial graphite; low crystalline carbon such as soft carbon and hard carbon; carbon black such as Ketjen Black, acetylene black, channel black. lamp black, oil furnace black and thermal black; fullerene; carbon nanotube; carbon nanofiber; carbon nanohorn; and carbon fibril. Among them, graphite is preferably used.

In this embodiment, the negative electrode active material layer is formed in such a manner that the negative electrode active material is mixed with the carbon-based material together with the above-described Si alloy, and can thereby exhibit good-balance characteristics with a high initial capacity while maintaining higher cycle characteristics.

The above-described Si alloy is mixed with the carbon-based material, whereby it becomes possible to arrange the Si alloy in the negative electrode active material layer more uniformly. As a result, all pieces of the Si alloy in the negative electrode active material layer exhibit equivalent reactivity, and further enhancement of the cycle characteristics can be achieved.

Note that, as a result of mixture of the carbon-based material, the content of the Si alloy in the negative electrode active material layer is lowered, whereby the initial capacity may be lowered. However, the carbon-based material itself has reactivity with Li ions, and accordingly, a degree of the lowering of the initial capacity becomes relatively small. That is to say, in a case of using the Si alloy and the carbon-based material in combination, such an enhancement effect of the cycle characteristics is large in comparison with a lowering function of the initial capacity.

Moreover, in comparison with the Si alloy, the carbon-based material is less likely to cause the volume change in the event of reacting with the Li ions. Therefore, in the case of using the above-described Si alloy and the carbon-based material in combination, even in a case where the volume change of the Si alloy is large, an influence of the volume change of the negative electrode active material, which follows the Li reaction, can be made relatively slight when the whole of the negative electrode active material is viewed. Note that such an effect in the case of using the Si alloy and the carbon-based material in combination can also be understood from a result of an example where the cycle characteristics are increased as the content of the carbon-based material is larger (as the content of the Si alloy is smaller) (refer to Table 7 and FIG. 25).

Moreover, an electric power consumption (Wh) can be reduced by using the above-described Si alloy and the carbon-based material in combination. More specifically, a potential of the carbon-based material is relatively low in comparison with that of the Si alloy. As a result, in the case of using the above-described Si alloy and the carbon-based material in combination, such a relatively high potential which the Si alloy has can be reduced. Then, a potential of the whole of the negative electrode is lowered, and accordingly, the electric power consumption (Wh) can be reduced. Such functions and effects in the case of using the above-described Si alloy and the carbon-based material in combination are particularly advantageous in an event of using an electrical device, which is for use in a vehicle, among the electrical devices.

A shape of the carbon-based material is not particularly limited, and can be spherical, ellipsoidal, columnar, polygonal columnar, scale-like, and so on.

(Mean Particle Diameter of Carbon-Based Material)

Moreover, a mean particle diameter of the carbon-based material is not particularly limited; however, is preferably 5 to 25 µm, more preferably 5 to 10 µm. In this event, with regard to comparison with the mean particle diameter of the above-mentioned Si alloy, the mean particle diameter of the carbon-based material may be the same as or different from the mean particle diameter of the Si alloy, however, preferably, is different therefrom. In particular, preferably, the mean particle diameter of the above-described alloy is smaller than the mean particle diameter of the above-described carbon-based material. If the mean particle diameter of the carbon-based material is relatively larger than the mean particle diameter of the alloy, then a configuration is provided, in which the particles of the carbon-based material are arranged uniformly, and the Si alloy is arranged between the particles of the carbon-based material. Accordingly, the Si alloy can be arranged uniformly in the negative electrode active material layer.

In the case of using the Si alloy and the carbon-based material in combination, a particle diameter ratio of the mean particle diameter of the carbon-based material and the mean particle diameter of the Si alloy (mean particle diameter of Si alloy/mean particle diameter of carbon-based material) is preferably 1/250 to less than 1, more preferably 1/100 to 1/4.

A mixture ratio of the Si alloy and the carbon-based material in the case of using the Si alloy and the carbon-based material in the negative electrode active material in combination is not particularly limited, and can be appropriately selected in response to a desired purpose and the like. In particular, preferably, the content of the Si alloy in the above-described negative electrode active material in the case of using the Si alloy and the carbon-based material in combination is 3 to 70 mass %. In an embodiment, more preferably, the content of the Si alloy in the above-described negative electrode active material in the case of using the Si alloy and the carbon-based material in combination is 30 to 50 mass %. Moreover, in another embodiment, more preferably, the content of the Si alloy in the above-described negative electrode active material in the case of using the Si alloy and the carbon-based material in combination is 50 to 70 mass %.

If the content of the above-described Si alloy in the above-described negative electrode active material in the case of using the Si alloy and the carbon-based material in combination is 3 mass % or more, then this is preferable since a high initial capacity can be obtained. Meanwhile, if the content of the above-described Si alloy is 70 mass % or less, then this is preferable since high cycle characteristics can be obtained.

(Manufacturing Method of Negative Electrode Active Material)

The negative electrode active material is not particularly limited, and can be manufactured by a method known in public. In usual, the manufacturing method of the above-described Si alloy can be used for the negative electrode active material layer. Specifically, the Si alloy in the particle form is manufactured by using a mechanical alloy method, an arc plasma fusion method and the like, and thereafter, the carbon-based material (in the case of using the Si alloy and the carbon-based material in combination), the binder, the electrically-conductive auxiliary agent, and the viscosity control agent are added thereto to thereby prepare slurry, whereby a slurry electrode can be formed by using the slurry. In this event, in the case of using the Si alloy and the carbon-based material in combination, the amount of the Si alloy in the particle form and the amount of the carbon-based material are changed as appropriate, whereby such a negative electrode active material, in which the content of the Si alloy becomes a desired value, can be manufactured.

(Elongation of Negative Electrode Active Material Layer)

Figure 22:
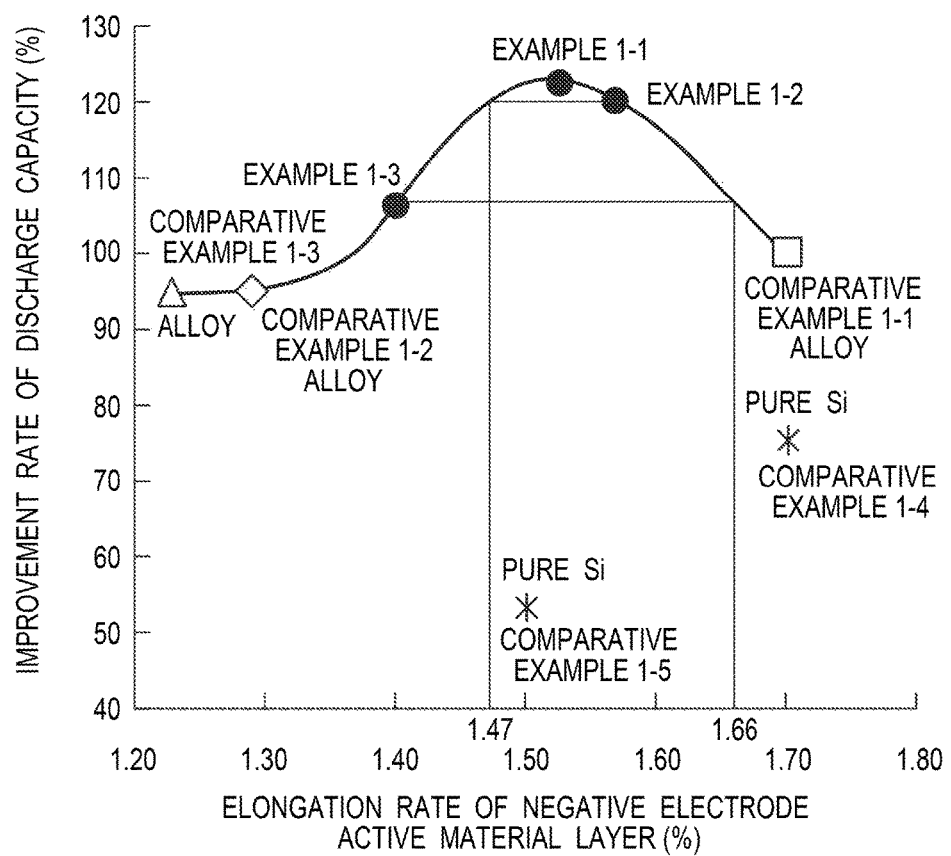
FIG. 22 is a graph showing relationships between elongations of electrode layers and improvement rate of discharge capacity in Examples.

This embodiment is characterized in that the above-described ternary Si—Zn-M-based alloy is contained as the negative electrode active material, and the elongation ($\delta$) of the negative electrode active material layer is in the range of $1.29<\delta<1.70\%$. After the above-described ternary Si—Zn-M-based alloy is applied, the elongation ($\delta$) of the negative electrode active material layer is allowed to exceed 1.29%, whereby constituent elements of the electrode (negative electrode active material layer) other than the active material can follow the volume change caused by the expansion/contraction of the negative electrode active material, which is caused by the charge/discharge. As a result, the volume change of the whole of the electrode (negative electrode active material layer) can be suppressed, and the improvement rate of the discharge capacity can be enhanced to a large extent. Moreover, after the above-described ternary Si—Zn-M-based alloy is applied, the elongation ($\delta$) of the negative electrode active material layer is set at less than 1.70%, whereby the elongation of the negative electrode active material layer can be suppressed from inhibiting the reaction (insertion/elimination) of the lithium ions to the negative electrode active material, the reaction following the charge/discharge. As a result, a good negative electrode for a lithium ion secondary battery, which has high capacity/high cycle durability, is obtained. Moreover, by using the negative electrode for a lithium ion secondary battery, which is composed by using the negative electrode active material layer of this embodiment, a lithium ion secondary battery, which has high capacity/high cycle durability, and particularly, is excellent in improvement rate of discharge capacity, is obtained. That is to say, in cases where, after the above-described ternary Si—Zn-M-based alloy is applied, the elongation ($\delta$) of the negative electrode active material layer is 1.29 or less and 1.70% or more, then as shown in FIG. 22, the improvement rate of the discharge capacity becomes insufficient. Moreover, in a case where pure Si with a high capacity (3200 mAh/g) is applied in place of the ternary Si—Zn-M-based alloy, even if the elongation ($\delta$) of the negative electrode active material layer is adjusted within the above-described range, the improvement rate of the discharge capacity is significantly lowered due to a large volume change (approximately four times) intrinsic to the pure Si (refer to Comparative examples 1-4 and 1-5 of FIG. 22).

After the above-described ternary Si—Zn-M-based alloy is applied, the elongation ($\delta$) of the negative electrode active material layer is preferably $1.40 \leq \delta \leq 1.70\%$, more preferably $1.40 \leq \delta \leq 1.66\%$, still more preferably $1.40 \leq \delta \leq 1.57\%$, particularly preferably $1.47 \leq \delta \leq 1.57\%$, more particularly preferably $1.53 \leq \delta \leq 1.57\%$. As the elongation ($\delta$) of the negative electrode active material layer is adjusted in the more suitable ranges described above more and more, a higher improvement rate of the discharge capacity can be achieved, and in this point, the negative electrode active material layer of this embodiment is excellent (refer to FIG. 22).

The elongation (δ) of the negative electrode active material layer can be measured by a value measured in accordance with the tensile test method of JIS K 7163 (1994).

Means for adjusting the elongation (δ) of the negative electrode active material layer within the above-described range is not particularly limited; however, just needs to be capable of appropriately adjusting types and contents of the electrically-conductive auxiliary agent, the binder and the like, and this can contribute to the elongation (δ) of the negative electrode active material layer, among the components in the negative electrode active material layer. In particular, the compounding ratio of each of the components in the negative electrode active material layer has a range that is defined to be substantially optimum, and if the compounding ratio (contents) of the electrically-conductive auxiliary agent, the binder or the like is changed (varied) by daring to change this optimum range, then this may cause an apprehension that battery performance may be damaged. Therefore, desirably, in a state where the optimum range of the compounding ratio of each component in the negative electrode active material layer is held without being changed, the elongation (δ) of the negative electrode active material layer is adjusted by changing the types (combination of the electrically-conductive auxiliary agent and the binder) of the electrically-conductive auxiliary agent, the binder and the like. Note that, with regard to the binder or the like, binding force or the like thereof is changed by changing the type thereof, and accordingly, more preferably, an optimum binder is used, and thereafter, a material (type) of the electrically-conductive auxiliary agent, which is capable of adjusting the elongation (δ) of the negative electrode active material layer without affecting conductive performance, is desirably adjusted as appropriate. Specifically, as such a carbon material for use as the electrically-conductive auxiliary agent, desirably, such a short chain-like or fibrous one, which has a predetermined bulk density (volume) or a predetermined length, is used. By using such a short chain-like or fibrous electrically-conductive auxiliary agent, in an event where the ternary Si—Zn-M-based alloy active material causes a volume change (expansion/contraction) within a predetermined range by the charge/discharge, the short chain-like or fibrous electrically-conductive auxiliary agent can follow such a predetermined-range volume change of the alloy active material and ensure the conductivity. Specifically, in the state where the alloy active material contracts in volume, the short chain-like or fibrous electrically-conductive auxiliary agent, which is described above, is in contact with a plurality of the alloy active material particles in an entangled state, and in comparison with a state of being linearly extended, the electrically-conductive auxiliary agent forms a three-dimensional electronic (conductive) network in a state where there is a sufficient margin for the elongation. Meanwhile, in a state where the alloy active material expands in volume within the predetermined range, the short chain-like or fibrous electrically-conductive auxiliary agent, which is described above, can maintain a state of being elongated linearly to some extent while holding the state of being entangled into the plurality of alloy active material particles which have expanded in volume (can follow the volume change). Therefore, it can be said that the three-dimensional electronic (conductive) network can be sufficiently held even in a case where the alloy active material has expanded in volume. It can be said that this is the function and effect (mechanism), which are realizable in the case of using the above-described high-capacity ternary Si—Zn-M-based alloy active material having the volume change within the predetermined range. On the contrary, in an electrically-conductive auxiliary agent with a balloon shape (Ketjen Black. fullerene or the like) or a scale shape (graphite or the like), which does not have the predetermined bulk density (volume) or the predetermined length, elongation (δ) of the negative electrode active material layer becomes smaller than the above-described range (refer to Comparative examples 1-2 and 1-3). In such a case, in an event where the ternary Si—Zn-M-based alloy active material causes the predetermined-range volume change (expansion/contraction) by the charge/discharge, it becomes difficult for the balloon-like or scale-like electrically-conductive auxiliary agent to follow the predetermined-range volume change of the alloy active material, and it becomes difficult to ensure the conductivity. More specifically, in a state where the alloy active material has contracted, the balloon-like or scale-like electrically-conductive auxiliary agent, which is described above, is in contact with the plurality of alloy active material particles so as to cover surfaces thereof. However, in such a state where the alloy active material has expanded in volume, a surface area of the alloy active material particles is increased, gaps are generated between electrically-conductive auxiliary agent particles on surfaces of the alloy active material particles, and the electrically-conductive auxiliary agent particles are carried on the surfaces of the alloy active material particles, which have expanded in volume, in a dispersed state. As a result, it can be said that a three-dimensional electronic (conductive) network by the balloon-like or scale-like electrically-conductive auxiliary agent cannot be held. resulting in remarkable lowering of the improvement rate of the discharge capacity (refer to Comparative examples 1-2 and 1-3 of FIG. 22). Meanwhile, in the long chain-like electrically-conductive auxiliary agent (long chain-like acetylene black and the like), which does not have the predetermined bulk density or the predetermined length, the elongation (δ) of the negative electrode active material layer becomes larger than the above-described range (refer to Comparative example 1). In such a case, in the state where the alloy active material has contracted, the above-described long chain-like electrically-conductive auxiliary agent is in a state of being entangled into the plurality of alloy active material particles. Therefore, the alloy active material particles are inhibited from expanding in volume by the electrically-conductive auxiliary agent (further. the binding force of the binder, and the like) entangled into the alloy active material particles at the time of the charge. As a result, it can be said that the reaction (insertion/elimination) of the lithium ions to the negative electrode active material, the reaction following the charge/discharge, is inhibited, resulting in the remarkable lowering improvement rate of the discharge capacity (refer to Comparative example 1-1 of FIG. 22). Moreover, a part of the long chain-like electrically-conductive auxiliary agent cannot follow the volume expansion of the alloy active material particles, and cannot hold the state where the above-described electrically-conductive auxiliary agent is entangled into the plurality of alloy active material particles which have expanded in volume. Therefore, it can be said that such a three-dimensional electronic (conductive) network, which is formed between the alloy active material particles in contact with a part of the long chain-like electrically-conductive auxiliary agent, is broken at a variety of places, resulting in the remarkable lowering of improvement rate of the discharge capacity (refer to Comparative example 1-1 of FIG. 22). Moreover, in the pure Si. which is accompanied with an extremely large volume change (four times), opposite to high capacity, the above-described short chain-like or fibrous electrically-conductive auxiliary agent is in a state of being entangled into a plurality of pure Si active material particles, which have expanded in volume, in the negative electrode active material layer. The same applies to a case of using the long chain-like electrically-conductive auxiliary agent. Therefore. the pure Si is inhibited from expanding in volume by the electrically-conductive auxiliary agent (further, the binding force of the binder. and the like) entangled into the pure Si active material particles at the time of the charge. As a result, it can be said that the reaction (insertion/elimination) of the lithium ions to the negative electrode active material, the reaction following the charge/discharge, is inhibited, resulting in the remarkable lowering of the improvement rate of the discharge capacity (refer to Comparative examples 1-4 and 1-5 of FIG. 22). Moreover, a part of the short chain-like or fibrous electrically-conductive auxiliary agent cannot follow the volume expansion of the pure Si active material particles. and cannot hold the state where the above-described electrically-conductive auxiliary agent is entangled into the plurality of pure Si active material particles which have expanded in volume. Therefore, it can be said that such a three-dimensional electronic (conductive) network, which is formed between the pure Si active material particles in contact with a part of the short chain-like or fibrous electrically-conductive auxiliary agent, is broken at a variety of places, resulting in the remarkable lowering of improvement rate of the discharge capacity (refer to Comparative example 1-4 and 1-5 of FIG. 22).

In terms of the action mechanism that the above-described electrically-conductive auxiliary agent can follow the volume change of the alloy active material and ensure the conductivity, it can be said that, also as the binder, it is desirable to use one that can follow the predetermined-range volume change of the alloy active material and ensure the conductivity. That is to say, as a suitable binder, one can be said to be desirable, which has an elastic modulus (elasticity) that enables the binder to follow the predetermined-range volume change of the alloy active material and to hold binding force thereof. From the viewpoints described above, a description is made of the electrically-conductive auxiliary agent and the binder, which are usable in this embodiment.

(Electrically-Conductive Auxiliary Agent for Negative Electrode)

The negative electrode active material layer containing the above-described ternary Si—Zn-M-based alloy active material contains an electrically-conductive auxiliary agent. Here, the electrically-conductive auxiliary agent refers to an additive to be compounded in order to enhance the conductivity of the negative electrode active material layer. In a case of using the existing carbon (carbon material), which is capable of inserting/eliminating Li, as the negative electrode active material, the electrically-conductive auxiliary agent is not particularly required, and meanwhile, in a case where the negative electrode active material does not have sufficient conductivity like the ternary Si—Zn-M-based alloy active material, the electrically-conductive auxiliary agent is required. As such an electrically-conductive auxiliary agent, there are mentioned: carbon powder such as carbon black including short chain-like carbon black (short chain-like acetylene black and the like), long chain-like carbon black (long chain-like acetylene black), Ketjen Black (furnace black), channel black and thermal black, and such as graphite including natural graphite and artificial graphite; carbon fiber such as vapor deposited carbon fiber or liquid deposited carbon fiber (carbon nanotube (CNT), graphite fiber and the like) and carbon nanofiber; and carbon materials such as Vulcan, Black Pearl, carbon nano-horn, carbon nano-balloon, hard carbon, fullerene, and expanded graphite; however, it is needless to say that the electrically-conductive auxiliary agent is not limited to these. Note that the above-described carbon fiber is CNT or carbon fiber (which is graphite-like and hard carbon-like (changed depending on the burning temperature at the time of synthesis thereof)), and is capable of being synthesized by either a liquid phase method or a vapor phase method.

The negative electrode active material layer containing the above-described ternary Si—Zn-M-based alloy active material contains the electrically-conductive auxiliary agent, whereby a three-dimensional electronic (conductive) network in an inside of the negative electrode active material layer is formed effectively, and this can contribute to the enhancement of the output characteristics of the battery.

In particular, in a case of using the electrically-conductive auxiliary agent for adjusting the elongation (δ) of the negative electrode active material layer within the above-described range, it is particularly desirable to use a slim or fibrous electrically-conductive auxiliary agent that can follow the predetermined-range volume change of the ternary Si—Zn-M-based alloy active material and ensure the conductivity. From such a viewpoint, the above-described short chain-like or fibrous electrically-conductive auxiliary agent is desirable as the electrically-conductive auxiliary agent usable for adjusting the elongation (δ) of the negative electrode active material layer within the above-described range. For example, there are mentioned short chain-like carbon black (short chain-like acetylene black and the like); carbon fiber such as vapor deposited carbon fiber or liquid deposited carbon fiber (carbon nanotube (CNT), graphite fiber and the like) and carbon nanofiber; and the like; however, the electrically-conductive auxiliary agent is never limited to these. Note that the above-described carbon fiber is also CNT or carbon fiber (which is graphite-like and hard carbon-like (changed depending on the burning temperature at the time of synthesis thereof)), and is capable of being synthesized by either the liquid phase method or the vapor phase method. By using such an electrically-conductive auxiliary agent, the elongation (δ) of the negative electrode active material layer can be adjusted within the above-described range, and the electrically-conductive auxiliary agent can follow the predetermined-range volume change of the ternary Si—Zn-M-based alloy active material and ensure the conductivity. Note that, in this embodiment, in order to adjust the elongation (δ) of the negative electrode active material layer within the above-described range, a binder may be combined as well as the above-described electrically-conductive auxiliary agent. In such a case, even those other than the electrically-conductive auxiliary agents exemplified above are usable as long as being capable of adjusting the elongation (δ) of the negative electrode active material layer within the above-described range. With regard to such a combination of the electrically-conductive auxiliary agent and the binder, for example, it can be said to be desirable to combine the above-described short chain-like or fibrous electrically-conductive auxiliary agent and a binder to be described below, which has a predetermined elastic modulus (more than 1 GPa to less than 7.4 GPa), with each other.

In the case of using the ternary Si—Zn-M-based alloy active material, desirably, a content of the electrically-conductive auxiliary agent mixed into the negative electrode active material layer is made substantially equal to the content of the electrically-conductive auxiliary agent mixed into the positive electrode active material layer. That is to say, desirably, the content of the electrically-conductive auxiliary agent mixed into the negative electrode active material layer is also set in the range of preferably 1 to 10 mass %, more preferably 2 to 8 mass %, particularly preferably 3 to 7 mass % with respect to a total amount of electrode component materials on the negative electrode side. This is because the above-described ternary Si—Zn-M-based alloy active material is used for the negative electrode active material, and electronic conductivity of the negative electrode active material is low in a similar way to the positive electrode active material, and accordingly, electrode resistance can be reduced by compounding the electrically-conductive auxiliary agent thereinto. Note that, in a case where the negative electrode active material itself uses the carbon-based material such as graphite, soft carbon and hard carbon, which has excellent electronic conductivity, the content of the electrically-conductive auxiliary agent in the negative electrode active material layer just needs to be within the above-described range; however, those which can achieve an object of adding the electrically-conductive auxiliary agent even if a content of each thereof goes out of the above-described range is defined to be incorporated in the scope of this embodiment.

Moreover, a conductive binding agent, which has the functions of the above-described electrically-conductive auxiliary agent and binder in combination, may be used in place of these electrically-conductive auxiliary agent and binder, or may be used in combination with one or both of these electrically-conductive auxiliary agent and binder. As the conductive binder, for example, already commercially available TAB-2 (made by Hohsen Corporation) can be used.

(Binder for Negative Electrode)

The negative electrode active material layer 15 contains a binder. The binder for the negative electrode is added for the purpose of maintaining an electrode structure by binding the active materials to each other or the active material and the current collector to each other. The binder for use in the negative electrode active material layer is not particularly limited; however, for example, as the binder, the following materials are mentioned, which are: a thermoplastic polymer such as polyethylene, polypropylene, polyethylene terephthalate (PET), polyether nitrile (PEN), polyacrylonitrile, polyimide, polyamide, polyamide imide, cellulose, carboxymethylcellulose (CMC), an ethylene-vinyl acetate copolymer, polyvinyl chloride, styrene-butadiene rubber (SBR), isoprene rubber, butadiene rubber, ethylene propylene rubber, an ethylene-propylene-diene copolymer, a styrene-butadiene-styrene block copolymer and a hydrogenated product thereof, and a styrene-isoprene-styrene block copolymer and a hydrogenated product thereof; fluorine resin such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF); polyvinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene-based fluorine rubber (VDF-CTFE-based fluorine rubber); and epoxy resin. Among them, polyvinylidene fluoride, polyimide, styrene-butadiene rubber, carboxymethyl cellulose, polypropylene, polytetrafluoroethylene, polyacrylonitrile, polyamide, and polyamide imide are more preferable. These suitable binders are excellent in heat resistance, further have extremely wide potential windows, are stable at both of the positive electrode potential and the negative electrode potential, and are usable for the negative electrode active material layer. Moreover, the binder such as polyamide, which has relative strong binding force, can suitably hold the Si alloy on the carbon-based material. Furthermore, as the binder for use in the negative electrode active material layer, it is particularly desirable to use one, which has an elastic modulus (elasticity) that enables the binder itself to follow the predetermined-range volume change of the ternary Si—Zn-M-based alloy active material as described above, and to ensure binding force thereof. Li enters Si at the time of the charge, whereby the alloy active material expands. In that case, a binder, which is present while being sandwiched between the expanded active material particles, is compressed, and it is necessary for the binder to have an elastic modulus that can resist compression force thereof. On the contrary, a binder, which is present at positions of binding the expanded active material particles to one another, is elongated, and also in this case, it is necessary to hold the elasticity. In a case where the binder is elongated too much to function as an elastic body, then the binder, which is elongated at the time of the contraction, does not return to an original state thereof, and does not function as the binder. Hence, if the elastic modulus of the binder is more than 1 GPa as a lower side regulated below, then the binder can develop a high improvement rate of the discharge capacity without being damaged by being compressed upon receiving the expansion of the alloy active material or without damaging the elasticity thereof. Moreover, if the E elastic modulus of the binder is less than 7.4 GPa as an upper side regulated below, then the binder is not too hard, and Li can be easily inserted into Si at the time of the charge. That is to say, unless the elastic modulus of the binder is too high, the negative electrode active material can be changed in volume (expand/contract) to the optimum range without inhibiting the insertion/elimination of Li thereinto/therefrom, the insertion/elimination following the charge/discharge. As a result, the reaction of the Li ions with the negative electrode active material (Si) can be suppressed from being inhibited, and the high improvement rate of the discharge capacity can be developed. From such a viewpoint, it is preferable to use polyamide, polyimide and polyamide imide, which have the above-described elastic modulus. These binders may be each used singly, or two or more thereof may be used in combination. In particular, the E elastic modulus (elasticity) of the binder, which can follow the predetermined-range volume change of the ternary Si—Zn-M-based alloy active material as described above, is described in preferred aspects to be described below.

As another aspect of this embodiment, desirably, the above-described binder for a negative electrode contains resin with an E elastic modulus from more than 1.00 GPa to less than 7.40 GPa. This is because it is apprehended that, in both cases where the E elastic modulus of the binder is 1.00 GPa or less and 7.40 or more, the binder cannot follow the volume change of the Si alloy, and the sufficient discharge capacity cannot be achieved. That is to say, though the binder has a function to adhere the Si alloy, the binder cannot endure a pressure, which is applied thereto at the time when the Si alloy expands, since the binder is soft if the E elastic modulus of the binder is 1.00 GPa or less, and then sufficient Li ions cannot be introduced into the Si alloy. Meanwhile, the expansion of the Si alloy at the time when the Li ions are inserted/eliminated is suppressed since the binder is hard if the E elastic modulus of the binder is 7.40 GPa or more. Here, preferably, the resin having the E elastic modulus within the above-described predetermined range is one or two or more selected from the group consisting of polyimide, polyamide imide and polyamide, and particular preferably, the resin is polyimide. Note that, as the value of the E elastic modulus, a value measured in accordance with the tensile test method of JIS K 7163 (1994) is employed. Moreover, in a case where a plurality of the binders is used, at least one resin having the above-described predetermined E elastic modulus just needs to be contained.

Here, the value of the E elastic modulus of the binder depends on a material of the binder, a concentration (solid-liquid ratio) of slurry, a degree of crosslink, and a thermal history such as a drying temperature, a drying speed and a drying time. In this embodiment, these are adjusted, whereby the E elastic modulus of the binder can be adjusted within the above-mentioned desired range.

Here, from a viewpoint of sufficiently exerting the functions and the effects, which are expressed by using, as the binder, the resin having the above-described predetermined E elastic modulus, a content of the resin having the above-described predetermined E elastic modulus, which occupies a total 100 mass % of the binder, is preferably 50 to 100 mass %, more preferably 80 to 100 mass %, still more preferably 90 to 100 mass %, particularly preferably 95 to 100 mass %, most preferably 100 mass %.

Note that an amount of the binder contained in the negative electrode active material layer is not particularly limited as long as the amount allows the binding of the negative electrode active material containing the ternary Si—Zn-M-based alloy with a large volume change; however, is preferably 0.5 to 15 mass %, more preferably 1 to 10 mass % with respect to the active material layer.

(Requirements Common to Positive Electrode and Negative Electrode Active Material Layers 13 and 15)

A description is made below of requirements common to the positive electrode and negative electrode active material layers 13 and 15.

As other additives which can be contained in the positive electrode active material layer 13 and the negative electrode active material layer 15, for example, there are mentioned electrolyte salt (lithium salt), an ion conductive polymer, and the like.

(Electrolyte Salt)

As the electrolyte salt (lithium salt), there are mentioned $Li(C_2FsSO_2)_2N$, $LiPF_6$, $LiBF_4$, $LiClO_4$, $LiAsF_6$, $LiCF_3SO_3$ and the like.

(Ion Conductive Polymer)

As the ion conductive polymer, for example, there are mentioned a polyethylene oxide (PEO)-based polymer and a polypropylene oxide (PPO)-based polymer.

(Compounding Ratio of Each Component Contained in Each Active Material Layer)

The compounding ratio of each component contained in each of the positive electrode active material layer and the negative electrode active material layer is not particularly limited. The compounding ratio can be adjusted by appropriately referring to the knowledge known in public about a non-aqueous solvent-based secondary battery.

(Thickness of Each of Active Material Layers)

A thickness of each of the active material layers (active material layer on one of the surfaces of the current collector) is not particularly limited, either, and knowledge heretofore known in public about the battery can be referred to as appropriate. An example of the thickness is mentioned. In usual, the thickness of each active material layer approximately ranges from 1 to 500 μm, preferably 2 to 100 μm in consideration of the usage purpose of the battery (output is regarded important, energy is regarded important, and so on), and of ion conductivity.

[Current Collector]

(Positive Electrode Current Collector)

The positive electrode current collector 11 is composed of a conductive material. A size of the current collector is determined in response to a usage purpose of the battery. For example, if the current collector is used for a large battery for which a high energy density is required, then a current collector with a large area is used. A thickness of the current collector is not particularly limited, either. In usual, the thickness of the current collector approximately ranges from 1 to 100 μm. A shape of the current collector is not particularly limited, either. In the laminated battery 10 shown in FIG. 1, besides current collector foil, those with a mesh pattern (expand grid and the like) and the like can be used. Note that, in the case where a thin film alloy as an example of the negative electrode active material is directly formed on the negative electrode current collector 12 by the sputtering method and the like, it is desirable to use the current collector foil.

A material that composes the current collector is not particularly limited. For example, metal can be employed, and resin can be employed, in which conductive filler is added to a conductive polymer material or a non-conductive polymer material. Specifically, as metal, there are mentioned aluminum, nickel, iron, stainless steel, titanium, copper and the like. Besides these, there can be preferably used a clad material of nickel and aluminum, a clad material of copper and aluminum, a plated material in which these metals are combined with one another, or the like. Moreover, the metal may be foil in which aluminum is coated on a surface of metal. Among them, aluminum, stainless steel, copper and nickel are preferable from viewpoints of the electron conductivity, a battery operation potential, adherence of the negative electrode active material onto the current collector by the sputtering, and the like.

Moreover, as the conductive polymer material, for example, there are mentioned polyaniline, polypyrrole, polythiophene, polyacetylene, polyparaphenylene, polyphenylene vinylene, polyacrylonitrile, polyoxadiazole and the like. Such conductive polymer materials have sufficient conductivity even if the conductive filler is not added thereto, and accordingly, are advantageous in a point of facilitation of the manufacturing process or of weight reduction of the current collector.

As the non-conductive polymer material, for example, there is mentioned polyethylene (PE: high-density polyethylene (HDPE), low-density polyethylene (LDPE) and the like), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinylidene chloride (PVC), polyvinylidene fluoride (PVdF), polystyrene (PS), or the like. Such non-conductive polymer materials can have excellent potential resistance or solvent resistance.

According to needs, the conductive filler can be added to the conductive polymer material or the non-conductive polymer material, which is described above. In particular, in the case where resin that serves as a base material of the current collector is composed of only the non-conductive polymer, the conductive filler becomes necessarily essential in order to impart the conductivity to the resin. As long as being a material having the conductivity, the conductive filler can be used without receiving limitations in particular. For example, as a material excellent in conductivity, potential resistance or lithium ion barrier properties, there are mentioned metal, conductive carbon and the like. Such metal is not particularly limited; however, preferably, includes at least one metal selected from the group consisting of Ni, Ti, Al, Cu, Pt, Fe, Cr, Sn, Zn, In, Sb and K, or an alloy or a metal oxide, which contains the metal. Moreover, the conductive carbon is not particularly limited. Preferably, the conductive carbon includes at least one selected from the group consisting of acetylene black, Vulcan, Black Pearl, carbon nanofiber, Ketjen Black, carbon nanotube, carbon nano-horn, carbon nano-balloon and fullerene. A loading amount of the conductive filler is not particularly limited as long as being an amount by which sufficient conductivity can be imparted to the current collector, and in general, approximately ranges from 5 to 35 mass %.

(Negative Electrode Current Collector)

The negative electrode current collector 12 is composed of a conductive material. A size of the current collector is determined in response to the usage purpose of the battery. For example, if the current collector is used for a large battery for which a high energy density is required, then a current collector with a large area is used.

A shape of the current collector is not particularly limited, either. In the laminated battery 10 shown in FIG. 1, besides current collector foil, those with a mesh pattern (expand grid and the like) and the like can be used; however, it is desirable to use the current collector foil.

A material that composes the current collector is not particularly limited. For example, metal can be employed, and resin can be employed, in which conductive filler is added to a conductive polymer material or a non-conductive polymer material.

Specifically, as metal, there are mentioned aluminum, nickel, iron, stainless steel, titanium and the like, and alloys of these. Besides these, a clad material of nickel and aluminum, a clad material of copper and aluminum, a plated material in which these metals are combined with one another or the like can be used. Moreover, the metal may be foil in which aluminum is coated on a surface of metal. As will be described later, preferably, copper is used from viewpoints of the electron conductivity, the battery operation potential, the adherence of the negative electrode active material onto the current collector by the sputtering, and the like.

Moreover, as the conductive polymer material, for example, there are mentioned polyaniline, polypyrrole, polythiophene, polyacetylene, polyparaphenylene, polyphenylene vinylene, polyacrylonitrile, polyoxadiazole and the like. Such conductive polymer materials have sufficient conductivity even if the conductive filler is not added thereto, and accordingly, are advantageous in a point of facilitation of the manufacturing process or of weight reduction of the current collector.

As the non-conductive polymer material, for example, there is mentioned polyethylene (PE: high-density polyethylene (HDPE), low-density polyethylene (LDPE) and the like), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinylidene chloride (PVC), polyvinylidene fluoride (PVdF), polystyrene (PS), or the like. Such non-conductive polymer materials can have excellent potential resistance or solvent resistance.

According to needs, the conductive filler can be added to the conductive polymer material or the non-conductive polymer material, which is described above. In particular, in the case where resin that serves as a base material of the current collector is composed of only the non-conductive polymer, the conductive filler becomes necessarily essential in order to impart the conductivity to the resin.

As long as being a material having the conductivity, the conductive filler can be used without receiving limitations in particular. For example, as a material excellent in conductivity, potential resistance or lithium ion barrier properties, there are mentioned metal, conductive carbon and the like. Such metal is not particularly limited; however, preferably, includes at least one metal selected from the group consisting of Ni, Ti, Al, Cu, Pt, Fe, Cr, Sn, Zn, In, Sb and K, or an alloy or a metal oxide, which contains the metal. Moreover, the conductive carbon is not particularly limited. Preferably, the conductive carbon includes at least one selected from the group consisting of acetylene black, Vulcan, Black Pearl, carbon nanofiber, Ketjen Black, carbon nanotube, carbon nano-horn, carbon nano-balloon and fullerene.

A loading amount of the conductive filler is not particularly limited as long as being an amount by which sufficient conductivity can be imparted to the current collector, and in general, approximately ranges from 5 to 35 mass %.

The negative electrode of this embodiment is characterized in that elastic elongation of the current collector in a planar direction is 1.30% or more. Here, the elastic elongation (%) of the current collector is a ratio (%) of a magnitude of elastic elongation to a proportional limit in a tensile direction with respect to an original size of the current collector.

The negative electrode of this embodiment applies such a specific ternary Si alloy as the negative electrode active material, and can thereby obtain a function that a high initial discharge capacity similar to that of the Si negative electrode can be obtained, and simultaneously therewith, the amorphous-crystalline phase transition in the event of alloying Si and Li is suppressed to enhance the cycle lifetime.

However, in a case of fabricating a battery by using the negative electrode in which the negative electrode active material layer having the above-described specific ternary Si alloy together with the binder and the electrically-conductive auxiliary agent is coated on the negative electrode current collector, the expansion/contraction of the negative electrode active material can occur following the charge/discharge of the battery. Following this, the negative electrode active material layer is changed in volume, and a stress is applied to the current collector in intimate contact with the negative electrode active material layer. At this time, if the current collector cannot follow the volume change of the negative electrode active material layer, then the current collector is plastically deformed, and a wrinkle occurs on the current collector. When the wrinkle occurs on the current collector, the negative electrode active material layer is warped, and an inter-electrode distance thereof with the positive electrode becomes nonuniform, and accordingly, the lowering of the Li reactivity and electrode concentration can occur. Moreover, the plastic deformation of the current collector may result in occurrence of crack and fracture of the current collector, and in direct breakage of the negative electrode active material layer. As a result, the lowering of the discharge capacity of the battery may occur.

The negative electrode of this embodiment solves the problems as described above. By using the negative electrode with elastic elongation of 1.30% or more, the current collector can elastically follow the volume change of the negative electrode active material layer, which is caused by the expansion/contraction of the negative electrode active material by the charge/discharge. Therefore, there can be suppressed the wrinkle generated in such a manner that a stress is applied to the current collector in intimate contact with the negative electrode active material layer, and accordingly, there can be prevented the wrinkle of the negative electrode active material layer and the fracture of the negative electrode active material layer or the current collector. As a result, the inter-electrode distance of the negative electrode with the positive electrode can be kept uniform. Moreover, a side reaction also becomes less likely to occur. Therefore, a high discharge capacity can be obtained. Furthermore, the plastic deformation of the current collector becomes less likely to occur even if the charge/discharge is repeated, and accordingly, the cycle durability can also be enhanced.

Moreover, if the current collector has elastic elongation of 1.30% or more, then even in a case where the elasticity of the negative electrode active material layer is lost by the expansion/contraction of the negative electrode active material, which follows the charge/discharge, the current collector is brought into intimate contact with the negative electrode active material layer and is elastically deformed, and accordingly, the lowering of the capacity and the cycle durability can be suppressed to the minimum.

Preferably, the elastic elongation of the current collector for use in the negative electrode of this embodiment is 1.40% or more. If the elastic elongation of the current collector is 1.40% or more, then it is easier for the current collector to follow the volume change of the negative electrode active material for use in this embodiment, the volume change following the charge/discharge, when a consideration is given to a degree thereof. Therefore, the improvement rate of the discharge capacity is high, and the cycle characteristics can be further improved. Moreover, if the elastic elongation of the current collector is 1.50% or more, then a higher effect can be obtained in the case of using the negative electrode active material of this embodiment.

As the elastic elongation of the current collector is larger, the current collector can follow the volume change of the negative electrode active material layer more elastically, and accordingly, an upper limit value of the elastic elongation is not particularly limited.

In the negative electrode active material for use in this embodiment, the volume change following the charge/discharge, is large in comparison with that of the carbon material such as graphite; however, by using the current collector as described above, the plastic deformation of the current collector can be suppressed, and the warp of the negative electrode active material layer, and the lowering of the discharge capacity, which results therefrom, can be suppressed. However, in the case of using the pure Si as the negative electrode active material, the volume change following the charge/discharge is larger, and accordingly, in some case, the current collector cannot follow the volume change of the negative electrode active material layer sufficiently by using the current collector as described above, and it is difficult to prevent the lowering of the discharge capacity. In the case of the active material of the ternary Si alloy for use in this embodiment, the elastic elongation of the current collector just needs to be 1.30% or more, and a battery excellent in discharge capacity and cycle characteristics is obtained (refer to FIG. 25).

Note that, in this specification, as the elastic elongation (%) of the current collector, a value measured in accordance with a tensile test method of JIS K 6251 (2010) is used. Moreover, the elastic elongation (%) of the current collector is a value measured at 25° C.

In the current collector in this embodiment, preferably, tensile strength thereof is 150 N/mm$^2$ or more. If the tensile strength is 150 N/mm$^2$ or more, then an effect of preventing the fracture of the current collector is high.

Note that, in this specification, as the tensile strength (N/mm$^2$) of the current collector, a value measured in accordance with the tensile test method of JIS K 6251 (2010) is used. Moreover, the tensile strength (N/mm$^2$) of the current collector is a value measured at 25° C.

As long as the elastic elongation of the current collector in this embodiment is 1.30% or more, the material that composes the current collector is not particularly limited as mentioned above, and preferably, metal such as copper, aluminum, nickel, iron, stainless steel, titanium and cobalt or an alloy of these metals can be used.

Among the metals described above, metal foil using copper, nickel, stainless steel or an alloy composed by adding other metal to each of these is preferable from viewpoints of mechanical strength, adherence onto the active material layer, chemical stability, electrochemical stability at a potential where the battery reaction progresses, conductivity, cost and the like. In particular, copper or a copper alloy is particularly preferable because of a standard oxidation reduction potential thereof.

As such copper foil, rolled copper foil (copper foil obtained by a rolling method) or electrolytic copper foil (copper foil obtained by an electrolytic method) can be used. Also as such copper alloy foil, both of electrolytic copper alloy foil or rolled copper alloy foil can be used. In the negative electrode of this embodiment, it is preferable to use the rolled copper foil or the rolled copper alloy foil since the rolled copper foil or the rolled copper alloy foil has large tensile strength and is excellent in flexibility.

As the alloy of the copper, an alloy can be preferably used, which is obtained by adding copper with an element, for example, such as Zr, Cr, Zn and Sn. In comparison with pure copper, such an alloy has a high elastic modulus, is easy to follow the volume change of the negative electrode active material layer, and is less likely to cause the plastic deformation. Therefore, the wrinkle and fracture of the current collector are less likely to occur. Moreover, in comparison with pure copper, in the alloy obtained by adding copper with the element such as Zr, Cr, Zn and Sn, heat resistance thereof can be enhanced. In particular, if the alloy is an alloy in which a softening point is higher than a heat treatment temperature (approximately 300° C.) in an event of coating the slurry, which contains the negative electrode active material, on the current collector and drying the slurry in a manufacturing process of the negative electrode, then this is preferable since the elasticity can be maintained even after the heat treatment. Among them, alloys added with Cr, Zn and Sn are preferable since the elasticity can be maintained after the heat treatment can be maintained. These alloy elements may be contained singly, or two or more thereof may be contained. A total content of such an alloy element is, for example, 0.01 to 0.9 mass %, preferably 0.03 to 0.9 mass %, more preferably 0.3 to 0.9 mass %. If the content of the alloy element is 0.03 mass % or more, then this is preferable since the elasticity after the heat treatment can be maintained.

A method of obtaining the current collector with elastic elongation of 1.30% or more is not particularly limited. In a case where the current collector of this embodiment is made of the metal foil, then mechanical characteristics thereof can be changed by heating. heating. cooling, pressurization, and addition of an impurity element. Note that commercially available metal foil having the above-described elongation may be used.

A thickness of the current collector of the negative electrode is not particularly limited, either; however, in the negative electrode of this embodiment, is preferably 5 to 15 μm, more preferably 5 to 10 μm. If the thickness of the current collector of the negative electrode is 5 μm or more, then this is preferable since sufficient mechanical strength is obtained. Moreover, if the thickness of the current collector of the negative electrode is 15 μm or less, then this is preferable in a point of thinning the battery.

Note that, also as a current collector for a bipolar electrode, a similar one to the negative electrode current collector just needs to be used. In particular, it is preferable to use one having durability against the positive electrode potential and the negative electrode potential.

[Electrolyte Layer]

As an electrolyte that composes the electrolyte layer 17, a liquid electrolyte and a polymer electrolyte are usable.

The liquid electrolyte has a form in which lithium salt as supporting salt is dissolved into an organic solvent as a plasticizer. As the organic solvent usable as the plasticizer, for example, there are exemplified carbonates such as ethylene carbonate (EC), propylene carbonates (PC), diethyl carbonate (DEC) and dimethyl carbonate (DMC). Moreover, a compound such as LiBETI is employable in a similar way, and the compound is addible to the active material layer of the electrode as the supporting salt (lithium salt).

Meanwhile, the polymer electrolyte is classified into gel electrolyte that contains an electrolytic solution and intrinsic polymer electrolyte that does not contain the electrolytic solution.

The gel electrolyte has a configuration formed by injecting the above-described liquid electrolyte (electrolytic solution) into a matrix polymer made of an ion-conductive polymer. As the ion-conductive polymer for use as the matrix polymer, for example, polyethylene oxide (PEO), polypropylene oxide (PPO), a copolymer of these, and the like are mentioned. Electrolyte salt such as lithium salt can be dissolved well into such a polyalkylene oxide polymer.

A ratio of the above-described liquid electrolyte (electrolytic solution) in the gel electrolyte should not be particularly limited; however, desirably, is set at approximately several mass % to 98 mass % from viewpoints of the ion conductivity and the like. This embodiment is particularly effective for a gel electrolyte, in which a ratio of the electrolytic solution is as large as 70 mass % or more.

Note that, in a case where the electrolyte layer is composed of the liquid electrolyte, the gel electrolyte or the intrinsic polymer electrolyte, a separator may be used as the electrolyte layer. As a specific form of the separator (including nonwoven fabric), for example, there are mentioned a microporous membrane, a porous flat plate, and further, nonwoven fabric, which are made of polyolefin such as polyethylene and polypropylene.

The intrinsic polymer electrolyte has a configuration formed by dissolving the supporting salt (lithium salt) into the above-described matrix polymer, and the intrinsic polymer electrolyte does not contain the organic solvent as the plasticizer. Hence, in a case where the electrolyte layer is composed of the intrinsic polymer electrolyte, there is no apprehension about liquid leakage from the battery, and reliability of the battery can be enhanced.

The matrix polymer of the gel electrolyte or the intrinsic polymer electrolyte can develop excellent mechanical strength by forming a crosslinked structure. In order to form the crosslinked structure, a polymerizable polymer (for example, PEO and PPO) for forming the polymer electrolyte just needs to be subjected to polymerization treatment such as thermal polymerization, ultraviolet polymerization, radiation polymerization and electron beam polymerization by using an appropriate polymerization initiator.

[Current Collector Plate and Lead]

The current collector plates may be used for the purpose of taking out a current to the outside of the battery. Each of the current collector plates is electrically connected to the current collectors and the leads, and is taken out to the outside of the laminated sheets as the battery exterior member.

A material that composes the current collector plate is not particularly limited, and a publicly known highly conductive material heretofore used as the current collector plate for the lithium ion secondary battery can be used. As a constituent material of the current collector plate, for example, a metal material such as aluminum, copper, titanium, nickel, stainless steel (SUS) and alloys of these is preferable, and aluminum, copper and the like are more preferable from viewpoints of light weight, corrosion resistance and high conductivity. Note that, for the positive electrode current collector plate and the negative electrode current collector plate, the same material may be used, or different materials may be used.

A positive electrode terminal lead and a negative electrode terminal lead are also used according to needs. As a material of the positive electrode terminal lead and the negative electrode terminal lead, a terminal lead to be used in the publicly known lithium ion secondary battery can be used. Note that, preferably, portions taken out from such battery exterior members 29 are covered with heat-resistant insulating heat shrinkage tubes and the like so as not to affect the product (for example, an automotive component, and in particular, an electronic instrument or the like) by causing electric leakage as a result of contact with a peripheral instrument, a wire or the like.

[Battery Exterior Member]

As such a battery exterior member 29, a metal can case publicly known can be used, and moreover, a bag-like case using a laminated film containing aluminum, the case being capable of covering the power generation element, can be used. As the laminated film concerned, for example, a laminated film with a three-layer structure composed by laminating PP, aluminum and Nylon on one another in this order, and the like can be used; however, the laminated film is never limited to these. The laminated film is desirable from viewpoints that the laminated film is excellent in enhancement of the output and in cooling performance, and can be suitably used for a battery for a large instrument such as an EV and an HEV.

Note that the above-described lithium ion secondary battery can be manufactured by a manufacturing method heretofore known in public.

<Exterior Appearance Configuration of Lithium Ion Secondary Battery>

Figure 2:
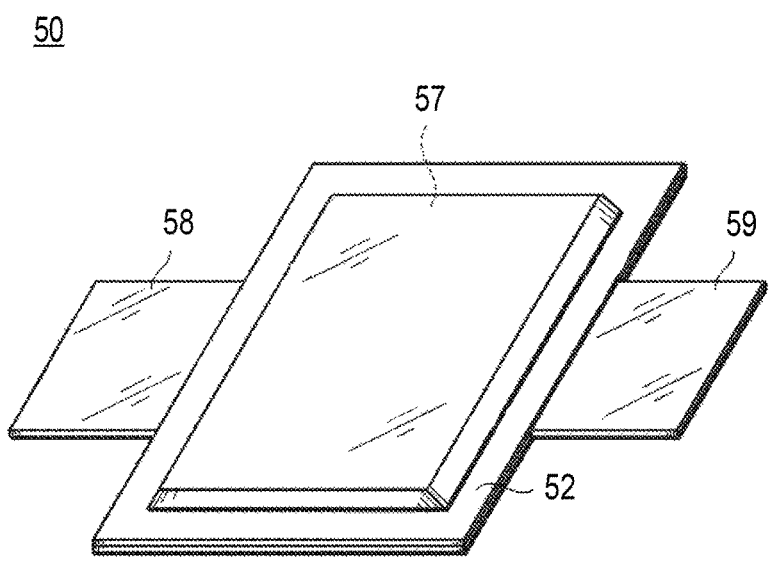
FIG. 2 is a perspective view schematically showing an exterior appearance of a laminated flat lithium ion secondary battery as a typical embodiment of the electrical device according to the present invention.

FIG. 2 is a perspective view showing an exterior appearance of the flat laminated-type lithium ion secondary battery.

As shown in FIG. 2, the flat laminated-type lithium ion secondary battery 50 has a rectangular flat shape, and from both side portions thereof, the positive electrode current collector plate 58 and the negative electrode current collector plate 59, which are for taking out electric power, are drawn out. The power generation element 57 is wrapped by the battery exterior member 52 of the lithium ion secondary battery 50, and a periphery thereof is thermally fused, and the power generation element 57 is hermetically sealed in a state where the positive electrode current collector plate 58 and the negative electrode current collector plate 59 are drawn to the outside. Here, the power generation element 57 corresponds to the power generation element 21 of the lithium ion secondary battery (laminated battery) 10 shown in FIG. 1. The power generation element 57 is one in which a plurality of the single cell layers (single cells) 19, each of which is composed of a positive electrode (positive electrode active material layer) 13, an electrolyte layer 17 and a negative electrode (negative electrode active material layer) 15, are laminated on one another.

Note that the above-described lithium ion secondary battery is not limited to such a laminated-type one (laminated cell) with a flat shape. The lithium ion secondary battery may be a wound-type lithium ion battery, which is one (coin cell) with a cylindrical shape, one (prism cell) with a prism shape, one formed by deforming such a battery with the cylindrical shape into a flat rectangular shape, and further, one with a cylinder cell. As described above, the shape of the lithium ion secondary battery is not particularly limited. In those with the above-described cylindrical shape and the prism shape, a laminated film may be used as a exterior member thereof, or a conventional cylindrical can (metal can) may be used as the exterior member, and as described above, no particular limitations are imposed thereon. Preferably, the power generation element is wrapped with an aluminum laminated film. Weight reduction of the lithium ion secondary battery can be achieved by this form.

Moreover, such drawing out of the positive electrode current collector plate 58 and the negative electrode current collector plate 59, which are shown in FIG. 2, is not particularly limited, either. The positive electrode current collector plate 58 and the negative electrode current collector plate 59 may be drawn out from the same side, and each of the positive electrode current collector plate 58 and the negative electrode current collector plate 59 may be divided into plural pieces, and may be drawn out from the respective sides. As described above, the drawing out of the current collector plates 58 and 59 is not limited to that shown in FIG. 2. Moreover, in the wound-type lithium ion battery, terminals may be formed, for example, by using cylindrical cans (metal cans) in place of the current collector plates.

As described above, the negative electrode using the negative electrode active material for a lithium ion secondary battery according to this embodiment and the lithium ion secondary battery can be suitably used as the large-capacity power supply of the electric vehicle, the hybrid electric vehicle, the fuel cell electric vehicle, the hybrid fuel cell electric vehicle and the like. That is to say, the negative electrode and the lithium ion secondary battery, which are described above, can be suitably used for the vehicle-driving power supply and the auxiliary power supply, for which a high volume energy density and a high volume output density are required.

Note that, in the above-described embodiment, the lithium ion battery is exemplified as the electrical device; however, the electrical device is not limited to this, and the present invention can also be applied to other types of secondary batteries, and further, to a primary battery. Moreover, the present invention can be applied not only to the batteries but also to capacitors.

EXAMPLES

A description is made of the present invention more in detail by using the following examples.

First, as a reference example, performance evaluation for the Si alloy, which is represented by Chemical formula (1), and composes the negative electrode for an electrical device according to the present invention, was performed.

(Reference Example A): Performance Evaluation for $Si_xZn_yV_zA_a$

[1] Fabrication of Negative Electrode

As a sputtering apparatus, there was used a ternary DC magnetron sputtering apparatus (made by Yamato-Kiki Industrial Co., Ltd.; combinatorial sputter coating apparatus; gun-sample distance: approximately 100 mm) of an independent control system. Then, by using this sputtering apparatus, thin films of negative electrode active material alloys having the respective compositions were individually deposited on a substrate (current collector) made of nickel foil with a thickness of 20 μm under the following targets and deposition conditions. As a result, totally 31 types of negative electrode samples including thin films of negative electrode active material alloys having compositions shown in table 1

(Reference Examples 1 to 9 and Reference Comparative Examples 1 to 27)

(1) Targets (manufactured by Kojundo Chemical Laboratory Co., Ltd.; Purity: 4N)
Si: diameter of 50.8 mm; thickness of 3 mm (with backing plate made of oxygen-free copper with thickness of 2 mm)
Zn: diameter of 50.8 mm; thickness of 5 mm
V: diameter of 50.8 mm; thickness of 5 mm
(2) Deposition Condition
Base pressure: up to $7 \times 10^{-6}$ Pa
Type of sputtering gas: Ar (99.9999% or more)
Sputtering gas introduction amount: 10 sccm
Sputtering pressure: 30 mTorr
DC power supply: Si (185 W), Zn (0 to 50 W), V (0 to 150 W)
Pre-sputtering time: 1 min.
Sputtering time: 10 min.
Substrate temperature: room temperature (25° C.)

That is to say, the Si target, the Zn target and the V target, which are as described above, were used, the sputtering time was fixed to 10 minutes, and power of the DC power supply was changed for each of the targets within the above-described ranges. In such a way, alloy thin films in an amorphous state were deposited on Ni substrates, and negative electrode samples including such alloy thin films having a variety of compositions were obtained.

Here, several examples of fabrication conditions of the samples are illustrated. In Sample No. 22 (Reference example), a DC power supply 1 (Si target) was set to 185 W, a DC power supply 2 (Zn target) was set to 40 W, and a DC power supply 3 (V target) was set to 75 W. Moreover, in Sample No. 30 (Comparative reference example), the DC power supply 1 (Si target) was set to 185 W, the DC power supply 2 (Zn target) was set to 0 W, and the DC power supply 3 (V target) was set to 80 W. Furthermore, in Sample No. 35 (Comparative reference example), the DC power supply 1 (Si target) was set to 185 W, the DC power supply 2 (Zn target) was set to 42 W, and the DC power supply 3 (V target) was set to 0 W.

Figure 3:
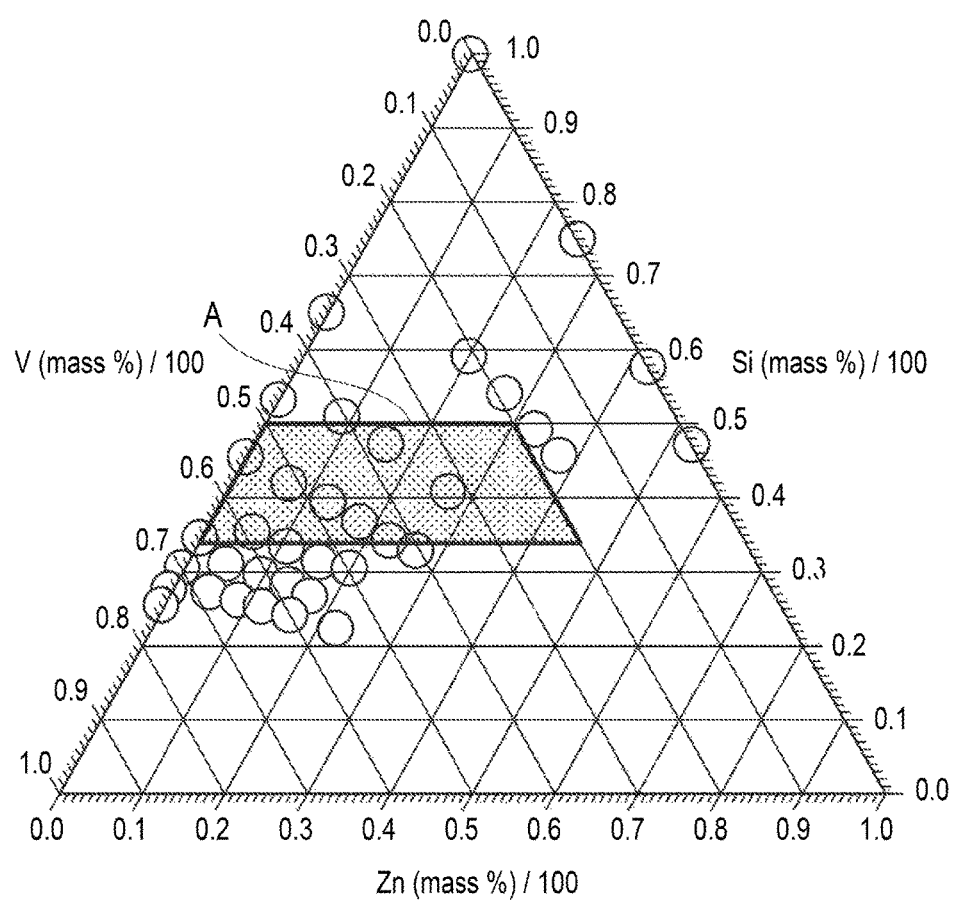
FIG. 3 is a ternary composition diagram showing plotted alloy components, which are obtained in Reference example A, together with a composition range of a Si—Zn—V-based alloy that composes a negative electrode active material contained in a negative electrode for an electrical device according to the present invention.

Component compositions of these alloy thin films are shown in Table 1 and FIG. 3. Note that the obtained alloy thin films were analyzed by using the following analysis method and analysis device.

(3) Analysis Method
Composition analysis: SEM-EDX analysis (made by JEOL Ltd.), EPMA analysis (made by JEOL Ltd.)
Film thickness measurement (for calculating sputtering rate): film thickness meter (made by Tokyo Instruments, Inc.)
Film state analysis: Raman spectroscopic analysis (made by Bruker Corporation)

[2] Fabrication of Battery

Each of the negative electrode samples, which was obtained as described above, and a counter electrode (positive electrode) made of lithium foil were opposed to each other via a separator, and thereafter, an electrolytic solution was injected thereinto, whereby a CR2032-type coin cell prescribed by IEC60086 was individually fabricated.

Note that, as the lithium foil of the counter electrode, lithium foil made by Honjo Metal Co., Ltd. was used, which was punched into a piece with a diameter of 15 mm and a thickness of 200 μm. Moreover, as the separator, Celgard 2400 made by Celgard, LLC was used. Furthermore, as the electrolytic solution, a solution was used, which was obtained by dissolving $LiPF_6$ (lithium hexafluorophosphate) into a mixed non-aqueous solvent so that a concentration of $LiPF_6$ could be 1 M, the mixed non-aqueous solvent being obtained by mixing ethylene carbonate (EC) and diethyl carbonate (DEC) with each other in a volume ratio of 1:1. Note that, as the counter electrode, a positive electrode slurry electrode (for example, $LiCoO_2$, $LiNiO_2$, $LiMn_2O_4$, Li (Ni, Mn, Co) $O_2$, Li (Li, Ni, Mn, Co) $O_2$, $LiRO_2$—$LiMn_2O_4$(R=transition metal element such as Ni, Mn, Co) is also usable.

[3] Charge/Discharge Test of Battery

The following charge/discharge test was implemented for the respective batteries obtained as described above.

That is to say, by using a charge/discharge tester, each of the batteries was charged and discharged in a thermostat oven set at a temperature of 300 K (27° C.). Note that, as the charge/discharge tester, HJ0501SM8A made by Hokuto Denko Corporation was used, and as the thermostat oven, PFU-3K made be Espec Corporation was used.

Then, in a charge process, that is, a Li insertion process to the negative electrode as an evaluation target, each of the batteries was charged with a voltage from 2V to 10 mV at a current of 0.1 mA while setting a constant current/constant voltage mode. Thereafter, in a discharge process, that is, a Li elimination process from the above-described negative electrode, each of the batteries was discharged with a voltage from 10 mV to 2V at a current of 0.1 mA while setting a constant current mode. Such a charge/discharge cycle as described above was taken as one cycle, and this was repeated 50 times.

Then, discharge capacities in the first cycle and the 50th cycle were obtained. Results of this are shown in Table 1 in combination. Note that the "discharge capacity retention rate (%) in the 50th cycle" in Table 1 represents a rate of the 50th-cycle discharge capacity with respect to the 1st-cycle discharge capacity ((50th-cycle discharge capacity)/(1 st-cycle discharge capacity)×100). Moreover, as a charge/discharge capacity, a value calculated per alloy weight is shown.

Note that, in this description, the "charge/discharge capacity (mAh/g)" is a value per weight of the pure Si or the alloy, and represents a capacity when Li reacts with the Si—Zn-M (M=V, Sn, Al, C) alloy (Si-M alloy, pure Si or Si—Zn alloy). Note that, in this description, those written as the "initial capacity" correspond to the "discharge capacity (mAh/g)" in the initial cycle (first cycle).

TABLE 1

| | COMPOSITION (mass %) | | | 1st cycle Discharge capacity | 50th cycle | | |
|---|---|---|---|---|---|---|---|
| | | | | | Discharge capacity | Discharge capacity retention rate | |
| No. | Si | Zn | V | (mAh/g) | (mAh/g) | (%) | Section |
| 1 | 41 | 8 | 51 | 1075 | 986 | 89 | Reference Example A1 |
| 2 | 31 | 5 | 64 | 697 | 648 | 90 | Comparative Reference Example A1 |
| 3 | 59 | 20 | 21 | 1662 | 1378 | 82 | Comparative Reference Example A2 |
| 4 | 39 | 13 | 48 | 1019 | 962 | 91 | Reference Example A2 |
| 5 | 29 | 10 | 61 | 676 | 658 | 93 | Comparative Reference Example A3 |
| 6 | 54 | 27 | 19 | 1467 | 1311 | 87 | Comparative Reference Example A4 |
| 7 | 37 | 18 | 45 | 989 | 952 | 93 | Reference Example A3 |
| 8 | 28 | 14 | 59 | 687 | 691 | 95 | Comparative Reference Example A5 |
| 9 | 49 | 33 | 18 | 1405 | 1252 | 87 | Comparative Reference Example A6 |
| 10 | 34 | 23 | 43 | 912 | 885 | 93 | Reference Example A4 |
| 11 | 27 | 17 | 56 | 632 | 653 | 96 | Comparative Reference Example A7 |
| 12 | 46 | 37 | 17 | 1261 | 1112 | 84 | Comparative Reference Example A8 |
| 13 | 33 | 27 | 40 | 862 | 836 | 93 | Reference Example A5 |
| 14 | 51 | 9 | 40 | 1413 | 1178 | 81 | Comparative Reference Example A9 |
| 15 | 35 | 6 | 59 | 841 | 815 | 93 | Reference Example A6 |
| 16 | 27 | 5 | 68 | 570 | 542 | 90 | Comparative Reference Example A10 |
| 17 | 47 | 16 | 37 | 1245 | 1148 | 90 | Reference Example A7 |
| 18 | 33 | 11 | 56 | 821 | 782 | 93 | Reference Example A8 |
| 19 | 26 | 9 | 65 | 532 | 541 | 95 | Comparative Reference Example A11 |

TABLE 1-continued

| | COMPOSITION (mass %) | | | 1st cycle Discharge capacity | 50th cycle | | |
|---|---|---|---|---|---|---|---|
| | | | | | Discharge capacity | Discharge capacity retention rate | |
| No. | Si | Zn | V | (mAh/g) | (mAh/g) | (%) | Section |
| 20 | 31 | 16 | 53 | 746 | 765 | 94 | Comparative Reference Example A12 |
| 21 | 25 | 12 | 63 | 566 | 576 | 94 | Comparative Reference Example A13 |
| 22 | 41 | 27 | 32 | 1079 | 1045 | 93 | Reference Example A9 |
| 23 | 30 | 20 | 50 | 699 | 718 | 94 | Comparative Reference Example A14 |
| 24 | 24 | 16 | 60 | 530 | 567 | 97 | Comparative Reference Example A15 |
| 25 | 22 | 22 | 56 | 481 | 492 | 93 | Comparative Reference Example A16 |
| 26 | 100 | 0 | 0 | 3232 | 1529 | 47 | Comparative Reference Example A17 |
| 27 | 65 | 0 | 35 | 1451 | 1241 | 85 | Comparative Reference Example A18 |
| 28 | 53 | 0 | 47 | 1182 | 1005 | 85 | Comparative Reference Example A19 |
| 29 | 45 | 0 | 55 | 986 | 824 | 83 | Comparative Reference Example A20 |
| 30 | 34 | 0 | 66 | 645 | 589 | 90 | Comparative Reference Example A21 |
| 31 | 30 | 0 | 70 | 564 | 510 | 88 | Comparative Reference Example A22 |
| 32 | 27 | 0 | 73 | 459 | 422 | 86 | Comparative Reference Example A23 |
| 33 | 25 | 0 | 75 | 366 | 345 | 86 | Comparative Reference Example A24 |
| 34 | 75 | 25 | 0 | 2294 | 1742 | 76 | Comparative Reference Example A25 |
| 35 | 58 | 42 | 0 | 1625 | 1142 | 70 | Comparative Reference Example A26 |
| 36 | 47 | 53 | 0 | 1302 | 961 | 74 | Comparative Reference Example A27 |

From the above results, it was confirmed that the batteries which use, as the negative electrode active material, the Si—Zn—V-based alloys in which the respective components are within specific ranges are excellent in balance between the initial capacity and the cycle characteristics. Particularly, it was able to be confirmed that the batteries which use, as the negative electrode active material, the Si—Zn—V-based alloys, each having an alloy composition in which x ranges 33 to 50, y ranges 0 (exclusive) to 46 (inclusive), and z ranges 21 to 67, is particularly excellent in balance between the initial capacity and the cycle characteristics. Specifically, it was revealed that the batteries of No. 1, 4, 7, 10, 13, 15, 17, 18 and 22 (Reference examples A1 to A9), which correspond to the batteries using the Si alloy negative electrode active material having the compositions within the above-described range, exhibit an initial capacity exceeding 800 mAh/g and a discharge capacity retention rate of 89% or more. In view of this, it was able to be confirmed that the batteries of Reference examples A1 to A9 are particularly excellent in balance between the initial capacity and the cycle characteristics.

(Reference Example B): Performance Evaluation for $Si_xZn_ySn_zA_a$

[1] Fabrication of Negative Electrode

"Zn: diameter of 50.8 mm; thickness of 5 mm" in the targets in (1) of Reference example A was changed to "Zn: diameter of 50.8 mm; thickness of 3 mm", and "V: diameter of 50.8 mm; thickness of 5 mm" in the targets was changed to "Sn: diameter of 50.8 mm; thickness of 5 mm". Moreover, "Zn (0 to 50 W), V (0 to 150 W)" of the DC power supply in (2) was changed to "Zn (0 to 150 W), Sn (0 to 40 W)". In a similar way to Reference example A except the above-described changes, totally 44 types of negative electrode samples were fabricated (Reference examples B1 to B32 and Reference comparative examples B1 to B14).

That is to say, in each of the examples, the Si target, the Zn target and the Sn target were used, the sputtering time was fixed to 10 minutes, and the power level of each DC power supply was changed within the above-described range. In such a way, the alloy thin films in an amorphous state were each deposited on the Ni substrate, and negative electrode samples including the alloy thin films having a variety of compositions were obtained.

Note that, with regard to the DC power supplies in (2) described above, several examples of fabrication conditions of the samples are illustrated. In Reference example B4, the DC power supply 1 (Si target) was set to 185 W, the DC power supply 2 (Sn target) was set to 22 W, and the DC power supply 3 (Zn target) was set to 100 W. Moreover, in Comparative reference example B2, the DC power supply 1 (Si target) was set to 185 W, the DC power supply 2 (Sn target) was set to 30 W, and the DC power supply 3 (Zn target) was set to 0 W. Furthermore, in Comparative reference example B5, the DC power supply 1 (Si target) was set to 185 W, the DC power supply 2 (Sn target) was set to 0 W, and the DC power supply 3 (Zn target) was set to 25 W.

Component compositions of these alloy thin films are shown in Table 2-1 and Table 2-2. Note that the obtained alloy thin films were analyzed by using an analysis method and an analysis device, which are similar to those in Reference example A.

[2] Fabrication of Battery

CR2032-type coin cells were fabricated in a similar way to Reference example A.

[3] Charge/Discharge Test of Battery

A charge/discharge test was implemented for the batteries in a similar way to Reference example A. However, while the charge/discharge cycle was repeated 50 times in Reference example A, the charge/discharge cycle was repeated 100 times in Reference example B.

Then, the discharge capacities in the 1st cycle, the 50th cycle and the 100th cycle were obtained. The discharge capacity retention rates (%) in the 50th cycle and the 100th cycle with respect to the discharge capacity in the 1st cycle were individually calculated. Results of this are shown in Table 2-1 and Table 2-2 in combination, and in addition, are individually illustrated in FIGS. 9 to 11. With regard to such 50th-cycle and 100th-cycle discharge capacity retention rates (%) in Table 2-1 and Table 2-2, for example, each of the 50th-cycle discharge capacity retention rates (%) was calculated as ((50th-cycle discharge capacity)/(1st-cycle discharge capacity))×100.

TABLE 2-1

| Reference Example B | COMPOSITION (mass %) | | | Discharge capacity at 1st cycle (mAh/g) | Discharge capacity retention rate (%) | |
|---|---|---|---|---|---|---|
| | Si | Zn | Sn | | 50th cycle | 100th cycle |
| 1 | 57 | 36 | 7 | 2457 | 94 | 69 |
| 2 | 53 | 40 | 7 | 2357 | 100 | 89 |
| 3 | 47 | 47 | 6 | 2200 | 100 | 98 |
| 4 | 42 | 53 | 5 | 2121 | 100 | 100 |
| 5 | 37 | 58 | 5 | 1857 | 96 | 93 |
| 6 | 35 | 61 | 4 | 1813 | 93 | 61 |
| 7 | 53 | 27 | 20 | 2022 | 92 | 64 |
| 8 | 49 | 33 | 18 | 1897 | 93 | 72 |
| 9 | 45 | 38 | 17 | 1721 | 94 | 72 |
| 10 | 42 | 42 | 16 | 1659 | 100 | 80 |
| 11 | 40 | 45 | 15 | 1522 | 100 | 84 |
| 12 | 37 | 49 | 14 | 1473 | 100 | 92 |
| 13 | 51 | 9 | 40 | 2031 | 92 | 53 |
| 14 | 44 | 22 | 34 | 1803 | 92 | 58 |
| 15 | 41 | 27 | 32 | 1652 | 93 | 60 |
| 16 | 38 | 32 | 30 | 1547 | 94 | 70 |
| 17 | 36 | 36 | 28 | 1448 | 100 | 82 |
| 18 | 32 | 43 | 25 | 1253 | 100 | 34 |
| 19 | 42 | 8 | 50 | 1626 | 92 | 61 |
| 20 | 39 | 13 | 48 | 1603 | 92 | 65 |
| 21 | 37 | 19 | 44 | 1501 | 92 | 68 |
| 22 | 35 | 23 | 42 | 1431 | 93 | 69 |
| 23 | 33 | 27 | 40 | 1325 | 92 | 70 |
| 24 | 30 | 34 | 36 | 1248 | 100 | 83 |
| 25 | 36 | 6 | 58 | 1522 | 92 | 58 |
| 26 | 34 | 12 | 54 | 1453 | 95 | 67 |
| 27 | 32 | 16 | 52 | 1362 | 96 | 72 |
| 28 | 29 | 24 | 47 | 1249 | 76 | 74 |
| 29 | 27 | 30 | 43 | 1149 | 94 | 82 |
| 30 | 25 | 34 | 41 | 1094 | 93 | 87 |
| 31 | 27 | 18 | 55 | 1191 | 92 | 78 |
| 32 | 26 | 21 | 53 | 1142 | 92 | 77 |

TABLE 2-2

| Reference Example B | COMPOSITION (mass %) | | | Discharge capacity at 1st cycle (mAh/g) | Discharge capacity retention rate (%) | |
|---|---|---|---|---|---|---|
| | Si | Zn | Sn | | 50th cycle | 100th cycle |
| 1 | 100 | 0 | 0 | 3232 | 47 | 22 |
| 2 | 56 | 0 | 44 | 1817 | 91 | 42 |
| 3 | 45 | 0 | 55 | 1492 | 91 | 42 |
| 4 | 38 | 0 | 62 | 1325 | 91 | 42 |
| 5 | 90 | 10 | 0 | 3218 | 82 | 36 |
| 6 | 77 | 23 | 0 | 2685 | 82 | 39 |
| 7 | 68 | 32 | 0 | 2398 | 82 | 39 |
| 8 | 60 | 40 | 0 | 2041 | 83 | 37 |
| 9 | 54 | 46 | 0 | 1784 | 83 | 32 |
| 10 | 49 | 51 | 0 | 1703 | 75 | 24 |
| 11 | 31 | 65 | 4 | 1603 | 91 | 40 |
| 12 | 64 | 12 | 24 | 2478 | 91 | 37 |
| 13 | 23 | 30 | 47 | 996 | 72 | 42 |
| 14 | 21 | 35 | 44 | 912 | 66 | 31 |

Figure 5:
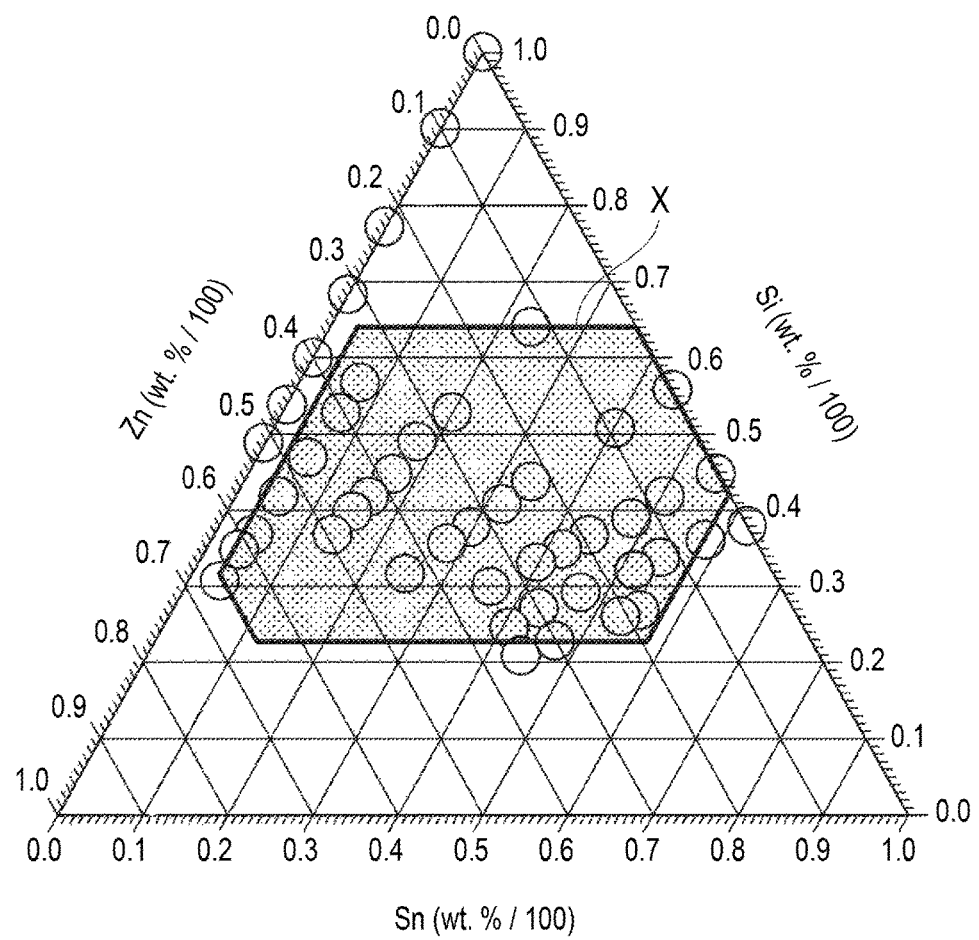
FIG. 5 is a ternary composition diagram showing plotted alloy components, which are deposited in Reference example B, together with a composition range of a Si—Zn—Sn-based alloy that composes a negative electrode active material contained in the negative electrode for an electrical device according to the present invention.
Figure 9:
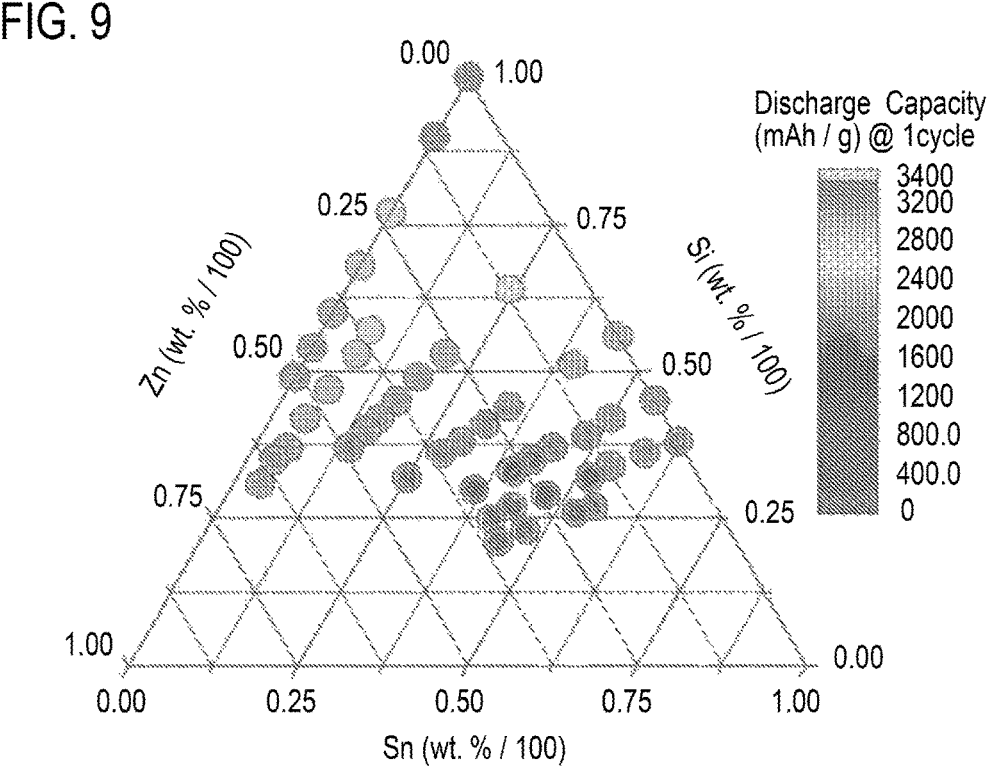
FIG. 9 is a diagram showing an influence of negative electrode active material alloy compositions, which is given to initial discharge capacities of batteries obtained in Reference example B of the present invention.
Figure 10:
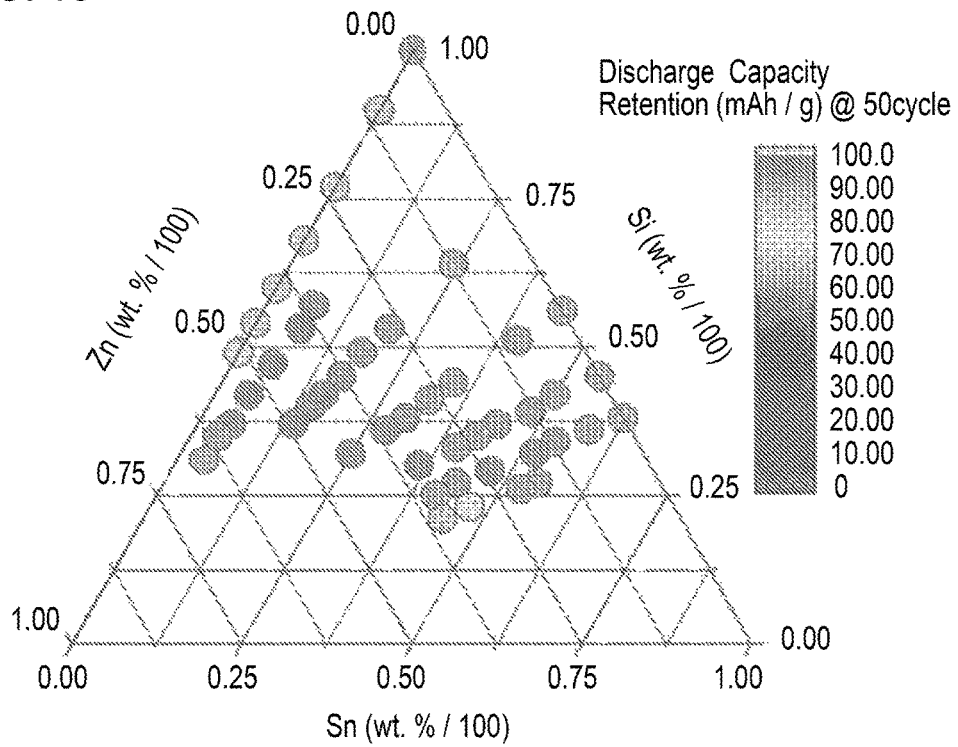
FIG. 10 is a diagram showing relationships between 50th-cycle discharge capacity retention rates and negative electrode active material alloy compositions of the batteries obtained in Reference example B of the present invention.
Figure 11:
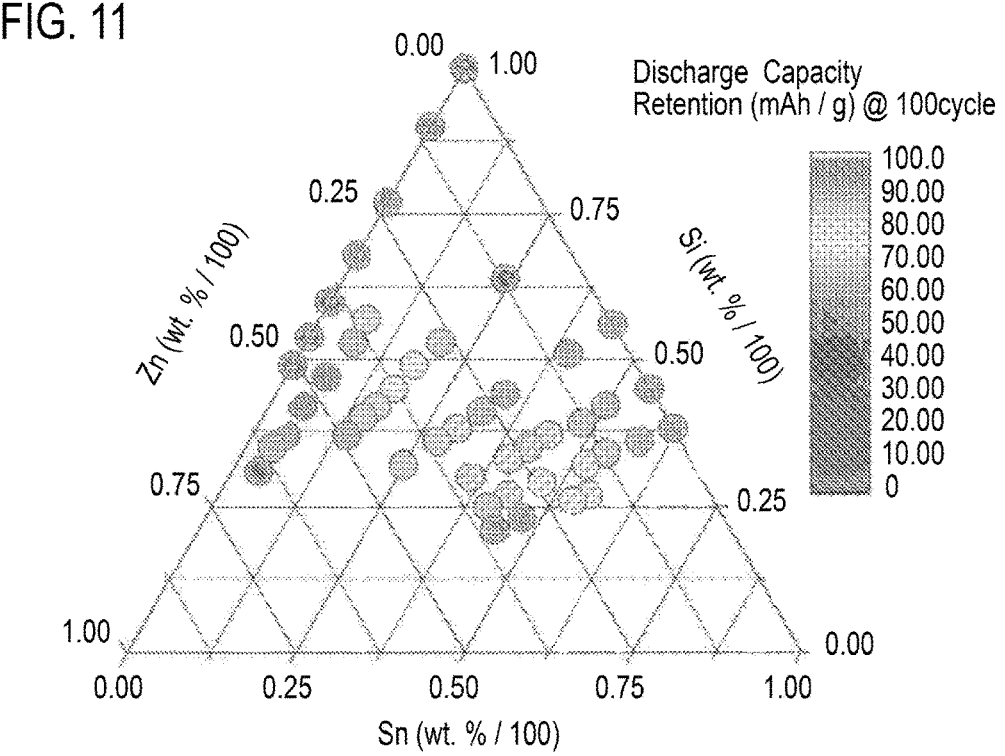
FIG. 11 is a diagram showing relationships between 100th-cycle discharge capacity retention rates and negative electrode active material alloy compositions of the batteries obtained in Reference example B of the present invention.

From results of the above, in the batteries of Reference example B (refer to Table 2-1), which use, as the negative electrode active material, the Si—Zn—Sn-based alloys in which the respective components are within the specific range, that is, the range X shown in FIG. 5, the initial capacity at least exceeding 1000 mAh/g is provided as shown in FIG. 9. Then, as shown in FIG. 10 and FIG. 11, it was confirmed that each of the negative electrode active materials of the Si—Zn—Sn-based alloy in which the respective components are within the range X of FIG. 5 exhibits a discharge capacity retention rate of 92% or more after the 50 cycles, and a discharge capacity retention rate exceeding 50% after the 100 cycles (refer to Reference examples B1 to B32 of Table 2-1).

(Reference Example C): Performance Evaluation for $Si_xZn_yAl_zA_a$

[1] Fabrication of Negative Electrode

"V (purity: 4 N): diameter of 50.8 mm; thickness of 5 mm" in the targets in (1) of Reference example A was changed to "Al (purity: 5 N): diameter of 50.8 mm (diameter of 2 inches); thickness of 5 mm". Moreover, "Zn (0 to 50 W), V (0 to 150 W)" of the DC power supply in (2) was changed to "Zn (30 to 90 W), Al (30 to 180 W)". In a similar way to Reference example A except the above-described changes, totally 48 types of negative electrode samples were fabricated (Samples 1 to 48 of Reference example C).

That is to say, the Si target, the Zn target and the Al target, which are as described above, were used, the sputtering time was fixed to 10 minutes, and the power of each of the DC power supplies was changed within the above-described range. In such a way, alloy thin films in an amorphous state were deposited on Ni substrates, and negative electrode samples including such alloy thin films having a variety of compositions were obtained.

Note that, with regard to the DC supplies in (2) described above, an example of such sample fabrication conditions is illustrated. In Sample 6 of Reference example C, the DC power supply 2 (Si target) was set to 185 W, the DC power supply 1 (Zn target) was set to 70 W, and the DC power supply 3 (Al target) was set to 50 W.

Component compositions of these alloy thin films are shown in Table 3-1 and Table 3-2, which are shown below. Note that the obtained alloy thin films were analyzed by using an analysis method and an analysis device, which are similar to those in Reference example A.

[2] Fabrication of Battery

CR2032-type coin cells were fabricated in a similar way to Reference example A.

[3] Charge/Discharge Test of Battery

A charge/discharge test was implemented for the batteries in a similar way to Reference example A.

In a case of a long term cycle, since an electrolytic solution deterioration mode is also included in the cycle characteristics (on the contrary, the cycle characteristics are improved by using a high-performance electrolytic solution), the data of the 50th cycle in which the component characteristics derived from the alloy are significant were used.

Then, the discharge capacities in the 1st cycle and the 50th cycle were obtained. Moreover, the discharge capacity retention rates (%) in the 50th cycle were individually calculated. Results of this are shown in Table 3-1 and Table 3-2 in combination. Here, the "discharge capacity retention rate (%)" represents an index as to "how much capacity is maintained from the initial capacity". That is to say, each of the 50th-cycle discharge capacity retention rates (%) was calculated as ((50th-cycle discharge capacity)/(maximum discharge capacity))×100. Note that the maximum discharge capacity is exhibited between the initial cycle (1st cycle) and 10 cycles, in usual, between 5 and 10 cycles.

TABLE 3-1

| Sample number | COMPOSITION (mass %) | | | 1st cycle Discharge capacity (mAh/g) | 50th cycle Discharge capacity (mAh/g) | 50th cycle Discharge capacity retention rate (%) |
|---|---|---|---|---|---|---|
| | Si | Zn | Al | | | |
| 1 | 73 | 25 | 2 | 2532 | 2252 | 89 |
| 2 | 60 | 20 | 20 | 2120 | 1898 | 90 |
| 3 | 50 | 17 | 32 | 1837 | 1654 | 90 |
| 4 | 43 | 56 | 1 | 1605 | 1372 | 85 |
| 5 | 38 | 49 | 13 | 1689 | 1523 | 90 |
| 6 | 30 | 69 | 1 | 1306 | 1162 | 89 |
| 7 | 28 | 63 | 9 | 1190 | 1079 | 91 |
| 8 | 26 | 58 | 16 | 1129 | 1054 | 93 |
| 9 | 44 | 15 | 41 | 1627 | 1517 | 93 |
| 10 | 39 | 13 | 48 | 1369 | 148 | 11 |
| 11 | 34 | 12 | 54 | 1268 | 71 | 6 |
| 12 | 31 | 40 | 29 | 1268 | 1223 | 96 |
| 13 | 28 | 37 | 35 | 1166 | 1104 | 95 |
| 14 | 26 | 34 | 40 | 1099 | 1055 | 96 |
| 15 | 24 | 54 | 22 | 896 | 616 | 69 |
| 16 | 22 | 50 | 28 | 824 | 297 | 36 |
| 17 | 21 | 47 | 32 | 871 | 306 | 35 |
| 18 | 34 | 44 | 22 | 1072 | 1016 | 95 |
| 19 | 78 | 19 | 2 | 2714 | 2414 | 89 |
| 20 | 53 | 13 | 34 | 1778 | 253 | 14 |
| 21 | 66 | 33 | 2 | 2458 | 2308 | 94 |
| 22 | 55 | 27 | 18 | 2436 | 2198 | 90 |
| 23 | 56 | 42 | 2 | 2432 | 2177 | 90 |
| 24 | 48 | 36 | 16 | 2065 | 1872 | 91 |
| 25 | 42 | 31 | 27 | 1910 | 1806 | 95 |
| 26 | 46 | 11 | 43 | 1695 | 221 | 13 |
| 27 | 40 | 10 | 50 | 1419 | 154 | 11 |
| 28 | 36 | 9 | 56 | 1309 | 74 | 6 |
| 29 | 36 | 18 | 46 | 1509 | 1430 | 95 |
| 30 | 33 | 16 | 51 | 1389 | 1298 | 93 |
| 31 | 37 | 28 | 35 | 1404 | 1262 | 90 |
| 32 | 33 | 25 | 42 | 1244 | 1150 | 92 |
| 33 | 30 | 23 | 47 | 1274 | 1179 | 93 |
| 34 | 47 | 23 | 30 | 1479 | 1401 | 95 |
| 35 | 41 | 20 | 39 | 1335 | 1290 | 97 |

TABLE 3-2

| Sample number | COMPOSITION (mass %) | | | 1st cycle Discharge capacity (mAh/g) | 50th cycle Discharge capacity (mAh/g) | 50th cycle Discharge capacity retention rate (%) |
|---|---|---|---|---|---|---|
| | Si | Zn | Al | | | |
| 36 | 61 | 0 | 39 | 1747 | 1504 | 86 |
| 37 | 66 | 0 | 34 | 1901 | 1664 | 88 |
| 38 | 72 | 0 | 28 | 2119 | 1396 | 66 |
| 39 | 78 | 0 | 22 | 2471 | 1158 | 47 |
| 40 | 87 | 0 | 13 | 2805 | 797 | 28 |
| 41 | 97 | 0 | 3 | 3031 | 1046 | 35 |
| 42 | 100 | 0 | 0 | 3232 | 1529 | 47 |
| 43 | 90 | 10 | 0 | 3218 | 2628 | 82 |
| 44 | 77 | 23 | 0 | 2685 | 2199 | 82 |
| 45 | 68 | 32 | 0 | 2398 | 1963 | 82 |
| 46 | 60 | 40 | 0 | 2041 | 1694 | 83 |
| 47 | 54 | 46 | 0 | 1784 | 1485 | 83 |
| 48 | 49 | 51 | 0 | 1703 | 1272 | 75 |

It was revealed that, in the batteries of Samples 1 to 35 of this Reference example C, and particularly in the samples of the composition range surrounded by the bold solid line of each of FIG. 15 to FIG. 17, as the 1st-cycle discharge capacity, the remarkably high capacity, which is unrealizable by the existing carbon-based negative electrode active material (carbon/graphite-based negative electrode material), can be realized. It was able to be confirmed that, in a similar way, a higher capacity (initial capacity of 1072 mAh/g or more) in comparison with the existing high capacity Sn-based alloy negative electrode active material can be realized. Moreover, it was able to be confirmed that, also with regard to the cycle durability in the tradeoff relationship with the capacity increase, the remarkably superior cycle durability can be realized in the case of being compared with the existing Sn-based negative electrode active material inferior in cycle durability though the capacity thereof is high and with the multinary alloy negative electrode active material described in Patent Literature 1. Specifically, it was able to be confirmed that the remarkably excellent cycle durability can be realized such that 85% or more, preferably 90% or more, particularly preferably 95% or more can be obtained as the 50th-cycle discharge capacity retention rate. In view of the above, it was revealed that the high capacity can be maintained more sufficiently by suppressing the decrease of the high initial capacity since, among the batteries of Samples 1 to 35, the samples within the composition range surrounded by the solid bold line of each of FIG. 15 to FIG. 17 have larger discharge capacity retention rates in comparison with the batteries in other samples (refer to Table 3-1).

From results of Reference example C, it was revealed that, in the event of the Li alloying, it is extremely useful and effective to select the first additional element Zn that suppresses the amorphous-crystal phase transition and enhances the cycle lifetime and the second additional element Al in which the capacity of the electrode is not decreased even if the concentration of the first additional element is increased. By selecting such first and second additional elements as described above, the Si alloy-based negative electrode active material having the high capacity and the high cycle durability can be provided. It was revealed that, as a result, a lithium ion secondary battery in which a capacity is high and cycle durability is good can be provided. Moreover, from the metal Si or binary alloy of each of Samples 36 to 48 of this Reference example C (refer to Table 3-2), such a battery having, with a good balance, both characteristics of the capacity increase and the high cycle durability, which are in the tradeoff relationship, was not obtained.

Figure 18:
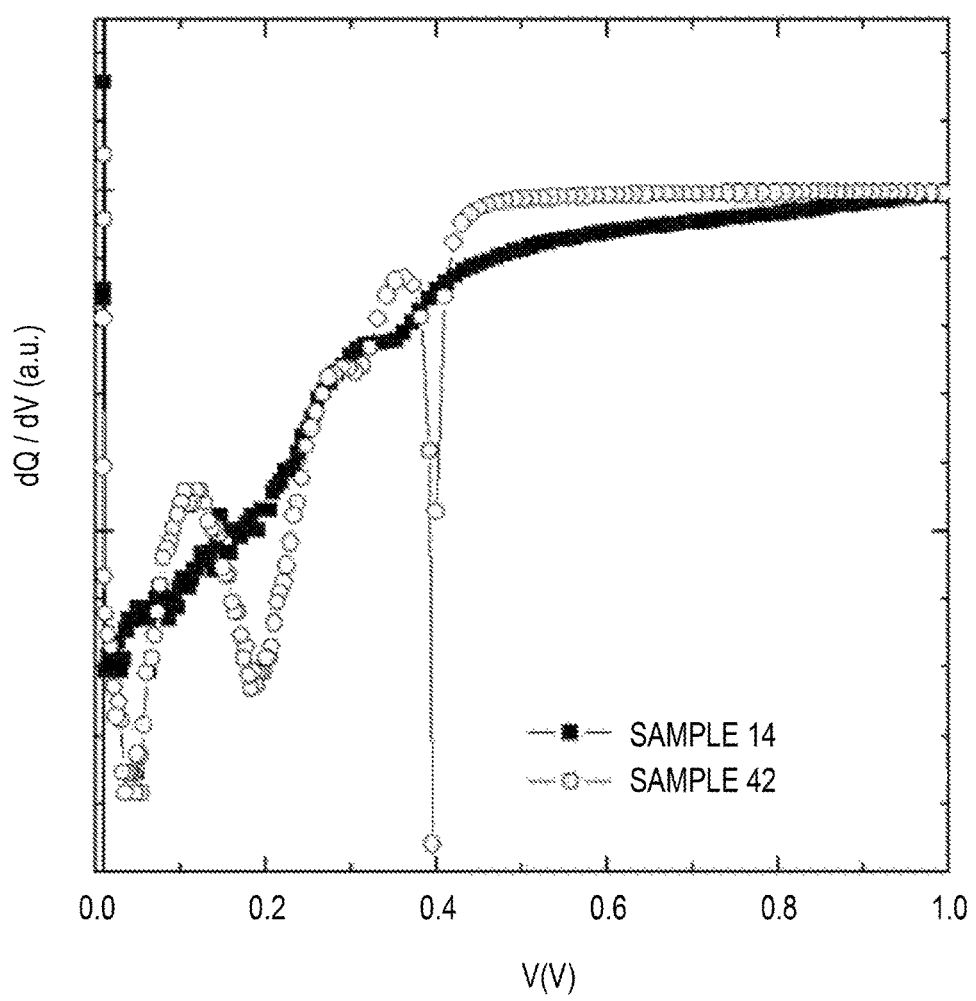
FIG. 18 is a graph showing dQ/dV curves in first-cycle (initial-cycle) discharge processes in the batteries using the respective samples of pure Si (Sample 42) and the ternary Si—Zn—Al-based alloy (Sample 14), which are prepared in Reference example C of the present invention.

For each of evaluation-oriented cells (CR2032-type coin cells) using the evaluation-oriented electrodes of Samples 14 and 42 of Reference example C (refer to Table 3-1, 3-2), the initial cycle was implemented in charge/discharge conditions similar to those of Example 1. dQ/dV curves with respect to a voltage (V) in the charging process of the initial cycle are shown in FIG. 18.

As an interpretation of dQ/dV of Sample 14 of FIG. 18, it was able to be confirmed that crystallization of the Li—Si alloy was suppressed by adding the elements (Zn, Al) besides Si since the curve was gentle due to a reduction in number of downwardly projecting peaks in a region of a low potential (0.4V or less). Moreover, it was also able to be confirmed that decomposition of the electrolytic solution was suppressed (vicinity of approximately 0.4V). Here, Q represents a cell capacity (discharge capacity).

Specifically, the downwardly projecting sharp peak in the vicinity of 0.4V in Sample 42 (pure Si metal thin film) of this Reference example C indicates a change caused by decomposition of the electrolytic solution. Moreover, each of the downwardly projecting gentle peaks in the vicinities of 0.35V, 0.2V, and 0.05V indicates a change from the amorphous state to the crystal state.

Meanwhile, in Sample 14 (Si—Zn—Al ternary alloy thin film) of this Reference example C to which the elements (Zn, Al) were added besides Si, it was also able to be confirmed that the decomposition of the electrolytic solution was suppressed (vicinity of approximately 0.4V) since the downwardly projecting sharp peaks was not found. Moreover, from the dQ/dV curve of Sample 14 of this Reference example C, it was able to be confirmed that the crystallization of Li—Si alloy was suppressed since the curve was gentle and free from the downwardly projecting gentle peak which indicates the change from the amorphous state to the crystal state.

Figure 19:
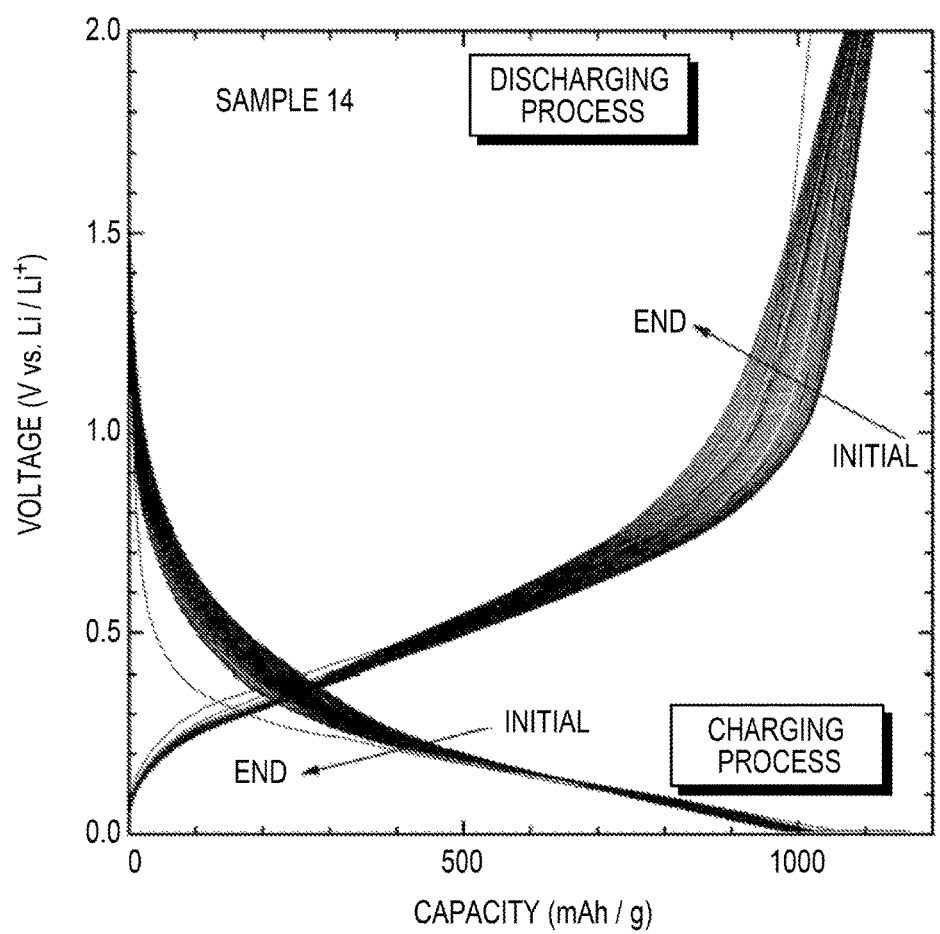
FIG. 19 is a graph showing charging/discharging curves composed of respective charging curves in a charging process up to the 50th cycle and respective discharging curves in a discharging process in an evaluation-oriented cell (CR2032-type coin cell) using an evaluation-oriented electrode of the ternary Si—Zn—Al-based alloy (Sample 14), which is prepared in Reference example C of the present invention, where an arrow from "initial" to "end" in the graph indicates a direction where charging/discharging cycle curves change from the first cycle (initial period) to the 50th cycle (ending period).

For the evaluation-oriented cell (CR2032-type coin cell) using the evaluation-oriented electrode of Sample 14 of this Reference example C, the initial cycle to the 50th cycle were implemented under the charge/discharge conditions similar to those described above. The charge/discharge curves from the initial cycle to the 50th cycle are shown in FIG. 19. The charging process in FIG. 19 indicates states of the charging curves in the respective cycles due to the Li reaction (lithiation) in the evaluation-oriented electrode of Sample 14. The discharging process indicates states of the discharging curves of the respective cycles due to Li elimination (delithiation).

In FIG. 19, the matter that the curves in the respective cycles are dense indicates that the cycle deterioration is small. Moreover, the matter that the kink (turn, twist) of each of the charge/discharge curves is small indicates that the amorphous state can be maintained. Furthermore, the matter that the capacity difference between the charge and the discharge is small indicates that the charge/discharge efficiency is good.

From the above-described test results, it is possible to assume (estimate) the mechanism (functional mechanism) as follows, the mechanism enabling the ternary alloys of Samples 1 to 35 of this Reference example C, and particularly, the ternary alloys of Samples within the composition range surrounded by the bold solid line of each of FIG. 15 to FIG. 17 to exhibit the well-balanced characteristics of achieving the high discharge capacity in the first cycle while maintaining the high cycle characteristics (particularly the high discharge capacity retention rates in the 50th cycle).

1. As shown in FIG. 18, in view of the dQ/dV curve of the ternary alloy (Sample 14), the peak in the low potential region (up to 0.6 V) is smaller in number and gentler than that of the pure-Si (Sample 42) which is not an alloy. This seems to mean that the decomposition of the electrolytic solution is suppressed, and further, that the phase transition of Li—Si alloy to the crystal phase is suppressed (refer to FIG. 18).

2. It is revealed that the decomposition of electrolytic solution causes the discharge capacity to be reduced in each of all Samples 1 to 48 along with the increase in number of cycles, which is caused by this decomposition (refer to Table 3-1, Table 3-2). However, in the case of comparison among the discharge capacity retention rates, it is revealed that the discharge capacity retention rate of each of the ternary alloys is significantly higher than that of the pure-Si of Sample 42, which is not an alloy. Moreover, it is revealed that the high discharge capacity retention rate is realized in comparison with the exiting high capacity Sn-based negative electrode active materials, the multinary alloy negative electrode active materials disclosed in Patent Literature 1, and further, with the binary alloy negative electrode active materials for reference. As a result, it is revealed that the cycle characteristics tend to be enhanced by the realization of the state in which the discharge capacity retention rate is high (refer to the discharge capacity retention rates in the 50th cycle of Table 3-1, 3-2).

3. When the phase transition of Li—Si alloy to the crystal phase occurs, the volume change of the active material is increased. By the phase transition and the volume change, a progression to destruction of the active material itself and then to destruction of the electrode is caused. In view of the dQ/dV curve of FIG. 18, it can be determined that the phase transition is suppressed in Sample 14 of the ternary alloy within the composition range surrounded by the bold solid line of each of FIG. 15 to FIG. 17 since the curve is gentle with the few phase transition-associated peaks.

(Reference Example D): Performance Evaluation for $Si_xZn_yC_zA_a$

[1] Fabrication of Negative Electrode

"Zn: diameter of 50.8 mm; thickness of 5 mm" in the targets in (1) of Reference example A was changed to "Zn: diameter of 50.8 mm; thickness of 3 mm", and "V: diameter of 50.8 mm; thickness of 5 mm" in the targets was changed to "C: diameter of 50.8 mm; thickness of 3 mm (with backing plate made of oxygen-free copper with thickness of 2 mm)". Moreover, "Zn (0 to 50 W), V (0 to 150 W)" of the DC power supply in (2) was changed to "Zn (20 to 90 W), C (30 to 90 W)". In a similar way to Reference example A except the above-described changes, totally 29 types of negative electrode samples were fabricated (Reference examples 1 to 29 of Reference example D).

That is to say, the Si target, the Zn target and the C target, which are as described above, were used, the sputtering time was fixed to 10 minutes, and the power of each of the DC power supplies was changed within the above-described range. In such a way, alloy thin films in an amorphous state were deposited on Ni substrates, and negative electrode samples including such alloy thin films having a variety of compositions were obtained.

Note that, with regard to the DC supplies in (2) described above, several examples of the sample fabrication conditions are illustrated. In Sample No. 5 (Reference example) of Reference example D, the DC power supply 1 (Si target) was set to 185 W, the DC power supply 2 (C target) was set to 60 W, and the DC power supply 3 (Zn target) was set to 30 W. Moreover, in Sample No. 22 (Comparative reference example) of Reference example D, the DC power supply 1 (Si target) was set to 185 W, the DC power supply 2 (C target) was set to 45 W, and the DC power supply 3 (Zn target) was set to 0 W. Furthermore, in Sample No. 26 (Comparative reference example) of Reference example D, the DC power supply 1 (Si target) was set to 185 W, the DC power supply 2 (C target) was set to 0 W, and the DC power supply 3 (Zn target) was set to 28 W.

Figure 20:
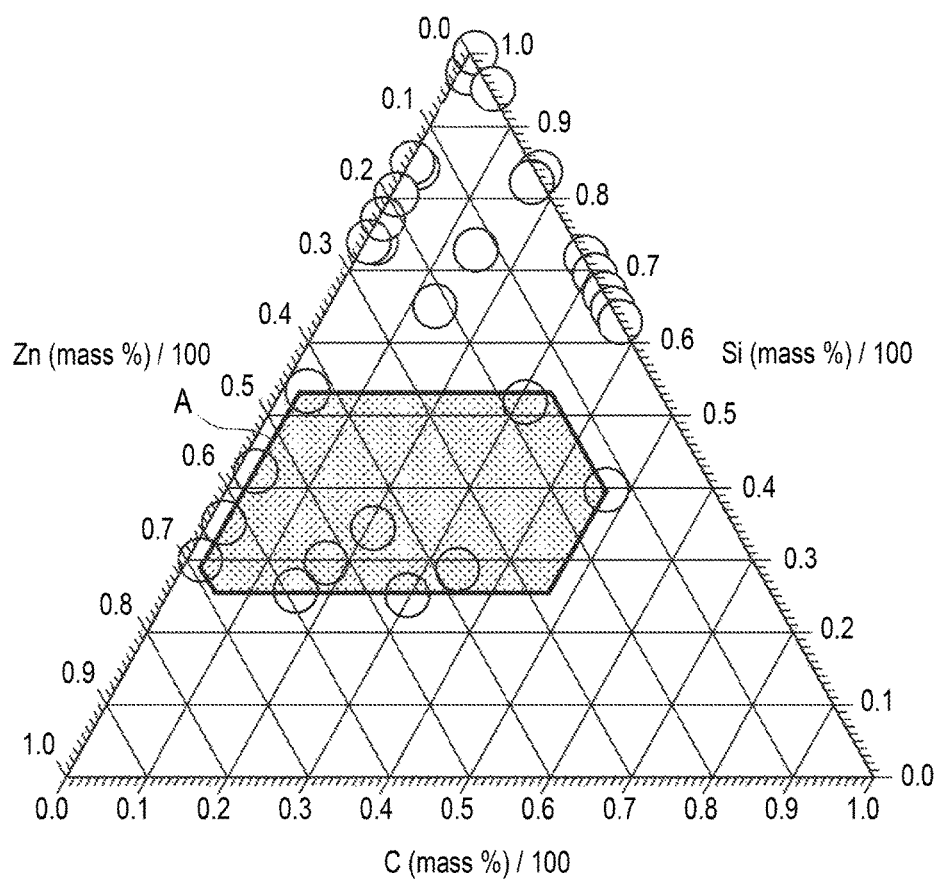
FIG. 20 is a ternary composition diagram showing plotted alloy components, which are deposited in Reference example D, together with a composition range of a Si—Zn—C-based alloy that composes the negative electrode active material contained in the negative electrode for an electrical device according to the present invention.

Component compositions of these alloy thin films are shown in Table 4 and FIG. 20. Note that the obtained alloy thin films were analyzed by using an analysis method and an analysis device, which are similar to those in Reference example A.

[2] Fabrication of Battery

CR2032-type coin cells were fabricated in a similar way to Reference example A.

[3] Charge/Discharge Test of Battery

A charge/discharge test was implemented for the batteries in a similar way to Reference example A. Note that the charge capacity and the discharge capacity in the first cycle and the discharge capacity in the 50th cycle were measured for each sample, and the respective items of Table 4 were calculated. Results of this are shown in Table 4 in combination. The discharge capacity retention rate (%) after 50 cycles in Table 4 indicates the rate of the 50th-cycle discharge capacity with respect to the 1 st-cycle discharge capacity ((50th-cycle discharge capacity)/(1st-cycle discharge capacity)×100). Moreover, the "charge/discharge efficiency" indicates the rate of the discharge capacity with respect to the charge capacity (discharge capacity/charge capacity×100).

alloys for use in the present invention have characteristics similar to those of $Si_{41}Zn_{20}Sn_{39}$. That is to say, in a case of using alloys having similar characteristics, similar effects can be obtained even if the type of the alloy is changed.

TABLE 4

| No. | COMPOSITION (mass %) | | | Initial (1st-cycle) discharge capacity (mAh/g) | Discharge capacity retention rate after 50 cycles (mAh/g) | Initial (1st-cycle) charge/discharge efficiency (%) | Section |
|---|---|---|---|---|---|---|---|
| | Si | Zn | C | | | | |
| 1 | 53.40 | 44.00 | 2.60 | 1819 | 77 | 100 | Reference Example D1 |
| 2 | 42.45 | 55.48 | 2.07 | 1668 | 74 | 98 | Reference Example D2 |
| 3 | 35.22 | 63.06 | 1.72 | 1378 | 77 | 97 | Reference Example D3 |
| 4 | 30.10 | 68.43 | 1.47 | 1221 | 72 | 97 | Reference Example D4 |
| 5 | 51.95 | 17.68 | 30.37 | 1693 | 75 | 99 | Reference Example D5 |
| 6 | 34.59 | 45.20 | 20.21 | 1326 | 78 | 98 | Reference Example D6 |
| 7 | 29.63 | 53.05 | 17.32 | 1215 | 71 | 98 | Reference Example D7 |
| 8 | 25.92 | 58.93 | 15.15 | 1129 | 74 | 98 | Reference Example D8 |
| 9 | 39.85 | 13.57 | 46.59 | 1347 | 69 | 99 | Reference Example D9 |
| 10 | 28.77 | 37.60 | 33.63 | 1103 | 79 | 98 | Reference Example D10 |
| 11 | 25.26 | 45.21 | 29.53 | 1059 | 72 | 98 | Reference Example D11 |
| 12 | 97.73 | 1.79 | 0.48 | 3099 | 48 | 89 | Comparative Reference Example D1 |
| 13 | 84.44 | 15.15 | 0.41 | 2752 | 52 | 90 | Comparative Reference Example D2 |
| 14 | 74.33 | 25.31 | 0.36 | 2463 | 53 | 89 | Comparative Reference Example D3 |
| 15 | 82.56 | 1.51 | 15.93 | 2601 | 59 | 90 | Comparative Reference Example D4 |
| 16 | 72.87 | 13.07 | 14.06 | 2483 | 68 | 90 | Comparative Reference Example D5 |
| 17 | 65.22 | 22.20 | 12.58 | 2136 | 55 | 90 | Comparative Reference Example D6 |
| 18 | 100.00 | 0.00 | 0.00 | 3232 | 47 | 91 | Comparative Reference Example D7 |
| 19 | 95.36 | 0.00 | 4.64 | 3132 | 58 | 92 | Comparative Reference Example D8 |
| 20 | 83.69 | 0.00 | 16.31 | 2778 | 64 | 91 | Comparative Reference Example D9 |
| 21 | 71.96 | 0.00 | 28.04 | 2388 | 51 | 91 | Comparative Reference Example D10 |
| 22 | 69.52 | 0.00 | 30.48 | 2370 | 68 | 91 | Comparative Reference Example D11 |
| 23 | 67.24 | 0.00 | 32.76 | 2295 | 54 | 91 | Comparative Reference Example D12 |
| 24 | 65.11 | 0.00 | 34.89 | 2240 | 32 | 87 | Comparative Reference Example D13 |
| 25 | 63.11 | 0.00 | 36.89 | 2120 | 59 | 91 | Comparative Reference Example D14 |
| 26 | 85.15 | 14.85 | 0.00 | 2618 | 76 | 88 | Comparative Reference Example D15 |
| 27 | 80.83 | 19.17 | 0.00 | 2268 | 70 | 87 | Comparative Reference Example D16 |
| 21 | 77.15 | 22.85 | 0.00 | 2132 | 74 | 87 | Comparative Reference Example D17 |
| 29 | 73.97 | 26.03 | 0.00 | 2640 | 80 | 89 | Comparative Reference Example D18 |

From Table 4, it is revealed that the batteries of Sample number 1 to 11 according to Reference example D are excellent in balance between the initial charge/discharge efficiency and the discharge capacity retention rate. It was confirmed that, particularly, the batteries within the range where the above-described x is more than 25 to less than 54, the above-described y is more than 17 to less than 69, and z is more than 1 to less than 34 are good (refer to FIG. 21). It is revealed that, as opposed to this, in each of the batteries of Sample number 12 to 29 according to Comparative reference example D, the lowering of the initial charge/discharge efficiency and/or the discharge capacity retention rate is significant though the initial charge capacity is large in comparison with the batteries of Reference example D.

Next, in Example 1 to be described below, performance evaluation was performed for each negative electrode for an electrical device, in which $Si_{41}Zn_{20}Sn_{39}$ in the above-described Si alloy is used as a negative electrode active material, and the elongation of the negative electrode active material layer is changed (specifically, a negative electrode active material layer in which the type of the electrically-conductive auxiliary agent or the like is changed is provided).

Note that, also with regard to other alloys than $Si_{41}Zn_{20}Sn_{39}$, which are used in the present invention (that is, those other than $Si_{41}Zn_{20}Sn_{39}$ among $Si_xZn_yV_zA_a$, $Si_xZn_ySn_zA_a$ and $Si_xZn_yAl_zA_a$ and $Si_xZn_yC_zA_a$), the same or similar results as or to those in Examples 1 to 4 using $Si_{41}Zn_{20}Sn_{39}$ are obtained. A reason for this is that, as shown in Reference examples A to D, the above-described other Example 1-1

[Manufacturing of Si Alloy]

The above-described Si alloy was manufactured by the mechanical alloy method (or the arc plasm fusion method). Specifically, a planetary ball mill apparatus P-6 made by Fritsch GmbH in Germany was used, zirconia-made milling balls and powders of the respective raw materials of the alloy were poured into a zirconia-made milling pot, and an alloy was made at 600 rpm for 48 hours.

[Fabrication of Negative Electrode]

90 mass parts of the negative electrode active material, 5 mass parts of the electrically-conductive auxiliary agent and 5 mass parts of the binder were mixed with one another, and were dispersed into N-methyl-2-pyrrolidone (NMP), whereby negative electrode slurry was obtained. Here, for the negative electrode active material, the Si alloy ($Si_{41}Zn_{20}Sn_{39}$; mean particle diameter of 0.3 μm) fabricated as described above was used. Moreover, for the electrically-conductive auxiliary agent, short chain-like acetylene black was used as the short chain-like carbon black, and for the binder, polyimide (E elastic modulus of 2.1 GPa) was used. Subsequently, the obtained negative electrode slurry was uniformly coated on both surfaces of a negative electrode current collector, which was made of copper foil (elastic elongation of 1.4%) with a thickness of 10 μm, so that a thickness of the negative electrode active material layers could be 30 μm, followed by drying in vacuum for 24 hours, whereby a negative electrode was obtained.

[Fabrication of Positive Electrode]

90 mass parts of the positive electrode active material, 5 mass parts of the electrically-conductive auxiliary agent and 5 mass parts of the binder were mixed with one another, and were dispersed into NMP, whereby positive electrode slurry was obtained. Here, for the positive electrode active material, $Li_{1.85}N_{0.18}Co_{0.10}Mn_{0.87}O_3$ was prepared by the method described in Example 1 (paragraph 0046) of Japanese Patent Unexamined Publication No. 2012-185913. Moreover, acetylene black was used for the electrically-conductive auxiliary agent, and polyvinylidene fluoride (PVdF) was used for the binder. Subsequently, the obtained positive electrode slurry was uniformly coated on both surfaces of a positive electrode current collector, which was made of aluminum foil with a thickness of 20 μm, so that a thickness of the positive electrode active material layers could be 30 μm, followed by drying, whereby a positive electrode was obtained.

[Fabrication of Battery]

The positive electrode and the negative electrode, which were fabricated as described above, were opposed to each other, and a separator (polypropylene-made microporous membrane; membrane thickness of 20 μm) was arranged therebetween. Subsequently, a laminated body of the negative electrode, the separator and the positive electrode was arranged on a bottom side of a coin cell (CR2032; material: stainless steel (SUS316)). Moreover, a gasket was attached in order to keep insulating properties between the positive electrode and the negative electrode, the following electrolytic solution was injected thereinto by a syringe. Then, springs and spacers were stacked, upper sides of such coin cells were superimposed on one another, and were hermetically sealed by crimping the same, whereby a lithium ion secondary battery was obtained.

Note that, as the above-described electrolytic solution, a solution was used, which was obtained by dissolving lithium phosphate hexafluoride ($LiPF_6$) as the supporting salt into an organic solvent so that a concentration thereof could be 1 mol/L. Here, the organic solvent was obtained by mixing ethylene carbonate (EC) and diethyl carbonate (DEC) in a ratio of EC:DEC=1:2 (volume ratio).

Example 1-2

A negative electrode and a battery were fabricated in a similar way to Example 1-1 except that the electrically-conductive auxiliary agent of the negative electrode was changed to carbon nanotube as liquid phase carbon fiber.

Example 1-3

A negative electrode and a battery were fabricated in a similar way to Example 1-1 except that the electrically-conductive auxiliary agent of the negative electrode was changed to graphite nanofiber as vapor phase carbon fiber.

Comparative Example 1-1

A negative electrode and a battery were fabricated in a similar way to Example 1-1 except that the electrically-conductive auxiliary agent of the negative electrode was changed to long chain-like acetylene black as long chain-like carbon black.

Comparative Example 1-2

A negative electrode and a battery were fabricated in a similar way to Example 1-1 except that the electrically-conductive auxiliary agent of the negative electrode was changed to artificial graphite.

Comparative Example 1-3

A negative electrode and a battery were fabricated in a similar way to Example 1-1 except that the electrically-conductive auxiliary agent of the negative electrode was changed to Ketjen Black.

Comparative Example 1-4

A negative electrode and a battery were fabricated in a similar way to Example 1-1 except that the electrically-conductive auxiliary agent of the negative electrode was changed to graphite fiber as liquid phase carbon fiber, and that the negative electrode active material was changed to pure Si (purity of 99.999%).

Comparative Example 1-5

A negative electrode and a battery were fabricated in a similar way to Example 1-1 except that the negative electrode active material was changed to pure Si (purity of 99.999%), and that the binder of the negative electrode was changed to PVdF.

[Measurement of Elongation (%) of Negative Electrode Active Material Layer]

For each of the lithium ion secondary batteries fabricated as described above, the elongation (%) of the negative electrode active material layer was measured. Specifically, the elongation (%) of the negative electrode active material layer was measured by a value measured in accordance with the tensile test method of JIS K 7163 (1994). Note that, also for each of the lithium ion secondary batteries fabricated in the following Examples and Comparative examples, the elongation (%) of the negative electrode active material layer was measured in a similar way to the above.

<Performance Evaluation>

[Evaluation of Cycle Characteristics]

For each of the lithium ion secondary batteries fabricated as described above, the cycle characteristics were evaluated in the following way. Under an atmosphere of 30° C., each battery was charged with up to 2.0V in a constant current mode (CC; current of 0.1 C), was left standing for 10 minutes, thereafter, was discharged to 0.01V by a constant current (CC; current of 0.1 C), and was left standing for 10 minutes after the discharge. This charge/discharge process was taken as one cycle, a charge/discharge test of 100 cycles was performed, and a rate (discharge capacity retention rate [%] of a discharge capacity in a 100th cycle with respect to a discharge capacity in a first cycle was obtained. A discharge capacity retention rate in Comparative example 1-1 was taken as 100, and a rate of a discharge capacity retention rate of each of other Examples and Comparative examples with respect thereto was defined as an improvement rate of the discharge capacity (%). Results thus obtained are shown in the following Table 5 and FIG. 22.

TABLE 5

| | Type of negative electrode active material | Type of negative electrode binder | Negative electrode electrically-conductive auxiliary agent | Elongation of negative electrode active material layer (%) | Improvement rate of discharge capacity (%) (comparative example 1-1 is 100) |
|---|---|---|---|---|---|
| Example 1-1 | Si alloy | polyimide | short chain-like carbon black | 1.53 | 123 |
| Example 1-2 | Si alloy | polyimide | liquid phase carbon fiber | 1.57 | 120 |
| Example 1-3 | Si alloy | polyimide | vapor phase carbon fiber | 1.40 | 106 |
| Comparative Example 1-1 | Si alloy | polyimide | long chain-like carbon black | 1.70 | 100 |
| Comparative Example 1-2 | Si alloy | polyimide | artificial graphite | 1.29 | 95 |
| Comparative Example 1-3 | Si alloy | polyimide | Ketjen Black | 1.23 | 95 |
| Comparative Example 1-4 | Pure Si | polyimide | vapor phase carbon fiber | 1.70 | 75 |
| Comparative Example 1-5 | Pure Si | PVdF | short chain-like carbon black | 1.50 | 53 |

From the results of the above-described Table 5 and FIG. 22, the ternary Si—Zn-M-based alloy is applied to the negative electrode active material, and further, the appropriate type of the binder and the appropriate type of the electrically-conductive auxiliary agent are combined therewith, whereby the elongation of the negative electrode active material layer can be set within the predetermined range. It is understood that the improvement of the improvement rate of the discharge capacity can be achieved by setting the elongation ($\delta$) of the negative electrode active material layer within the range of 1.29<$\delta$<1.70%. The elongation ($\delta$) is set within a range of 1.40≤$\delta$<1.70%, preferably 1.40≤$\delta$≤1.66%, more preferably 1.40≤$\delta$≤1.57%, still more preferably 1.47≤$\delta$≤1.57%, particularly preferably 1.53≤$\delta$≤1.57%, whereby the improvement rate of the discharge capacity can be further improved (refer to Examples 1-1 to 1-3 and Comparative examples 1-1 to 1-3 in comparison with each other).

In particular, it was also able to be confirmed that, as the negative electrode active material, the ternary Si—Zn-M-based alloy was used in place of the pure Si, whereby the improvement of the improvement rate of the discharge capacity could be remarkably achieved (refer to FIG. 22 where a graph of Examples 1-1 to 1-3 and Comparative examples 1-1 to 1-3 and data of Comparative examples 1-4 and 1-5 are spaced apart from each other).

Next, in Example 2 to be described below, performance evaluation was performed for negative electrodes for an electrical device, which use $Si_{41}Zn_{20}Sn_{39}$ among the above-described Si alloys as the negative electrode active material.

Example 2-1

[Manufacturing of Si Alloy]

The Si alloy was manufactured by the mechanical alloy method (or the arc plasm fusion method). Specifically, a planetary ball mill apparatus P-6 made by Fritsch GmbH in Germany was used, zirconia-made milling balls and powders of the respective raw materials of the alloy were poured into a zirconia-made milling pot, and an alloy was made at 600 rpm for 48 hours.

[Fabrication of Negative Electrode]

80 mass parts of the negative electrode active material, 5 mass parts of the electrically-conductive auxiliary agent and 15 mass parts of the binder were mixed with one another, and were dispersed into N-methyl-2-pyrrolidone (NMP), whereby negative electrode slurry was obtained. Here, for the negative electrode active material, the Si alloy ($Si_{42}Ti_7Sn_{51}$; mean particle diameter of 0.3 μm) fabricated as described above was used. Moreover, for the electrically-conductive auxiliary agent, short chain-like acetylene black was used as the short chain-like carbon black, and for the binder, polyamide (E elastic modulus of 2.00 GPa) was used. Subsequently, the obtained negative electrode slurry was uniformly coated on both surfaces of a negative electrode current collector, which was made of copper foil (elastic elongation of 1.4%) with a thickness of 10 μm, so that a thickness of the negative electrode active material layers could be 30 μm, followed by drying in vacuum for 24 hours, whereby a negative electrode was obtained.

[Fabrication of Positive Electrode]

90 mass parts of the positive electrode active material, 5 mass parts of the electrically-conductive auxiliary agent and 5 mass parts of the binder were mixed with one another, and were dispersed into NMP, whereby positive electrode slurry was obtained. Here, for the positive electrode active material, $Li_{1.85}N_{0.18}Co_{0.10}Mn_{0.87}O_3$ was prepared by the method described in Example 1 (paragraph 0046) of Japanese Patent Unexamined Publication No. 2012-185913. Moreover, acetylene black was used for the electrically-conductive auxiliary agent, and polyvinylidene fluoride (PVdF) was used for the binder. Subsequently, the obtained positive electrode slurry was uniformly coated on both surfaces of a positive electrode current collector, which was made of aluminum foil with a thickness of 20 μm, so that a thickness of the positive electrode active material layers could be 30 μm, followed by drying, whereby a positive electrode was obtained.

[Fabrication of Battery]

The positive electrode and the negative electrode, which were fabricated as described above, were opposed to each other, and a separator (polypropylene-made microporous membrane; membrane thickness of 20 μm) was arranged therebetween. Subsequently, a laminated body of the negative electrode, the separator and the positive electrode was arranged on a bottom side of a coin cell (CR2032; material: stainless steel (SUS316)). Moreover, a gasket was attached in order to keep insulating properties between the positive electrode and the negative electrode, the following electrolytic solution was injected thereinto by a syringe. Then, springs and spacers were stacked, upper sides of such coin cells were superimposed on one another, and were hermetically sealed by crimping the same, whereby a lithium ion secondary battery was obtained.

Note that, as the above-described electrolytic solution, a solution was used, which was obtained by dissolving lithium phosphate hexafluoride ($LiPF_6$) as the supporting salt into an organic solvent so that a concentration thereof could be 1 mol/L. Here, the organic solvent was obtained by mixing ethylene carbonate (EC) and diethyl carbonate (DEC) in a ratio of EC:DEC=1:2 (volume ratio).

Example 2-2

A negative electrode and a battery were fabricated in a similar way to Example 2-1 except that, as the binder, polyimide (E elastic modulus of 2.10 GPa) was used in place of the polyamide imide (E elastic modulus of 2.00 GPa).

Example 2-3

A negative electrode and a battery were fabricated in a similar way to Example 2-1 except that, as the binder, polyimide (E elastic modulus of 3.30 GPa) was used in place of the polyamide imide (E elastic modulus of 2.00 GPa).

Example 2-4

A negative electrode and a battery were fabricated in a similar way to Example 2-1 except that, as the binder, polyimide (E elastic modulus of 3.73 GPa) was used in place of the polyamide imide (E elastic modulus of 2.00 GPa).

Example 2-5

A negative electrode and a battery were fabricated in a similar way to Example 2-1 except that, as the binder, polyimide (E elastic modulus of 7.00 GPa) was used in place of the polyamide imide (E elastic modulus of 2.00 GPa).

Comparative Example 2-1

A negative electrode and a battery were fabricated in a similar way to Example 2-1 except that, as the binder, polyvinylidene fluoride (PCdF) (E elastic modulus of 1.00 GPa) was used in place of the polyamide imide (E elastic modulus of 2.00 GPa).

Comparative Example 2-2

A negative electrode and a battery were fabricated in a similar way to Example 2-1 except that, as the binder, polyimide (E elastic modulus of 7.40 GPa) was used in place of the polyamide imide (E elastic modulus of 2.00 GPa).

Comparative Example 2-3

A negative electrode and a battery were fabricated in a similar way to Example 2-4 except that, as the negative electrode active material, pure Si was used in place of the Si alloy.

Comparative Example 2-4

A negative electrode and a battery were fabricated in a similar way to Comparative example 2-1 except that, as the negative electrode active material, pure Si was used in place of the Si alloy.

<Performance Evaluation>
[Evaluation of Discharge Capacity]

For each of the lithium ion secondary batteries fabricated as described above, the discharge capacity was evaluated in the following way. Under an atmosphere of 30° C., each battery was charged with up to 2.0V in a constant current mode (CC; current of 0.1 C), was left standing for 10 minutes, thereafter, was discharged to 0.01V by a constant current (CC; current of 0.1 C), and was left standing for 10 minutes after the discharge. Results obtained by measuring such discharge capacities at the time of this discharge are shown in the following Table 6 and FIG. 23. Note that the results of the discharge capacities shown in Table 6 and FIG. 23 are relative values when the value of the discharge capacity of Comparative example 2-1 was taken as 100.

TABLE 6

| | Active material | Type of binder | E elastic modulus of binder (Gpa) | Improvement rate of discharge capacity retention rate |
|---|---|---|---|---|
| Example 2-1 | Si alloy | polyamide imide | 2.00 | 114 |
| Example 2-2 | Si alloy | polyimide | 2.10 | 149 |
| Example 2-3 | Si alloy | polyimide | 3.30 | 172 |
| Example 2-4 | Si alloy | polyimide | 3.73 | 167 |
| Example 2-5 | Si alloy | polyimide | 7.00 | 152 |
| Comparative Example 2-1 | Si alloy | PVdF | 1.00 | 100 |
| Comparative Example 2-2 | Si alloy | polyimide | 7.40 | 75 |
| Comparative Example 2-3 | Pure Si | polyimide | 3.73 | 75 |
| Comparative Example 2-4 | Pure Si | PVdF | 1.00 | 89 |

Figure 23:
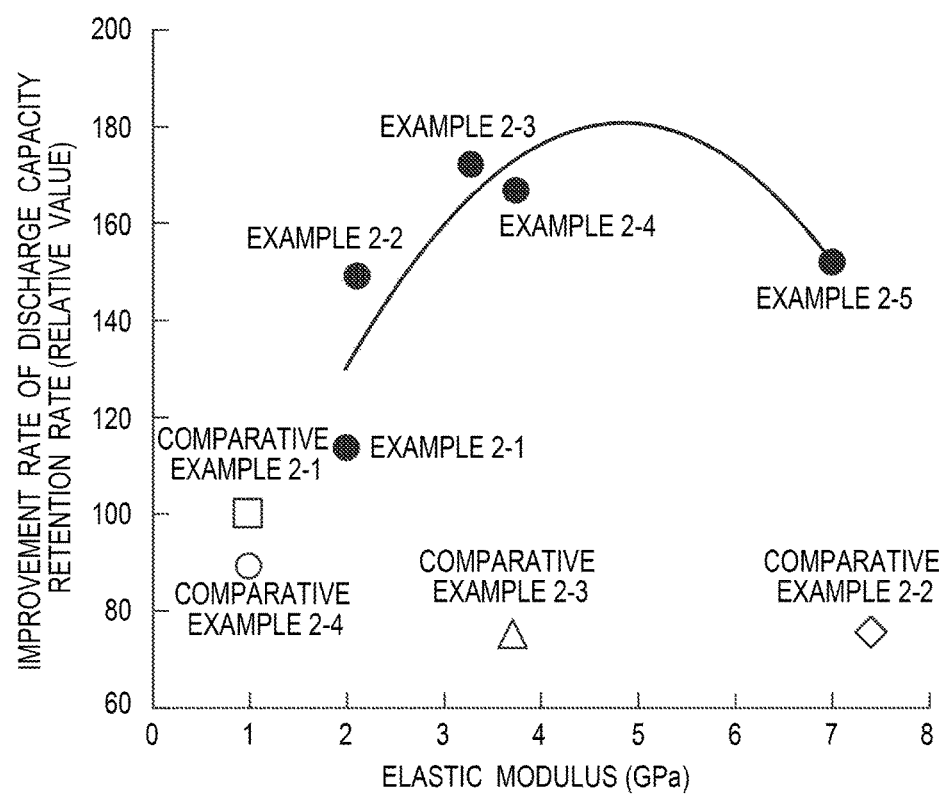
FIG. 23 is a graph showing relationships between E-elastic moduli of binders contained in the electrode layers and the improvement rate of the discharge capacity of the batteries in Examples.

From the results of the above-described Table 6 and FIG. 23, it is understood that the batteries according to Examples 2-1 to 2-5, each of which contains the binder having the E elastic modulus within the predetermined range, exhibits high cycle characteristics.

Next, in Example 3 to be described below, performance evaluation was performed for negative electrodes for an electrical device, which use $Si_{41}Zn_{20}Sn_{39}$ among the above-described Si alloys as the negative electrode active material, and change the type (elastic elongation) the current collector.

Example 3-1

[Manufacturing of Si Alloy]

The above-described Si alloy was manufactured by the mechanical alloy method (or the arc plasm fusion method). Specifically, a planetary ball mill apparatus P-6 made by Fritsch GmbH in Germany was used, zirconia-made milling balls and powders of the respective raw materials of the alloy were poured into a zirconia-made milling pot, and an alloy was made at 600 rpm for 48 hours.

[Fabrication of Negative Electrode]

80 mass parts of the negative electrode active material, 5 mass parts of the electrically-conductive auxiliary agent and 15 mass parts of the binder were mixed with one another in N-methyl-2-pyrrolidone (NMP) as a solvent, whereby negative electrode slurry was prepared. Here, for the negative electrode active material, the Si alloy powder ($Si_{42}Ti_7Sn_{51}$; mean particle diameter of 0.3 μm) fabricated as described above was used. Moreover, for the electrically-conductive auxiliary agent, short chain-like acetylene black was used as the short chain-like carbon black, and for the binder, polyimide (E elastic modulus of 2.1 GPa) was used.

There was prepared copper alloy foil (Copper alloy 1: Cu added with Cr, Sn and Zn individually by approximately 0.3 mass %) with a thickness of 10 μm, in which elastic elongation is 1.43%, and tensile strength is 580 N/mm².

In this example, the elastic elongation (%) and tensile strength (N/mm²) of the current collector was measured at a test speed of 10 mm/min and with a chuck interval of 50 mm by using a digital material tester (type 5565) made by Instron Corporation. As each of samples, there was used current collector foil formed into a wedge shape with an overall length of 70 mm and a parallel portion width of 5 mm.

The obtained negative electrode active material slurry was coated on both surfaces of the above-described copper alloy foil (Copper alloy 1) so that a thickness thereof could be individually 50 μm, followed by drying in vacuum for 24 hours, whereby a negative electrode was obtained.

Example 3-2

A negative electrode was fabricated in a similar way to Example 3-1 except that, as the negative electrode current collector, there was used copper alloy foil (Copper alloy 2: Cu added with Zr by approximately 0.3 mass %) with a thickness of 10 μm, in which elastic elongation is 1.53%, and tensile strength is 450 N/mm².

Example 3-3

A negative electrode was fabricated in a similar way to Example 3-1 except that, as the negative electrode current collector, there was used copper alloy foil (Copper alloy 3: Cu added with Zr by approximately 0.1 mass %) with a thickness of 10 μm, in which elastic elongation is 1.39%, and tensile strength is 420 N/mm².

Comparative Example 3-1

A negative electrode was fabricated in a similar way to Example 3-1 except that, as the negative electrode current collector, there was used copper foil (tough pitch copper: purity of Cu is 99.9 mass % or more) with a thickness of 10 μm, in which elastic elongation is 1.28%, and tensile strength is 139 N/mm².

Comparative Example 3-2

A negative electrode was fabricated in a similar way to Comparative example 3-1 except that, as the negative electrode current collector, there were used 80 mass parts of silicon (pure Si) powder (purity: 99.999 mass %; mean particle diameter of primary particles: 45 μm).

Comparative Example 3-3

A negative electrode was fabricated in a similar way to Comparative example 3-2 except that poly vinylidene fluoride (PVdF) was used as a binder material.

[Fabrication of Positive Electrode]

$Li_{1.85}Ni_{0.18}Co_{0.10}Mn_{0.87}O_3$ as a positive electrode active material was prepared by the method described in Example 1 (paragraph 0046) of Japanese Patent Unexamined Publication No. 2012-185913. Then, 90 mass parts of this positive electrode active material, 5 mass parts of acetylene black as the electrically-conductive auxiliary agent and 5 mass parts of polyvinylidene fluoride (PVdF) as the binder were mixed with one another, and were dispersed into N-methyl-2-pyrrolidone (NMP), whereby positive electrode slurry was obtained. Subsequently, the obtained positive electrode slurry was uniformly coated on both surfaces of a positive electrode current collector, which was made of aluminum foil with a thickness of 20 μm, so that a thickness of the positive electrode active material layers could be 30 μm, followed by drying, whereby a positive electrode was obtained.

[Fabrication of Battery]

The positive electrode and the negative electrode, which were fabricated as described above, were opposed to each other, and a separator (polypropylene-made microporous membrane; membrane thickness of 20 μm) was arranged therebetween. Subsequently, a laminated body of the negative electrode, the separator and the positive electrode was arranged on a bottom side of a coin cell (CR2032; material: stainless steel (SUS316). Moreover, a gasket was attached in order to keep insulating properties between the positive electrode and the negative electrode, the following electrolytic solution was injected thereinto by a syringe. Then, springs and spacers were stacked, upper sides of such coin cells were superimposed on one another, and were hermetically sealed by crimping the same, whereby a lithium ion secondary battery was obtained.

Note that, as the above-described electrolytic solution, a solution was used, which was obtained by dissolving lithium phosphate hexafluoride ($LiPF_6$) as the supporting salt into an organic solvent so that a concentration thereof could be 1 mol/L. Here, the organic solvent was obtained by mixing ethylene carbonate (EC) and diethyl carbonate (DEC) in a ratio of EC:DEC=1:2 (volume ratio).

[Charge/Discharge Test of Battery]

A charge/discharge test was performed in a similar way to Reference example A.

That is to say, by using a charge/discharge tester (HJ0501SM8A made by Hokuto Denko Corporation), in a thermostat oven (PFU-3K made be Espec Corporation) set at a temperature of 300 K (27° C.), each of the batteries was charged with a voltage from 2V to 10 mV at a current of 0.1 mA in a charge process (Li insertion process to the negative electrode as an evaluation target) while setting a constant current/constant voltage mode. Thereafter, in a discharge process (Li elimination process from the above-described negative electrode), each of the batteries was discharged with a voltage from 10 mV to 2V at a current of 0.1 mA while setting a constant current mode. Such a charge/discharge cycle as described above was taken as one cycle, and this was repeated 50 times.

Then, discharge capacities in a 50th cycle were obtained, and retention rates thereof with respect to a discharge capacity in a first cycle were calculated. The "discharge capacity retention rate (%)" in the 50th cycle represents an index as to "what capacity is maintained from the initial capacity". A calculation formula of the discharge capacity retention rate (%) is as follows.

$$\text{Discharge capacity retention rate (\%)} = \text{discharge capacity in 50th cycle/discharge capacity in first cycle} \times 100 \quad \text{[Mathematical 1]}$$

Moreover, results of the obtained discharge capacity retention rates (%) are converted into rates (improvement rates (%) of the discharge capacity retention rates) when the discharge capacity retention rate of Comparative example 3-1 was taken as 100, and are shown in the following Table 7 and FIG. 24.

TABLE 7

| | Active material | Electrically-conductive auxiliary agent | Binder | Current collector | Elastic elongation of current collector (%) | Tensile strength of current collector (N/mm$^2$) | Improvement rate of discharge capacity retention rate (%) |
|---|---|---|---|---|---|---|---|
| Example 3-1 | Si alloy | short chain-like carbon black | polyimide | copper alloy (1) | 1.43 | 580 | 124 |
| Example 3-2 | Si alloy | short chain-like carbon black | polyimide | copper alloy (2) | 1.53 | 450 | 122 |
| Example 3-3 | Si alloy | short chain-like carbon black | polyimide | copper alloy (3) | 1.39 | 420 | 108 |
| Comparative Example 3-1 | Si alloy | short chain-like carbon black | polyimide | tough pitch copper | 1.28 | 139 | 100 |
| Comparative Example 3-2 | Pure Si | short chain-like carbon black | polyimide | tough pitch copper | 1.28 | 139 | 84 |
| Comparative Example 3-3 | Pure Si | short chain-like carbon black | PVdF | tough pitch copper | 1.28 | 139 | 63 |

Figure 24:
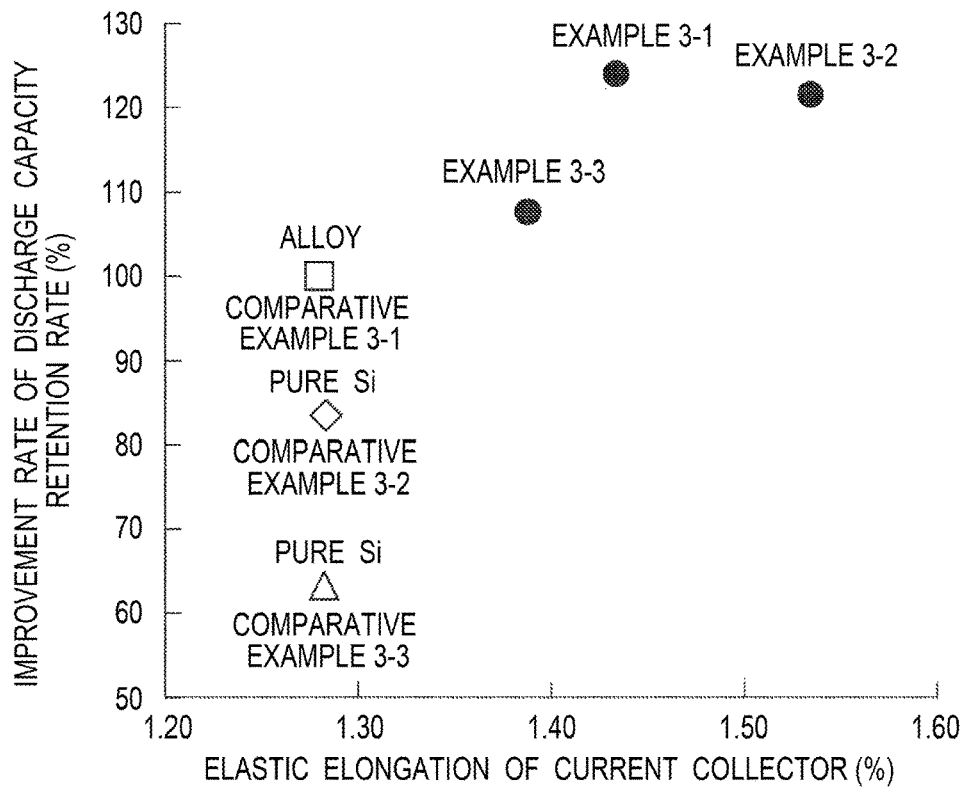
FIG. 24 shows plots indicating relationships between elastic elongations of negative electrode current collectors and the improvement rates of the discharge capacity of the batteries in Examples.

From the results of Table 7 and FIG. 24, it was able to be confirmed that the batteries of Examples 3-1 to 3-3, each of which uses the current collector with elastic elongation of 1.30% or more, can realize high discharge capacity retention rates in comparison with the batteries of Comparative examples 3-1 to 3-3. It is considered that this is because each of the current collectors for use in Examples 3-1 to 3-3 elastically follows the volume change of the negative electrode active material layer containing the Si alloy, the volume change following the charge/discharge of the battery, whereby the deformation of the electrode layer is suppressed. In particular, in Examples 3-1 and 3-2 in which the elastic elongation of the current collectors is 1.40 or more and 1.50 or more, higher discharge capacity retention rates were obtained.

Meanwhile, in the battery of Comparative example 3-1, which uses the current collector with elastic elongation of a predetermined value or less, the following is considered. The current collector became prone to be plastically deformed following the volume change of the negative electrode active material layer, which follows the charge/discharge of the battery, and as a result, the negative electrode active material layer was warped, it became difficult for the current collector to maintain the uniform inter-electrode distance with the positive electrode in the planar direction, and such a high discharge capacity retention rate was not obtained.

Moreover, in the battery of Comparative example 3-2, which used pure Si as the negative electrode active material, the volume change caused by the negative electrode active material, the volume change following the charge/discharge of the battery, is larger in the case of the Si alloy. Therefore, it is considered that, since the volume change of the negative electrode active material layer is larger, the lowering of the capacity, which is caused by the fact that the current collector cannot follow the volume change of the negative electrode active material layer, becomes larger.

Furthermore, in the battery of Comparative example 3-3, which used PVdF as the binder of the negative electrode active material layer, the discharge capacity retention rate is lower. It is considered that this is because, since the elastic modulus (1.0 GPa) of PVdF as the binder for use in Comparative example 3-3 is smaller than the elastic modulus (3.73 GPa) of polyimide for use in Examples 3-1 to 3-3 and Comparative examples 3-1 and 3-2, the binder cannot follow the expansion/contraction of the active material, which follow the charge/discharge, and the volume change of the negative electrode active material layer becomes large. It is considered that, as a result, the lowering of the capacity, which is caused by the fact that the current collector cannot follow the volume change of the negative electrode active material layer, becomes much larger.

Next, in Example 4 to be described below, performance evaluation was performed for negative electrodes for an electrical device, which use $Si_{41}Zn_{20}Sn_{39}$ among the above-described Si alloys, and contain negative electrode active materials composed by mixing this $Si_{41}Zn_{20}Sn_{39}$ with graphite.

Example 4-1

[Manufacturing of Si Alloy]

The Si alloy was manufactured by the mechanical alloy method (or the arc plasm fusion method). Specifically, a planetary ball mill apparatus P-6 made by Fritsch GmbH in Germany was used. zirconia-made milling balls and powders of the respective raw materials of the alloy were poured into a zirconia-made milling pot. and an alloy was made at 600 rpm for 48 hours.

[Fabrication of Negative Electrode]

2.76 mass parts of the above-manufactured Si alloy ($Si_{41}Zn_{20}Sn_{39}$; mean particle diameter of 0.3 μm) as the negative electrode active material and 89.24 mass parts of graphite (natural graphite; mean particle diameter of 22 μm), 4 mass parts of short chain-like acetylene black as the electrically-conductive auxiliary agent, and 4 mass parts of polyimide (E elastic modulus of 2.1 GPa) as the binder were mixed with one another, and were dispersed into N-methyl pyrrolidone, whereby negative electrode slurry was obtained. Subsequently, the obtained negative electrode slurry was uniformly coated on both surfaces of a negative electrode current collector, which was made of copper foil (elastic elongation of 1.4%) with a thickness of 10 μm, so that a thickness of the negative electrode active material layers could be 30 μm, followed by drying in vacuum for 24 hours, whereby a negative electrode was obtained. Note that a content of the Si alloy in the negative electrode active material was 3%.

[Fabrication of Positive Electrode]

$Li_{1.85}Ni_{0.18}Co_{0.10}Mn_{0.87}O_3$ as the positive electrode active material was prepared by the method described in Example 1 (paragraph 0046) of Japanese Patent Unexamined Publication No. 2012-185913. Then, 90 mass parts of this positive electrode active material, 5 mass parts of acetylene black as the electrically-conductive auxiliary agent and 5 mass parts of polyvinylidene fluoride as the binder were mixed with one another, were dispersed into N-methyl pyrrolidone, whereby positive electrode slurry was obtained. Subsequently, the obtained positive electrode slurry was uniformly coated on both surfaces of a negative electrode current collector, which was made of aluminum foil with a thickness of 20 μm, so that a thickness of the positive electrode active material layers could be 30 μm, followed by drying, whereby a positive electrode was obtained.

[Fabrication of Battery]

The positive electrode and the negative electrode, which were fabricated as described above, were opposed to each other, and a separator (polypropylene-made microporous membrane; membrane thickness of 20 μm) was arranged therebetween. Subsequently, a laminated body of the negative electrode, the separator and the positive electrode was arranged on a bottom side of a coin cell (CR2032; material: stainless steel (SUS316). Moreover, a gasket was attached in order to keep insulating properties between the positive electrode and the negative electrode, the following electrolytic solution was injected thereinto by a syringe. Then, springs and spacers were stacked, upper sides of such coin cells were superimposed on one another, and were hermetically sealed by crimping the same, whereby a lithium ion secondary battery was obtained.

Note that, as the above-described electrolytic solution, a solution was used, which was obtained by dissolving lithium phosphate hexafluoride ($LiPF_6$) as the supporting salt into an organic solvent so that a concentration thereof could be 1 mol/L. Here, the organic solvent was obtained by mixing ethylene carbonate (EC) and diethyl carbonate (DEC) in a ratio of EC:DEC=1:2 (volume ratio).

Example 4-2

A negative electrode and a battery were fabricated in a similar way to Example 4-1 except that the mass part of the Si alloy was changed to 4.6 mass parts and that the mass part of the graphite was changed to 87.4 mass parts. Note that the content of the Si alloy in the negative electrode active material is 5%.

Example 4-3

A negative electrode and a battery were fabricated in a similar way to Example 4-1 except that the mass part of the Si alloy was changed to 6.4 mass parts and that the mass part of the graphite was changed to 85.5 mass parts. Note that the content of the Si alloy in the negative electrode active material is 7%.

Example 4-4

A negative electrode and a battery were fabricated in a similar way to Example 4-1 except that the mass part of the Si alloy was changed to 9.2 mass parts and that the mass part of the graphite was changed to 82.8 mass parts. Note that the content of the Si alloy in the negative electrode active material is 10%.

Example 4-5

A negative electrode and a battery were fabricated in a similar way to Example 4-1 except that the mass part of the Si alloy was changed to 11.0 mass parts and that the mass part of the graphite was changed to 80.96 mass parts. Note that the content of the Si alloy in the negative electrode active material is 12%.

Example 4-6

A negative electrode and a battery were fabricated in a similar way to Example 4-1 except that the mass part of the Si alloy was changed to 13.8 mass parts and that the mass part of the graphite was changed to 78.2 mass parts. Note that the content of the Si alloy in the negative electrode active material is 15%.

Example 4-7

A negative electrode and a battery were fabricated in a similar way to Example 4-1 except that the mass part of the Si alloy was changed to 18.4 mass parts and that the mass part of the graphite was changed to 73.6 mass parts. Note that the content of the Si alloy in the negative electrode active material is 20%.

Example 4-8

A negative electrode and a battery were fabricated in a similar way to Example 4-1 except that the mass part of the Si alloy was changed to 23.0 mass parts and that the mass part of the graphite was changed to 69.0 mass parts. Note that the content of the Si alloy in the negative electrode active material is 25%.

Example 4-9

A negative electrode and a battery were fabricated in a similar way to Example 4-1 except that the mass part of the Si alloy was changed to 27.6 mass parts and that the mass part of the graphite was changed to 64.4 mass parts. Note that the content of the Si alloy in the negative electrode active material is 30%.

Example 4-10

A negative electrode and a battery were fabricated in a similar way to Example 4-1 except that the mass part of the Si alloy was changed to 36.8 mass parts and that the mass part of the graphite was changed to 55.2 mass parts. Note that the content of the Si alloy in the negative electrode active material is 40%.

Example 4-11

A negative electrode and a battery were fabricated in a similar way to Example 4-1 except that the mass part of the Si alloy was changed to 46.0 mass parts and that the mass part of the graphite was changed to 46.0 mass parts. Note that the content of the Si alloy in the negative electrode active material is 50%.

Example 4-12

A negative electrode and a battery were fabricated in a similar way to Example 4-1 except that the mass part of the Si alloy was changed to 55.2 mass parts and that the mass part of the graphite was changed to 36.8 mass parts. Note that the content of the Si alloy in the negative electrode active material is 60%.

Example 4-13

A negative electrode and a battery were fabricated in a similar way to Example 4-1 except that the mass part of the Si alloy was changed to 64.4 mass parts and that the mass part of the graphite was changed to 27.6 mass parts. Note that the content of the Si alloy in the negative electrode active material is 70%.

<Performance Evaluation>

[Evaluation of Cycle Characteristics]

For each of the lithium ion secondary batteries fabricated as described above, the cycle characteristics were evaluated in the following way. Under an atmosphere of 30° C., each battery was charged with up to 2.0V in a constant current mode (CC; current of 0.1 C), was left standing for 10 minutes, thereafter, was discharged to 0.01V by a constant current (CC; current of 0.1 C), and was left standing for 10 minutes after the discharge. This charge/discharge process was taken as one cycle, a charge/discharge test of 100 cycles was performed, and a rate (discharge capacity retention rate [%] of a discharge capacity in a 100th cycle with respect to a discharge capacity in a first cycle was obtained. Results thus obtained are shown in the following Table 8 and FIG. 25.

[Evaluation of Energy Density]

For each of the lithium ion secondary batteries fabricated as described above, the cycle characteristics were evaluated in the following way. First, as initial charge/discharge, each of the batteries was subjected to constant-current charge by a current corresponding to 0.2 C with respect to a theoretical capacity of the positive electrode, and was thereafter subjected to constant-voltage charge by 4.2V, these two types of charges having been performed for 10 hours in total, and thereafter, was subjected to constant-current discharge to 2.7V by a discharge current of 0.2 C. Energy of the battery was calculated from a charge/discharge curve at this time, and was divided by a battery mass, whereby an energy density of the battery was calculated. Results thus obtained are shown in the following Table 8 and FIG. 25.

TABLE 8

| | Content of Si alloy (%) | Discharge capacity retention rate (%) | Energy density (mAh/g) |
|---|---|---|---|
| Example 4-1 | 3 | 98 | 397 |
| Example 4-2 | 5 | 98 | 420 |
| Example 4-3 | 7 | 97 | 443 |
| Example 4-4 | 10 | 97 | 477 |
| Example 4-5 | 12 | 96 | 499 |
| Example 4-6 | 15 | 95 | 534 |
| Example 4-7 | 20 | 93 | 590 |
| Example 4-8 | 25 | 91 | 647 |
| Example 4-9 | 30 | 89 | 704 |
| Example 4-10 | 40 | 85 | 818 |
| Example 4-11 | 50 | 80 | 932 |
| Example 4-12 | 60 | 70 | 1045 |
| Example 4-13 | 70 | 45 | 1159 |

Figure 25:
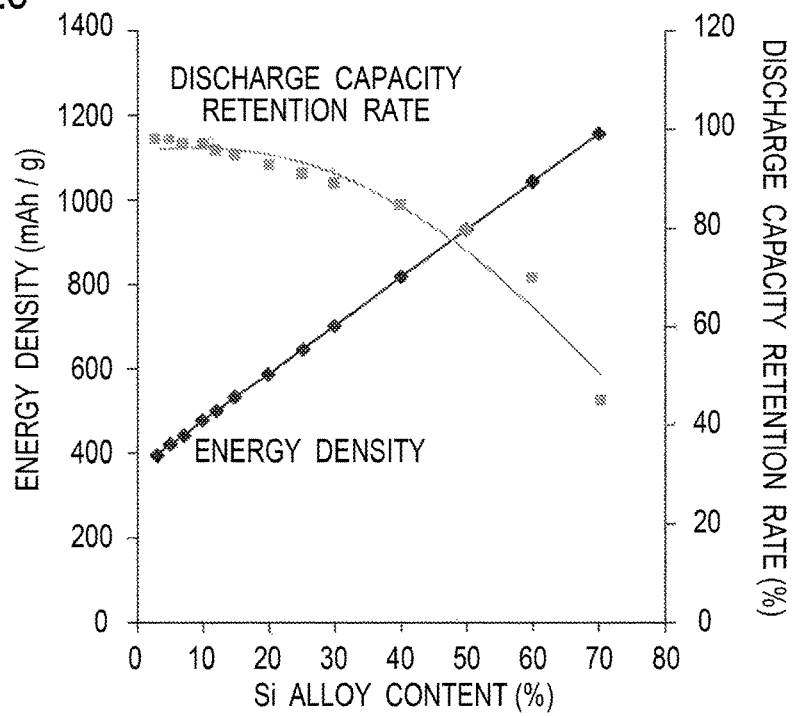
FIG. 25 is a graph showing relationships between contents of Si alloys and energy densities or the discharge capacity retention rates in Example.

From the results of the above-described Table 8 and FIG. 25, it is understood that the batteries, which use the negative electrode active materials composed by mixing the Si alloys in Examples 4-1 to 4-13 and graphite with each other, has a high initial capacity and exhibits good balance characteristics while maintaining high cycle characteristics.

The entire content of Japanese Patent Application No. 2012-256896 (filed on Nov. 22, 2012) is herein incorporated by reference.

REFERENCE SIGNS LIST

10, 50 LITHIUM ION SECONDARY BATTERY (LAMINATED BATTERY)
11 POSITIVE ELECTRODE CURRENT COLLECTOR
12 NEGATIVE ELECTRODE CURRENT COLLECTOR
13 POSITIVE ELECTRODE ACTIVE MATERIAL LAYER NEGATIVE ELECTRODE ACTIVE MATERIAL LAYER
17 ELECTROLYTE LAYER
19 SINGLE CELL LAYER
21, 57 POWER GENERATION ELEMENT
25, 58 POSITIVE ELECTRODE CURRENT COLLECTOR PLATE
27, 59 NEGATIVE ELECTRODE CURRENT COLLECTOR PLATE
29, 52 BATTERY EXTERIOR MEMBER (LAMINATED FILM)

The invention claimed is:

1. A negative electrode for an electrical device, comprising:
   a current collector; and
   an electrode layer containing a negative electrode active material, an electrically-conductive auxiliary agent and a binder and formed on a surface of the current collector,
   wherein the negative electrode active material contains an alloy represented by $Si_xZn_ySn_zA_a$ where
   A is inevitable impurity, and
   x, y, z and a represent mass percent values and satisfy conditions of $23<x<64$, $0<y<65$, $4\leq z<34$, $0\leq a<0.5$ and $x+y+z+a=100$, and
   elongation ($\delta$) of the electrode layer measured in accordance with a tensile test method of JIS K 7163 (1994) is $1.29<\delta<1.70\%$.

2. The negative electrode for an electrical device according to claim 1,
   wherein y is more than 27 to less than 61.

3. The negative electrode for an electrical device according to claim 2,
   wherein y is more than 38, and z is less than 24.

4. The negative electrode for an electrical device according to claim 2, wherein x is 24 or more to less than 38.

5. The negative electrode for an electrical device according to claim 1, wherein the x, y, z and a satisfy conditions of $35\leq x\leq 57$, $36\leq y\leq 61$, $4\leq z\leq 7$, $0\leq a<0.5$ and $x+y+z+a=100$.

6. The negative electrode for an electrical device according to claim 1, wherein $\delta$ is $1.40\leq\delta<1.70\%$.

7. The negative electrode for an electrical device according to claim 1, wherein $\delta$ is $1.40\leq\delta\leq 1.66\%$.

8. The negative electrode for an electrical device according to claim 1, wherein $\delta$ is $1.40\leq\delta\leq 1.57\%$.

9. The negative electrode for an electrical device according to claim 1, wherein $\delta$ is $1.47\leq\delta\leq 1.57\%$.

10. The negative electrode for an electrical device according to claim 1, wherein $\delta$ is $1.53\leq\delta\leq 1.57\%$.

11. The negative electrode for an electrical device according to claim 1, wherein the binder contains resin with an E elastic modulus from more than 1.00 GPa to less than 7.40 GPa.

12. The negative electrode for an electrical device according to claim 1, wherein the binder contains resin with an E elastic modulus from more than 1.00 GPa to less than 7.40 GPa, and
    the resin is at least one selected from the group consisting of polyimide, polyamide imide and polyamide.

13. The negative electrode for an electrical device according to claim 1, wherein elastic elongation of the current collector is 1.30% or more.

14. The negative electrode for an electrical device according to claim 1, wherein the negative electrode active material is a mixture of the alloy represented by $Si_xZn_ySn_zA_a$ and a carbon-based material with each other.

15. An electrical device comprising the negative electrode for an electrical device according to claim 1.

16. The negative electrode for an electrical device according to claim 1, wherein the electrically-conductive auxiliary agent includes a short chain or a fibrous electrically-conductive auxiliary agent.

17. A negative electrode for an electrical device, comprising:
a current collector; and
an electrode layer containing a negative electrode active material, an electrically-conductive auxiliary agent and a binder and formed on a surface of the current collector,
wherein the negative electrode active material contains an alloy represented by a following formula (1):

$$Si_xZn_yM_zA_a \quad (1)$$

in the formula (1) M is V,
A is inevitable impurity, and
x, y, z and a represent mass percent values and satisfy $33 \leq x \leq 50$, $0 < y \leq 46$, $21 \leq z \leq 67$, $0 \leq a < 0.5$ and $x+y+z+a=100$, and
elongation (δ) of the electrode layer is $1.29 < \delta < 1.70\%$.

18. The negative electrode for an electrical device according to claim 17,
wherein x is 33 to 47, y is 11 to 27, and z is 33 to 56.

19. A negative electrode for an electrical device, comprising:
a current collector; and
an electrode layer containing a negative electrode active material, an electrically-conductive auxiliary agent and a binder and formed on a surface of the current collector,
wherein the negative electrode active material contains an alloy represented by a following formula (1):

$$Si_xZn_yM_zA_a \quad (1)$$

in the formula (1) M is Sn,
A is inevitable impurity, and
x, y, z and a represent mass percent values and satisfy $23 < x < 44$, $0 < y < 65$, $34 \leq z \leq 58$, $0 \leq a < 0.5$ and $x+y+z+a=100$, and
elongation (δ) of the electrode layer is $1.29 < \delta < 1.70\%$.

20. The negative electrode for an electrical device according to claim 19,
wherein x is less than 34.

21. The negative electrode for an electrical device according to claim 19, wherein x is less than 38, y is more than 27, and z is less than 40.

22. The negative electrode for an electrical device according to claim 19, wherein x is less than 29, and z is 40 or more.

* * * * *